US011843493B2

(12) United States Patent
Xue et al.

(10) Patent No.: US 11,843,493 B2
(45) Date of Patent: *Dec. 12, 2023

(54) METHOD FOR TRANSMITTING HE-LTF SEQUENCE AND APPARATUS

(71) Applicant: HUAWEI TECHNOLOGIES CO., LTD., Guangdong (CN)

(72) Inventors: Xin Xue, Shenzhen (CN); Ningjuan Wang, Shenzhen (CN); Le Liu, Shenzhen (CN); Wei Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/683,103

(22) Filed: Feb. 28, 2022

(65) Prior Publication Data

US 2022/0407752 A1 Dec. 22, 2022

Related U.S. Application Data

(63) Continuation of application No. 16/694,695, filed on Nov. 25, 2019, now Pat. No. 11,265,873, which is a (Continued)

(30) Foreign Application Priority Data

Aug. 26, 2015 (CN) ......................... 201510532381.2
Nov. 26, 2015 (CN) ......................... 201510849062.4

(51) Int. Cl.
*H04L 27/26* (2006.01)
*H04L 5/00* (2006.01)
(Continued)

(52) U.S. Cl.
CPC ........ *H04L 27/2613* (2013.01); *H04L 5/0048* (2013.01); *H04L 27/262* (2013.01);
(Continued)

(58) Field of Classification Search
CPC . H04L 5/0048; H04L 27/2613; H04L 27/262; H04L 27/26132; H04W 72/044
See application file for complete search history.

(56) References Cited

U.S. PATENT DOCUMENTS 8,693,356 B2 4/2014 Wu et al.
8,917,784 B2 12/2014 Yang et al.
(Continued)

FOREIGN PATENT DOCUMENTS

CN 101433038 A 5/2009
CN 101610543 A 12/2009
(Continued)

OTHER PUBLICATIONS

Hanqing Lou et al. Sub-Channel Selection for Multi-User Channel Access in Next Generation Wi-Fi, 2014 IEEE 25th Annual International Symposium on Personal, Indoor, and Mobile Radio Communication (PIMRC), 2014.pp 779-784.
(Continued)

*Primary Examiner* — Chi Ho A Lee
*Assistant Examiner* — Andrew Lee
(74) *Attorney, Agent, or Firm* — James Anderson Harrison

(57) ABSTRACT

Embodiments of the present invention provide several long training sequences that are in a wireless local area network and that comply with 802.11ax.

12 Claims, 19 Drawing Sheets

Related U.S. Application Data continuation of application No. 15/905,567, filed on Feb. 26, 2018, now Pat. No. 10,645,687, which is a continuation of application No. PCT/CN2016/096973, filed on Aug. 26, 2016.

(51) Int. Cl.
*H04W 72/044* (2023.01)
*H04W 84/12* (2009.01)

(52) U.S. Cl.
CPC ..... *H04W 72/044* (2013.01); *H04L 27/26132* (2021.01); *H04W 84/12* (2013.01)

(56) References Cited

U.S. PATENT DOCUMENTS

| | | | | |
|---|---|---|---|---|
| 8,989,102 | B2 | 3/2015 | Kenney et al. | |
| 9,825,796 | B2 | 11/2017 | Porat et al. | |
| 9,923,680 | B2 | 3/2018 | Porat et al. | |
| 10,135,590 | B2 | 11/2018 | Park et al. | |
| 10,159,043 | B1 | 12/2018 | Cao et al. | |
| 10,447,448 | B2 | 10/2019 | Park et al. | |
| 2005/0281354 | A1* | 12/2005 | Kim | H04B 7/02 375/299 |
| 2008/0095274 | A1 | 4/2008 | Becker et al. | |
| 2008/0123616 | A1 | 5/2008 | Lee | |
| 2008/0317149 | A1 | 12/2008 | Sondur et al. | |
| 2009/0181687 | A1 | 7/2009 | Tiirola et al. | |
| 2010/0254368 | A1 | 10/2010 | Yamaura | |
| 2011/0013607 | A1 | 1/2011 | Van Nee et al. | |
| 2011/0013721 | A1 | 1/2011 | Liao et al. | |
| 2011/0194544 | A1 | 8/2011 | Yang et al. | |
| 2011/0299382 | A1 | 12/2011 | Van Nee et al. | |
| 2012/0039321 | A1* | 2/2012 | Ghosh | H04L 1/0025 370/338 |
| 2012/0127940 | A1 | 5/2012 | Lee et al. | |
| 2012/0201316 | A1 | 8/2012 | Zhang et al. | |
| 2012/0267142 | A1 | 10/2012 | Nordin et al. | |
| 2012/0327871 | A1 | 12/2012 | Ghosh et al. | |
| 2013/0021568 | A1 | 1/2013 | Hsieh et al. | |
| 2013/0070747 | A1 | 3/2013 | Gardner et al. | |
| 2013/0107893 | A1 | 5/2013 | Zhang | |
| 2013/0242963 | A1 | 9/2013 | Van Nee et al. | |
| 2013/0272147 | A1* | 10/2013 | Vermani | H04B 7/0689 370/252 |
| 2013/0272198 | A1 | 10/2013 | Azizi et al. | |
| 2013/0286959 | A1 | 10/2013 | Hanqing et al. | |
| 2014/0079041 | A1 | 3/2014 | Lopez et al. | |
| 2014/0169245 | A1 | 6/2014 | Kenney et al. | |
| 2014/0307612 | A1 | 10/2014 | Vermani et al. | |
| 2015/0023272 | A1 | 1/2015 | Choi et al. | |
| 2015/0023335 | A1 | 1/2015 | Vermani et al. | |
| 2015/0063288 | A1 | 3/2015 | Yang et al. | |
| 2015/0124911 | A1* | 5/2015 | Wicker, Jr. | H04L 25/0242 375/340 |
| 2015/0319027 | A1 | 11/2015 | Tang et al. | |
| 2015/0327166 | A1 | 11/2015 | Kenney et al. | |
| 2015/0381399 | A1 | 12/2015 | Taghavi Nasrabadi et al. | |
| 2016/0007325 | A1 | 1/2016 | Seok et al. | |
| 2016/0029373 | A1 | 1/2016 | Seok | |
| 2016/0056991 | A1* | 2/2016 | Zhang | H04L 1/0065 375/260 |
| 2016/0127948 | A1 | 5/2016 | Azizi et al. | |
| 2016/0198358 | A1 | 7/2016 | Rong et al. | |
| 2016/0204912 | A1 | 7/2016 | Sun et al. | |
| 2016/0255179 | A1 | 9/2016 | Kim | |
| 2016/0286551 | A1 | 9/2016 | Lee et al. | |
| 2016/0301451 | A1 | 10/2016 | Seok et al. | |
| 2016/0323848 | A1 | 11/2016 | Azizi et al. | |
| 2016/0330006 | A1 | 11/2016 | Zhang et al. | |
| 2016/0360507 | A1 | 12/2016 | Cariou et al. | |
| 2017/0033914 | A1 | 2/2017 | Park et al. | |
| 2017/0041825 | A1 | 2/2017 | Yang et al. | |
| 2017/0048882 | A1 | 2/2017 | Li et al. | |
| 2017/0222769 | A1 | 8/2017 | Li et al. | |
| 2017/0302343 | A1 | 10/2017 | Choi et al. | |
| 2017/0303279 | A1 | 10/2017 | Park et al. | |
| 2017/0303280 | A1 | 10/2017 | Chun et al. | |
| 2018/0020460 | A1 | 1/2018 | Hedayat | |
| 2018/0027514 | A1 | 1/2018 | Chen et al. | |
| 2018/0167929 | A9 | 6/2018 | Chu et al. | |
| 2018/0184408 | A1 | 6/2018 | Xue et al. | |
| 2018/0263047 | A1 | 9/2018 | Kim et al. | |
| 2018/0288743 | A1 | 10/2018 | Choi et al. | |
| 2018/0310330 | A1 | 10/2018 | Chun et al. | |
| 2019/0021106 | A1 | 1/2019 | Oteri et al. | |
| 2019/0058569 | A1 | 2/2019 | Seok | |
| 2019/0165883 | A1 | 5/2019 | Chun et al. | |
| 2019/0268805 | A1 | 8/2019 | Lee et al. | |
| 2021/0385830 | A1 | 12/2021 | Lim et al. | |

FOREIGN PATENT DOCUMENTS

| | | | |
|---|---|---|---|
| CN | 101924721 | A | 12/2010 |
| CN | 101958739 | A | 1/2011 |
| CN | 102469053 | A | 5/2012 |
| CN | 102474488 | A | 5/2012 |
| CN | 102761390 | A | 10/2012 |
| CN | 102823212 | A | 12/2012 |
| CN | 102826212 | A | 12/2012 |
| CN | 103444114 | A | 12/2013 |
| CN | 103999392 | A | 8/2014 |
| CN | 104067586 | A | 9/2014 |
| CN | 104378149 | A | 2/2015 |
| CN | 104580053 | A | 4/2015 |
| CN | 104735015 | A | 6/2015 |
| CN | 105119851 | A | 12/2015 |
| CN | 106487737 | A | 3/2017 |
| CN | 108551434 | A | 9/2018 |
| EP | 2810417 | A1 | 12/2014 |
| JP | 2012533931 | A | 12/2012 |
| JP | 2013526139 | A | 6/2013 |
| JP | 2017505027 | A | 2/2017 |
| KR | 20120049885 | A | 5/2012 |
| KR | 20130008060 | A | 1/2013 |
| RU | 2528008 | C2 | 9/2014 |
| WO | 2012062123 | A1 | 5/2012 |
| WO | 2013122377 | A1 | 8/2013 |
| WO | 2014193547 | A1 | 12/2014 |
| WO | 2016070330 | A1 | 5/2016 |
| WO | 2017020283 | A1 | 2/2017 |

OTHER PUBLICATIONS

Sungho Moon(Newracom): Considerations on LTF Sequence Design; 11-15-0584-00-00ax-considerations-on-ltf-sequence-design ,IEEE Draft;Piscataway,NJ USA,vol. 802.11ax, May 11, 2015,XP068094444,14 pages.

Le Liu(Huawei): HE-LTF Sequence Design 11-15-1334-00-00ax-he-ltf-sequence-design , IEEE Draft; vol. 802.11ax,Nov. 9, 2015, XP068099297,38 pages.

Robert Stacey(Intel):"Specification Framework for Tgax", IEEE P802.11 Wireless LANs, IEEE 802.11-15/0132r10, Nov. 2015, 34 pages.

IEEE Std 802.11-2012 IEEE Standard for Information technology-Telecommunications and information exchange between systems Local and metropolitan area networks—Specific requirements Part 11: Wireless LAN Medium Access Control (MAC) and Physical Layer (PHY) Specifications, IEEE Computer Society, Sponsored by the LAN/MAN Standards Committee, Mar. 29, 2012, 2793 pages.

IEEE Std 802.11ac-2013, IEEE Standard for Information technology—Telecommunications and information exchange between systemsLocal and metropolitan area networks—Specific requirements, Part 11: Wireless LAN Medium Access Control(MAC) and Physical Layer (PHY) SpecificationsAmendment 4: Enhancements for Very High Throughput for Operation in Bands below 6 GHz, total 425 pages.

Le Liu, Huawei, et al. Remaining HE-LTF Sequence Design, IEEE 802.11-16/0052r0, Jan. 2016. total 30 pages.

Bo Sun(ZTE Corp.): IEEE 802.11 Tgax, Nov. 2015 Bangkok PHY Ad Hoc Meeting Minutes, IEEE 802.11-15/1442r0, Jul. 2015. total 21 pages.

(56) References Cited

OTHER PUBLICATIONS

Hongyuan Zhang (Marvell) et al. HE-LTF Proposal, IEEE 802.11-15/0349, Mar. 2015. total 43 pages.
S.Azizi, Intel, J. Choi, LGE:"OFDMA Numerology and Structure", IEEE 802.11-15/0330r5, May 2015. total 50 pages.
Robert Stacey(Intel):"Specification Framework for Tgax", IEEE P802.11 Wireless LANs, IEEE 802.11-15/0132r7, Jul. 2015, total 13 pages.
Jianhan Liu (Mediatek) et al. Channel Estimation Enhancement and Transmission Efficiency Improvement Using Beam-Change Indication and 1x HE-LTF, IEEE 802.11-15/1322r0, Nov. 2015. total 35 pages.
Bungho Moon, Newracom et al. LTF Sequence Designs, IEEE 802.11-15/1303r0, Nov. 2015. total 25 pages.
Qinghua Li (Intel) et al. HE-LTF Sequence for UL MU-MIMO, IEEE 802.11-15/0602r6, Sep. 2015. total 33 pages.
Daewon Lee (Newracom) et al. LTF Design for Uplink MU-MIMO, IEEE 802.11-15/1088r0, Sep. 2015. total 28 pages.
Daewon Lee (Newracom) et al. LTF Design for Uplink MU-MIMO, IEEE 802.11-15/0845r0, Jul. 2015. total 18 pages.
Yakun Sun (Marvell) et al. P Matrix for HE-LTF, IEEE 802.11-15/0817r0, Jul. 2015. total 19 pages.
Sungho Moon (Newracom) et al. Considerations on LTF Sequence Design, IEEE 802.11-15/0584r1, May 2015. total 14 pages.
Kome Oteri (InterDigital) et al. Performance of 1x, 2x, and 4x HE-LTF, IEEE 802.11-15/0569r0, May 2015. total 20 pages.
Yongho Seok, Newracom et al. Beamformed HE PPDU, IEEE 802.11-15/0597r1, May 2015. total 13 pages.
Katsuo Yunoki(KDDI RandD Laboratories) et al. DL MU Signalling, IEEE 802.11-15/1031r0, Sep. 2015. total 11 pages.
Hongyuan Zhang (Marvell):"HE-LTF Proposal; 11-15-0349-02-00ax-he-ltf-proposal", IEEE Draft; vol. 802.11 ax, No. 2, Mar. 10, 2015, pp. 1-43, XP068082992.
Kome Oteri (Interdigital):"Performance of 1x, 2x, and 4x HE-LTF; 11-15-0569-01-00ax-performance-of-1x-2x- and-4x-he-ltf", IEEE 802.11-15/569r0, IEEE Draft; vol. 802.11ax, No. 1,May 11, 2015, pp. 1-20, XP068094425.
Sungho Moon (Newracom):"LTF Sequence Designs; 11-15-1303-00-00ax-ltf-sequence-designs", IEEE802.11-15-1303r0, IEEE Draft; vol. 802.11 ax, Nov. 9, 2015, pp. 1-25, XP068099246.
U.S. Appl. No. 62/330,822, Eunsung Park et al. LG Electronics Inc. ,May 2, 2016. total 16 pages.
Youhan Kim et al. 160MHz transmissions;11-10-0774-00-00ac-160-mhz-transmissions, IEEE802.11-10-0774r0, Jul. 2010. total 25 pages.
Le Liu et al. HE-LTF Sequence Design; 11-15-1334-01-00ax-he-ltf-sequence-design, IEEE802.11-15-1334r1, Nov. 2015, total 37 pages.
Robert Stacey, Specification Framework for Tgax. IEEE 802.11-15/0132r8, Sep. 2015, 22 pages.
Intel et al. WF on LAA UL LBT, 3GPP TSG RAN WG1 #81, R1-153565, Fukuoka, Japan, May 25-29, 2015, total 4 pages.
Sungho Moon (Newracom): "Considerations on LTF Sequence Design ; 11-15-0584-00-00ax-considerations-on-ltfsequence-design", IEEE 802.11-15/0584r0, May 2015, pp. 1-14, XP068094444.
Le Liu (Huawei): "HE-LTF Sequence Design; 11-15-1334-00-00ax-he-ltf-sequence-design", IEEE 802.11-15/1334r0, Nov. 2015. total 38 pages. XP68099297A.

* cited by examiner

<table>
<tr><td>5.85</td><td>5.85</td><td>5.22</td><td>4.75</td><td rowspan="3">6.45</td><td>4.49</td><td>5.60</td><td>5.85</td><td>5.85</td></tr>
<tr><td colspan="2">4.06</td><td colspan="2">5.16</td><td colspan="2">4.32</td><td colspan="2">3.90</td></tr>
<tr><td colspan="4">6.24</td><td colspan="4">5.17</td></tr>
<tr><td colspan="9">8.63</td></tr>
</table>

VHT-LTF$_{-122,122}$ (w/o gamma)

FIG. 2a

<table>
<tr><td>5.85</td><td>5.85</td><td>5.34</td><td>4.75</td><td>6.45</td><td>4.49</td><td>5.60</td><td>5.85</td><td>5.85</td></tr>
<tr><td colspan="2">4.06</td><td colspan="2">5.07</td><td rowspan="2"></td><td colspan="2">4.32</td><td colspan="2">3.90</td></tr>
<tr><td colspan="4">6.21</td><td colspan="4">5.17</td></tr>
<tr><td colspan="9">5.11</td></tr>
</table>

VHT-LTF$_{-122,122}$ (w/gamma)

FIG. 2b

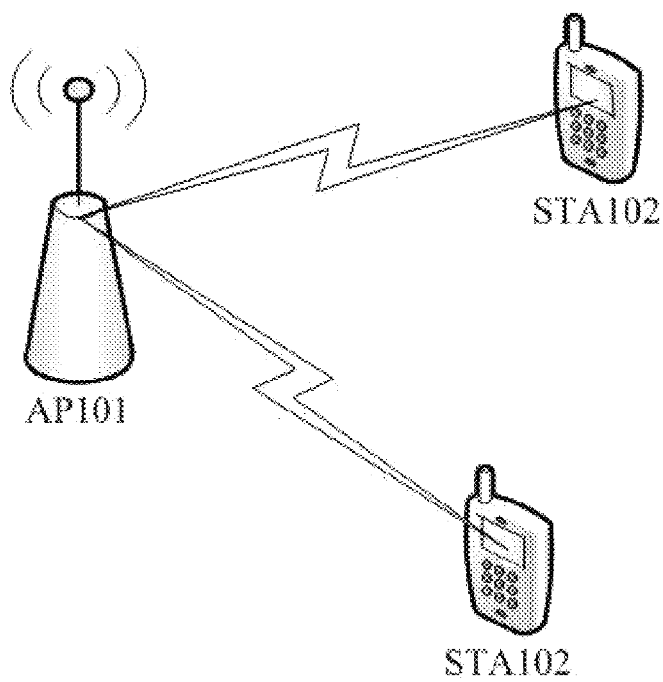

FIG. 3

(a) PPDU in a downlink multi-user transmission manner (b) PPDU in an uplink multi-user transmission manner

PAPR (dB) for 26,52,106 and 242-tone RU

| | | | | | | | | | |
|---|---|---|---|---|---|---|---|---|---|
| 2.76<br>3.68<br>3.30<br>4.46 | 3.68<br>2.76<br>4.46<br>3.30 | 2.76<br>3.68<br>3.30<br>4.46 | 3.68<br>2.76<br>4.46<br>3.30 | | 2.76<br>3.68<br>3.30<br>4.46 | 3.68<br>2.76<br>4.46<br>3.30 | 3.68<br>2.76<br>4.46<br>3.30 | 2.76<br>3.68<br>3.30<br>4.46 | +1,+1<br>+1,-1<br>+1, w<br>+1, $w^2$ |
| 4.68<br>4.68<br>4.69<br>4.69 | | 4.68<br>4.68<br>4.69<br>4.69 | | 4.17<br>4.10<br>4.33<br>4.37 | 4.33<br>4.48<br>4.35<br>4.77 | | 4.68<br>4.68<br>4.69<br>4.69 | | |
| 4.89<br>4.23<br>4.79<br>4.38 | | | | | 3.93<br>4.76<br>4.73<br>4.87 | | | | |
| 5.31<br>5.32<br>5.48<br>5.46 | | | | | | | | | |

[+1, w ] ⇔ [+1, $w^5$]
[+1, $w^2$] ⇔ [+1, $w^4$]

PAPR (dB) for 26,52,106 and 242-tone RU

| | | | | | | | | | |
|---|---|---|---|---|---|---|---|---|---|
| 2.76<br>3.68<br>3.30<br>4.46 | 3.68<br>2.76<br>4.46<br>3.30 | 3.68<br>2.76<br>4.46<br>3.30 | 2.76<br>3.68<br>3.30<br>4.46 | | 3.68<br>2.76<br>4.46<br>3.30 | 2.76<br>3.68<br>3.30<br>4.46 | 3.68<br>2.76<br>4.46<br>3.30 | 2.76<br>3.68<br>3.30<br>4.46 | +1, +1<br>+1, -1<br>+1, w<br>+1, $w^2$ |
| 4.68<br>4.68<br>4.69<br>4.69 | | 4.33<br>4.48<br>4.35<br>4.77 | | 4.17<br>4.10<br>4.33<br>4.37 | 4.68<br>4.68<br>4.69<br>4.69 | | 4.68<br>4.68<br>4.69<br>4.69 | | |
| 3.93<br>4.76<br>4.73<br>4.87 | | | | | 4.89<br>4.23<br>4.79<br>4.38 | | | | |
| 5.31<br>5.32<br>5.48<br>5.46 | | | | | | | | | |

[+1, w ] ⇔ [+1, $w^5$]
[+1, $w^2$] ⇔ [+1, $w^4$]

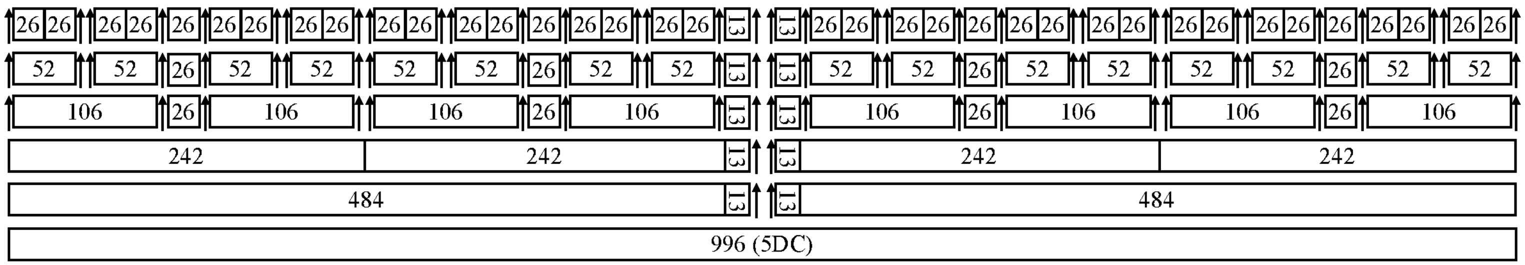

PAPR (dB) for 26,52,106,242,484 and 996- tone RU

$[+1, w] \Leftrightarrow [+1, w^5]$
$[+1, w^2] \Leftrightarrow [+1, w^4]$

+1, +1
+1, −1
+1, w
$+1, w^2$

<table>
<tr><td rowspan="5">4.17<br>4.10<br>4.33<br>4.37</td><td>2.76<br>3.68<br>3.30<br>4.46</td><td>3.68<br>2.76<br>4.46<br>3.30</td><td>2.76<br>3.68<br>3.30<br>4.46</td><td>3.68<br>2.76<br>4.46<br>3.30</td><td></td><td>3.68<br>2.76<br>4.46<br>3.30</td><td>2.76<br>3.68<br>3.30<br>4.46</td><td>3.68<br>2.76<br>4.46<br>3.30</td><td>2.76<br>3.68<br>3.30<br>4.46</td><td>2.76<br>3.68<br>3.30<br>4.46</td><td>3.68<br>2.76<br>4.46<br>3.30</td><td>2.76<br>3.68<br>3.30<br>4.46</td><td>3.68<br>2.76<br>4.46<br>3.30</td><td></td><td>3.68<br>2.76<br>4.46<br>3.30</td><td>2.76<br>3.68<br>3.30<br>4.46</td><td>3.68<br>2.76<br>4.46<br>3.30</td><td>2.76<br>3.68<br>3.30<br>4.46</td></tr>
<tr><td colspan="2">4.68<br>4.68<br>4.69<br>4.69</td><td colspan="2">4.68<br>4.68<br>4.69<br>4.69</td><td rowspan="2">2.76<br>3.68<br>3.30<br>4.46</td><td colspan="2">4.68<br>4.68<br>4.69<br>4.69</td><td colspan="2">4.68<br>4.68<br>4.69<br>4.69</td><td colspan="2">4.68<br>4.68<br>4.69<br>4.69</td><td colspan="2">4.68<br>4.68<br>4.69<br>4.69</td><td rowspan="2">2.76<br>3.68<br>3.30<br>4.46</td><td colspan="2">4.68<br>4.68<br>4.69<br>4.69</td><td colspan="2">4.68<br>4.68<br>4.69<br>4.69</td></tr>
<tr><td colspan="4">5.33<br>5.41<br>5.18<br>4.97</td><td colspan="4">5.42<br>4.85<br>4.95<br>4.68</td><td colspan="4">5.33<br>5.41<br>5.18<br>4.97</td><td colspan="4">5.42<br>4.85<br>4.95<br>4.68</td></tr>
<tr><td colspan="9">5.29<br>5.58<br>5.40<br>5.46</td><td colspan="9">5.29<br>5.58<br>5.40<br>5.46</td></tr>
<tr><td colspan="18">6.13<br>6.40<br>6.34<br>6.25</td></tr>
<tr><td colspan="19">6.01<br>5.68<br>6.08<br>5.92</td></tr>
</table>

FIG. 10

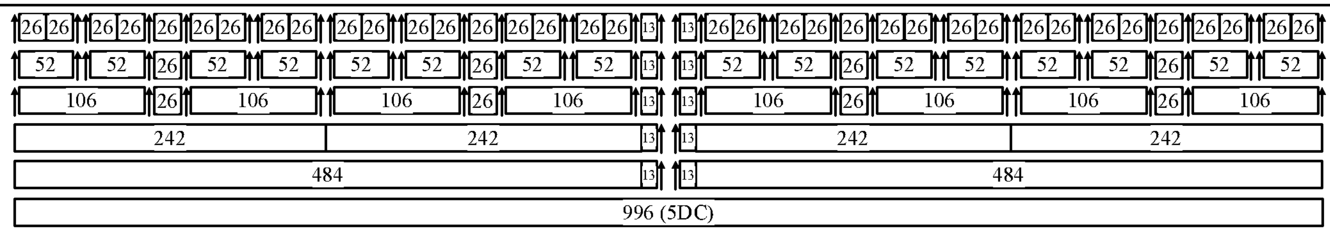

PAPR (dB) for 26, 52, 106, 242, 484 and 996-tone RU

| | | | | | | | | | | | | | | | | | | |
|---|---|---|---|---|---|---|---|---|---|---|---|---|---|---|---|---|---|---|
| 2.76<br>3.68<br>3.30<br>4.46 | 3.68<br>2.76<br>4.46<br>3.30 | 2.76<br>3.68<br>3.30<br>4.46 | 3.68<br>2.76<br>4.46<br>3.30 | | 3.68<br>2.76<br>4.46<br>3.30 | 2.76<br>3.68<br>3.30<br>4.46 | 3.68<br>2.76<br>4.46<br>3.30 | 2.76<br>3.68<br>3.30<br>4.46 | 2.76<br>3.68<br>3.30<br>4.46 | 3.68<br>2.76<br>4.46<br>3.30 | 2.76<br>3.68<br>3.30<br>4.46 | 3.68<br>2.76<br>4.46<br>3.30 | | 3.68<br>2.76<br>4.46<br>3.30 | 2.76<br>3.68<br>3.30<br>4.46 | 3.68<br>2.76<br>4.46<br>3.30 | 2.76<br>3.68<br>3.30<br>4.46 | |
| 4.68<br>4.68<br>4.69<br>4.69 | | 4.68<br>4.68<br>4.69<br>4.69 | | 2.76<br>3.68<br>3.30<br>4.46 | 4.68<br>4.68<br>4.69<br>4.69 | | 4.68<br>4.68<br>4.69<br>4.69 | | 4.68<br>4.68<br>4.69<br>4.69 | | 4.68<br>4.68<br>4.69<br>4.69 | | 2.76<br>3.68<br>3.30<br>4.46 | 4.68<br>4.68<br>4.69<br>4.69 | | 4.68<br>4.68<br>4.69<br>4.69 | | |
| 5.42<br>4.85<br>4.95<br>4.68 | | | | | 5.33<br>5.41<br>5.18<br>4.97 | | | | 5.42<br>4.85<br>4.95<br>4.68 | | | | | 5.33<br>5.41<br>5.18<br>4.97 | | | | 4.17<br>4.10<br>4.33<br>4.37 |
| 5.29<br>5.58<br>5.40<br>5.46 | | | | | | | | | 5.29<br>5.58<br>5.40<br>5.46 | | | | | | | | | |
| 6.13<br>**6.40**<br>6.34<br>6.25 | | | | | | | | | | | | | | | | | | |
| 6.01<br>5.68<br>6.08<br>5.92 | | | | | | | | | | | | | | | | | | |

METHOD FOR TRANSMITTING HE-LTF SEQUENCE AND APPARATUS

CROSS-REFERENCE TO RELATED APPLICATIONS

This application is a continuation of U.S. patent application Ser. No. 16/694,695, filed on Nov. 15, 2019, now U.S. Pat. No. 11,265,873. which is a continuation of U.S. patent application Ser. No. 15/905,567, filed on Feb. 26, 2018, now U.S. Pat. No. 10,645,687, which is a continuation of International Application No. PCT/CN2016/096973, filed on Aug. 26, 2016, which claims priority to Chinese Patent Application No. 201510532381.2, filed on Aug. 26, 2015 and Chinese Patent Application No. 201510849062.4, filed on Nov. 26, 2015. All of the afore-mentioned patent applications are hereby incorporated by reference in their entireties.

TECHNICAL FIELD

The present invention relates to the field of wireless communications technologies, and more specifically, to a method for transmitting an HE-LTF sequence and an apparatus.

BACKGROUND

With development of the mobile Internet and popularization of smart terminals, data traffic grows rapidly. With advantages of a high rate and low costs, a wireless local area network (WLAN) becomes one of the mainstream mobile broadband access technologies.

To significantly improve a service transmission rate of a WLAN system, in the next-generation Institute of Electrical and Electronics Engineers (IEEE) 802.11ax standard, on the basis of an existing orthogonal frequency division multiplexing (OFDM) technology, an orthogonal frequency division multiple access (OFDMA) technology is further used. In the OFDMA technology, a time-frequency resource of an air interface radio channel is divided into multiple orthogonal time-frequency resource blocks (RB, Resource Block); the RBs may be shared in a time domain, and may be orthogonal in a frequency domain.

In an existing WiFi system (for example, 11n or 11ac), a terminal still performs channel access by using a contention manner of carrier sense with collision avoidance. When a quantity of users increases, because channel access collisions increase, a system average throughput drops rapidly. In current work of a new WiFi standard (11ax), it is already decided to introduce an OFDMA technology in a WiFi system, to achieve an objective of improving a system average throughput in a high-density scenario. As an important part used for channel estimation in the existing WiFi system, an LTF also continues to be used in an OFDMA mode in the new WiFi standard. Therefore, in the OFDMA mode, a manner of generating an LTF becomes a research focus.

In the prior art, an 80-MHz LTF or a 160-MHz LTF in the 802.11ac standard is used as a basic template, from which values in a carrier part corresponding to a resource block scheduled by a user in an OFDMA mode are extracted, and values in a carrier part that does not correspond to the resource block are padded with 0s, so as to generate an LTF used by the user in the OFDMA mode. However, when a method in the prior art is used, a peak to average power ratio (PAPR) is relatively high.

SUMMARY

Embodiments of the present invention provide a method for sending wireless local area network information, so as to reduce a peak-to-average power ratio.

According to one aspect, a method for sending wireless local area network information is provided, including:

obtaining a corresponding HE-LTF sequence according to a bandwidth, where the HE-LTF sequence is specifically a sequence in each embodiment; and sending a corresponding sequence segment in the HE-LTF sequence according to a size and a location of an RU allocated to a station.

According to another aspect, a method for receiving a wireless local area network PPDU is provided, including:

receiving a PPDU, and obtaining a total transmission bandwidth indicated in the PPDU;

obtaining a corresponding HE-LTF sequence according to the bandwidth, where the HE-LTF sequence is specifically a sequence in each embodiment; and selecting, according to a size and a location of an RU, a corresponding HE-LTF sequence segment, as a reference sequence of the RU for channel estimation, at a receive end.

Correspondingly, an apparatus configured to execute the foregoing method is provided, and the apparatus is, for example, an AP, a STA, or a corresponding chip.

An HE-LTF sequence provided in an embodiment of the present invention is used, so that a next-generation wireless local area network has a relatively low PAPR.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 2*a* and FIG. 2*b* are schematic diagrams of PAPRs that are obtained if LTF simulation in 802.11ac continues to be used;

FIG. 3 is a simple schematic diagram of a wireless local area network according to an embodiment of the present invention;

FIG. 10 and FIG. 11 show PAPR values that are obtained by means of preferred 2×HE-LTF sequence simulation in an 80 MHz transmission;

DESCRIPTION OF EMBODIMENTS

Figure 1A:
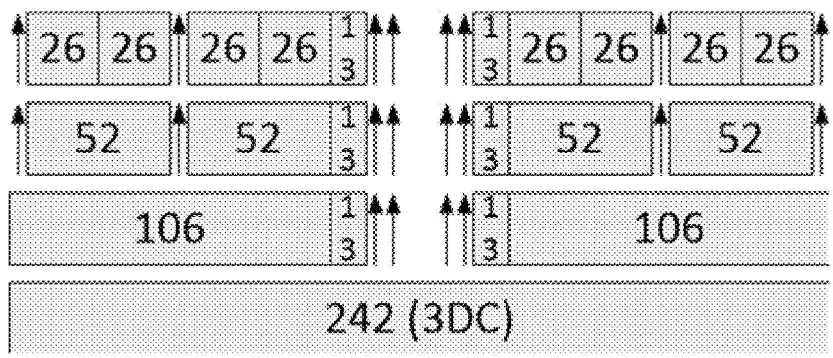
FIG. 1*a*, FIG. 1*b*, and FIG. 1*c* are tone plans in different bandwidths in an OFDMA transmission manner according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

For ease of understanding, terms that may appear in the following embodiments are described as follows:

AP Access point
HEW High efficiency WLAN
HE-LTF High efficiency Long training field
OFDMA Orthogonal Frequency Division Multiple Access
STA Station
WLAN Wireless Local Area Network An access point (AP) may also be referred to as a wireless access point, a bridge, a hotspot, or the like, and may be an access server for a communications network.

A station (STA) may be further referred to as a user, and may be a wireless sensor, a wireless communications terminal, or a mobile terminal, for example, a mobile telephone (or referred to as a "cellular" phone) that supports WiFi communications and a computer that has a wireless communication function or capability. For example, the station may be a portable, pocket-sized, handheld device with a built-in computer, in the form of a wearable, or an in-vehicle wireless communications apparatus that supports the WiFi communications, and exchanges communication data such as voice and data with a wireless access point of a communication network.

The next-generation wireless local area network standard 802.11ax intends to further improve WLAN spectrum efficiency, a throughput of an area, actual user experience, and performance in various indoor and outdoor dense network deployment environments. In addition, the solution is further required to suppress interference between devices and meet large-scale and high-load networking requirements. In conventional WiFi, an indoor channel is mainly used, an OFDM transmission manner is used, a symbol length is 3.2 μs, and a subcarrier spacing is 1/3.2 μs=312.5 kHz. In 20 MHz, a 64-FFT is used to generate an OFDM symbol, and among all 56 subcarriers, there are 52 data subcarriers and 4 subcarriers. In 40 MHz, a 128-FFT is used to generate an OFDM symbol, and among all 128 subcarriers, there are 108 data subcarriers and 6 subcarriers. When a 256-FFT is used to generate an OFDM symbol, among all 256 subcarriers, there are 234 data subcarriers and 8 subcarriers.

Figure 1B:
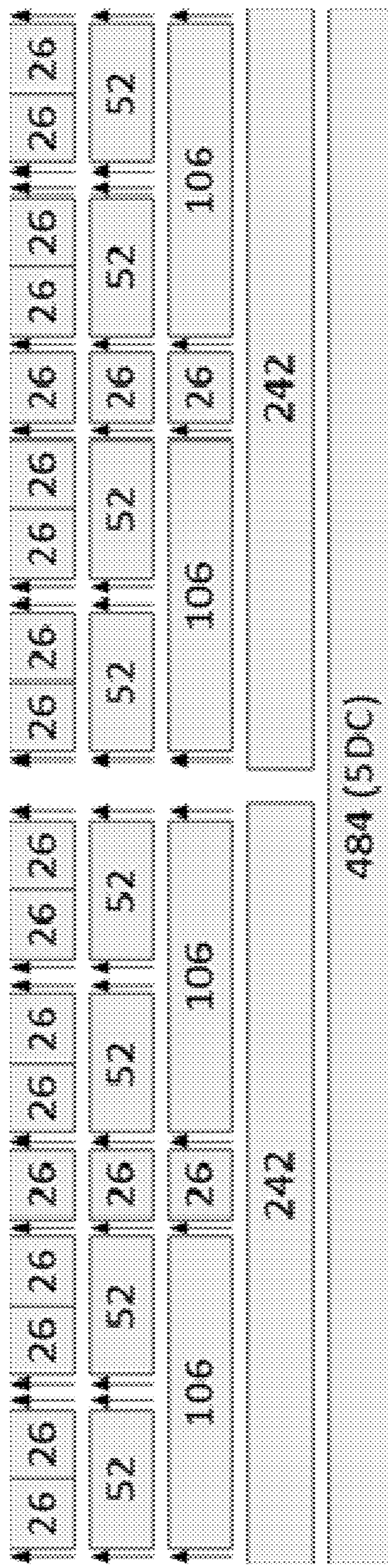
Figure 1C:
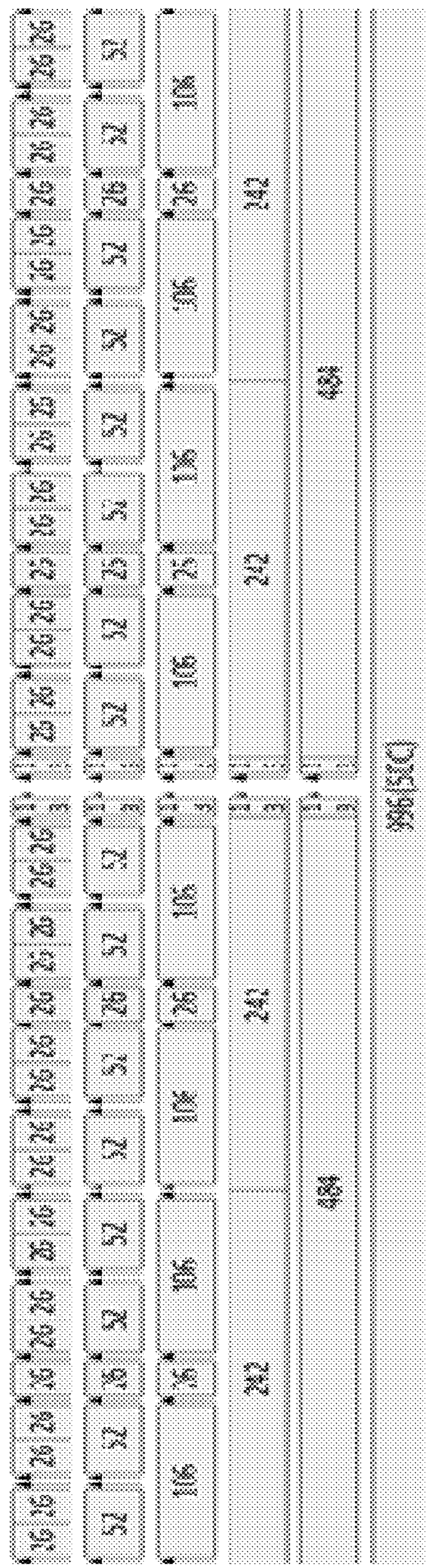

For an 802.11ax system, to support indoor and outdoor scenarios, a symbol length (4×3.2 s=12.8 μs) that is 4 times a symbol length in 802.11ac may be used, and a subcarrier spacing is 312.5/4=78.125 kHz. To support OFDMA transmission, a tone plan (distribution of subcarriers that carry data) below is used, and location relationships between different resource blocks (RU) are shown in FIG. 1*a* to FIG. 1*c*, where an arrow indicates a location of a leftover tone between RUs. A quantity of subcarriers of a large RU is the same as a total sum of a quantity of subcarriers of multiple small RUs that may be correspondingly accommodated by the large RU and a quantity of leftover subcarriers between small RUs.

Referring to FIG. 1*a*, FIG. 1*a* is a simple schematic diagram of "tone plan" that may be allocated in OFDMA in 20 MHz; FIG. 1B is a simple schematic diagram of locations of OFDMA resource blocks in 40 MHz; and FIG. 1*c* is a simple schematic diagram of locations of OFDMA resource blocks in 80 MHz. An OFDMA multi-user data packet in 802.11ax is formed by resource blocks (RU: resource unit) of various sizes. An AP allocates one RU to each user. An optional RU that may be allocated to a user is:

1) an RU formed by 26 consecutive subcarriers, comprising: 24 data subcarriers and 2 pilot subcarriers;
2) an RU formed by 52 consecutive subcarriers, comprising: 48 data subcarriers and 4 pilot subcarriers;
3) an RU formed by 106 consecutive subcarriers, comprising: 102 data subcarriers and 4 pilot subcarriers;
4) an RU formed by 242 consecutive subcarriers, comprising: 234 data subcarriers and 8 pilot subcarriers;
5) an RU formed by 484 consecutive subcarriers, comprising: 468 data subcarriers and 16 pilot subcarriers; and
6) an RU formed by 996 consecutive subcarriers, comprising: 980 data subcarriers and 16 pilot subcarriers.

A 484-RU is used in multi-user transmission of 40 MHz, and an 996-RU is used in multi-user transmission of 80/160 MHz. It may be learned that 160 MHz is formed by two 80-MHz tone plans. Locations of pilot subcarriers indicated by arrows in FIG. 1*a*, FIG. 1B, and FIG. 1*c* are locations of the foregoing pilot subcarriers.

In addition, in an 802.11ax system, for an HE-LTF used for channel estimation, a 2× mode and a 4× mode are used. The 4× mode means that subcarrier indexes, mapped by an 4×HE-LTF sequence, is the same as subcarrier indexes mapped by a resource block distribution (tone plan) of a data part. The 2× mode means that, indexes of a 2×HE-LTF sequence corresponds to indexes of a 4× HE-LTF sequence divided by 2. That is, subcarrier indexes, mapped by an 2×HE-LTF sequence, is as half of subcarrier indexes, mapped by a resource block distribution (tone plan) of a data part.

In the 802.11ax system, a tone plan of OFDMA transmission is different from a tone plan of OFDM in an existing 802.11ac system. Therefore, a VHT-LTF sequence of 20/40 defined in 802.11ac is inapplicable. In a specific case, a total subcarrier quantity 242 of 80 MHz in 802.11ac is the same as a total subcarrier quantity of 20 MHz in 802.11ax. However, it is found that when a VHT-LTF sequence is directly used in an 802.11ax 20-MHz bandwidth, a peak-to-average power ratio (PAPR) is relatively high.

Referring to FIG. 2*a* and FIG. 2*b*, it may be learned that if a VHT-LTF of 802.11ac 80 MHz is used in 802.11ax 20

MHz, a PAPR of the VHT-LTF is significantly increased as compared with a PAPR of a conventional LTF sequence, which affects power control efficiency, and further reduces precision of channel estimation.

In addition, for a tone plan of 802.11ax in 40/80 MHz, a quantity of subcarriers already exceeds a conventional sequence, and a VHT-LTF sequence of 802.11ac cannot be reused.

FIG. 3 is a simple schematic diagram of a WLAN system applied in an embodiment of the present invention. The system in FIG. 3 includes one or more access points APs 101 and one or more stations STAs 102. The access points 101 and the stations 102 perform wireless communication by using an OFDMA technology.

Figure 4:
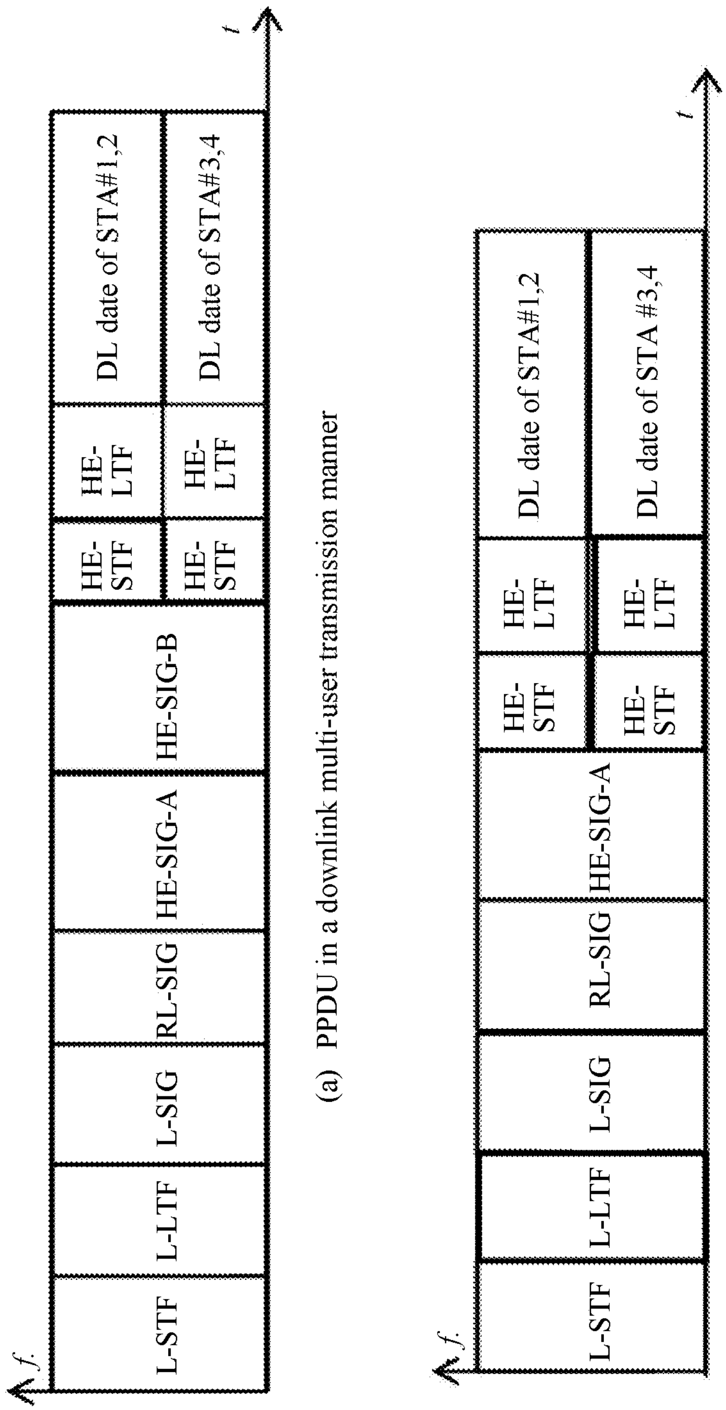
FIG. 4 is a simple schematic diagram of a data structure of a PPDU in a multi-user transmission manner according to an embodiment of the present invention.
Figure 5A:
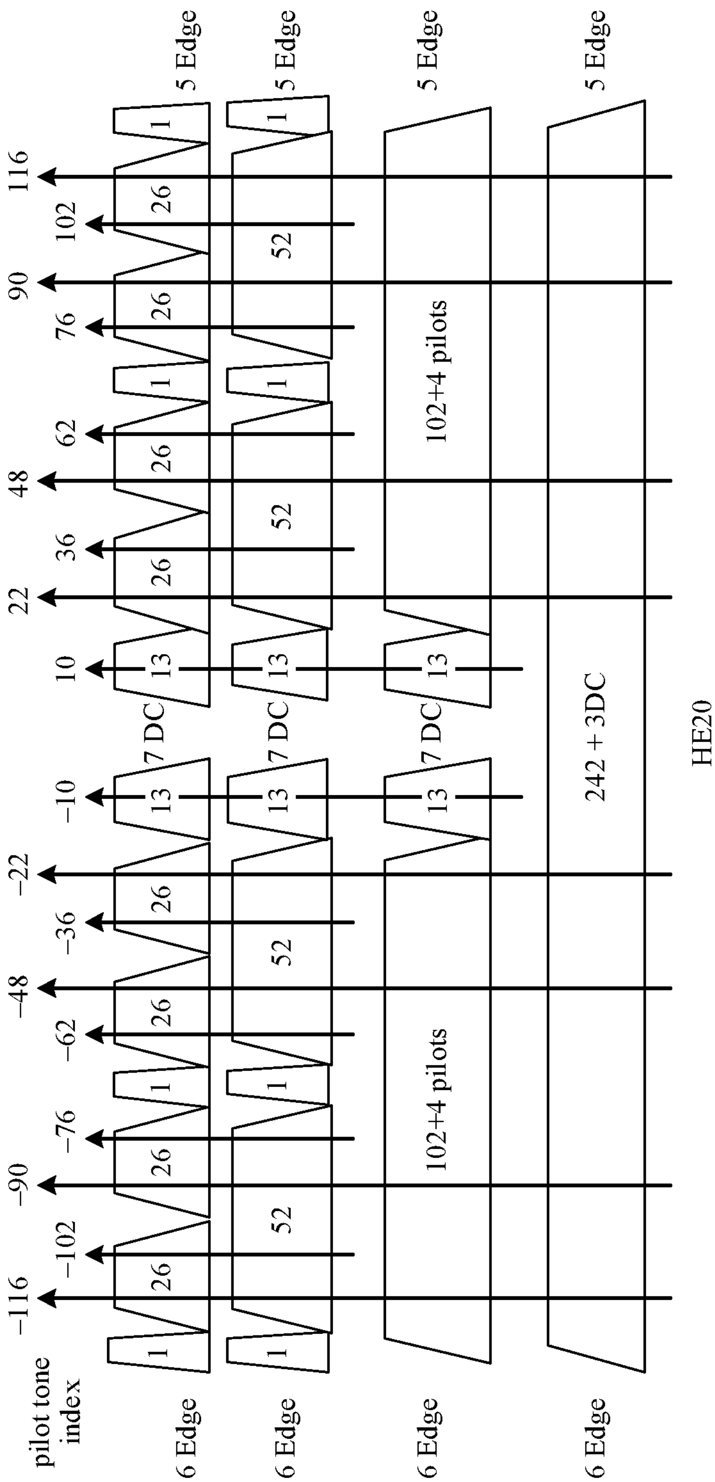
FIG. 5*a*, FIG. 5*b*, FIG. 5*c*, and FIG. 5*d* are tone plans including pilot locations in different bandwidths in an OFDMA transmission manner according to an embodiment of the present invention.
Figure 5B:
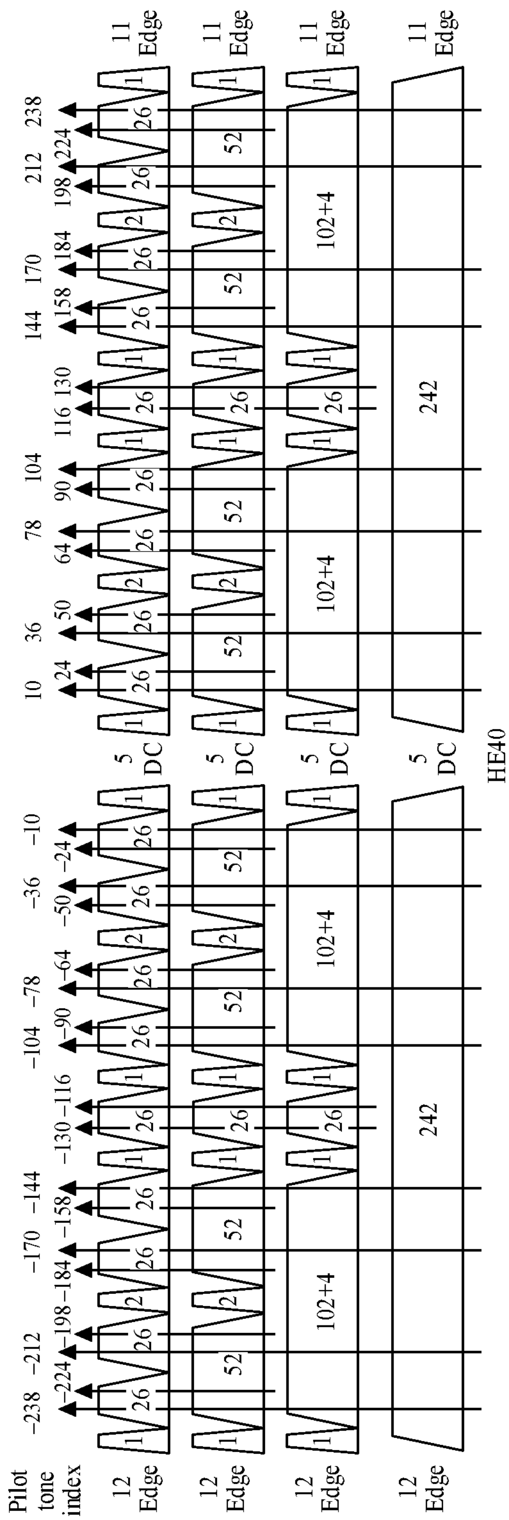
Figure 5C:
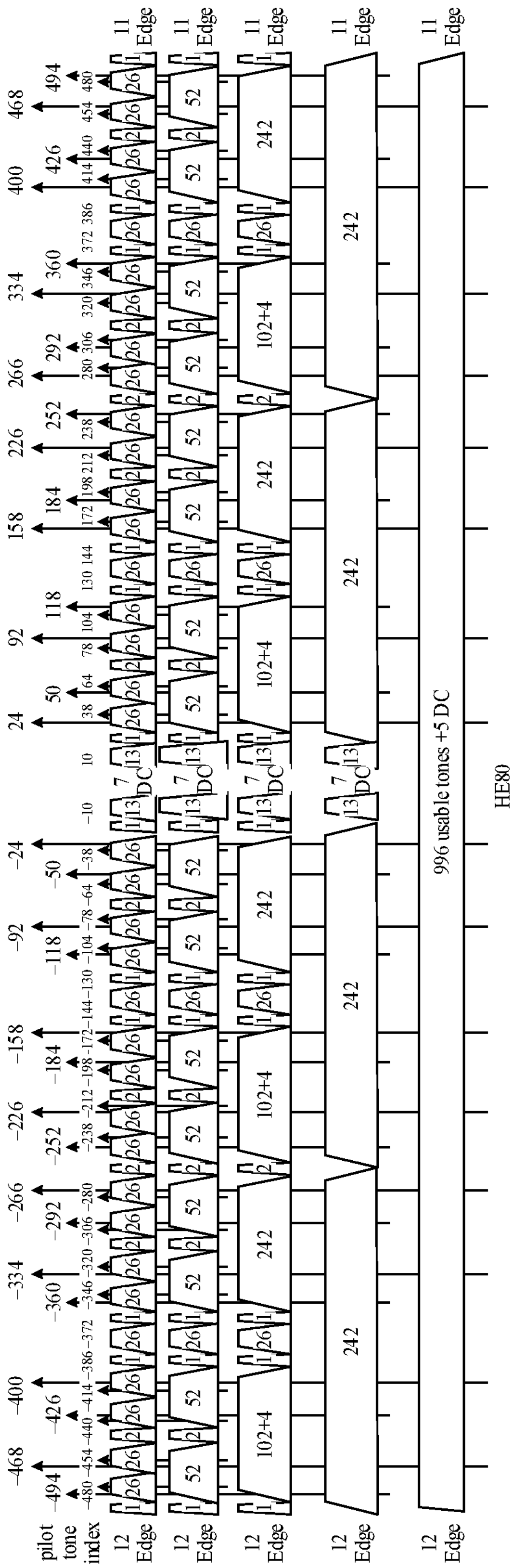
Figure 5D:
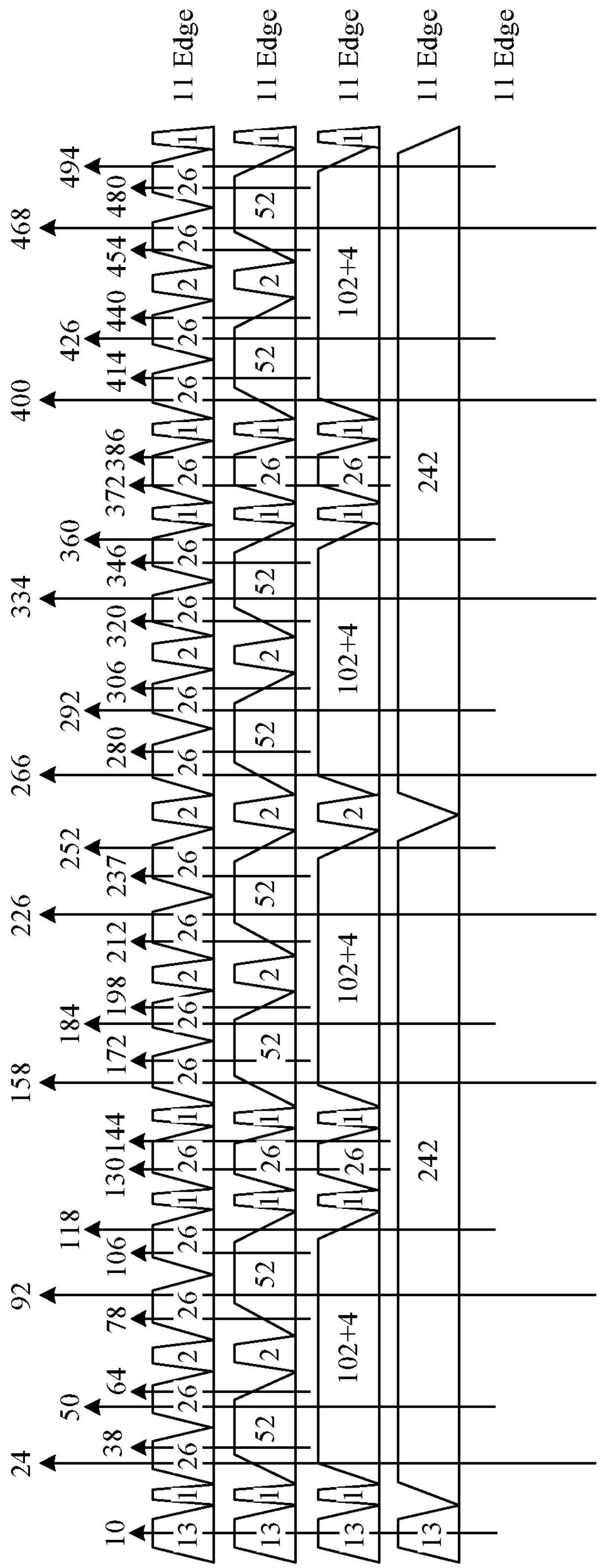

Referring to FIG. 4, FIG. 4 shows a possible frame structure of a data packet PPDU sent by an AP in the foregoing downlink WLAN system. In a specific example, the frame structure complies with related regulations in 802.11ax.

According to a data structure of a PPDU shown in FIG. 4, for a downlink multi-user PPDU sent by the AP, an HE-SIG-A includes information used to indicate a transmission bandwidth of a downlink user STA, and an HE-SIG-B includes information used to indicate a size and a location of an RU allocated to a downlink scheduled user, or further includes a STA ID corresponding to each scheduled user and other scheduling information such as a spatial flow number or modulation and coding mode. In an example, the HE-SIG-A or the HE-SIG-B may further comprise: an HE-LTF length, that is, a quantity N of symbols of an HE-LTF, used to instruct to perform alignment of multiple users.

In an additional embodiment, for each RU in a tone plan of OFDMA of an HE-LTF, a quantity of pilot subcarriers, locations of the pilot subcarriers, and a sending manner are given. For corresponding content, refer to Motion #3, Oct. 29, 2014, Removed with Motion 10, Mar. 6, 2015 below.

For example, referring to FIG. 5*a*, FIG. 5*b*, FIG. 5*c*, and FIG. 5*d*, on the basis of the tone plans shown in FIG. 1*a*, FIG. 1B, and FIG. 1*c*, locations of pilot subcarriers are given, that is, locations indicated by long arrows in FIG. 5*a*, FIG. 5*b*, FIG. 5*c*, and FIG. 5*d*. For example, the sending manner is: in single-user transmission, uplink and downlink OFDMA transmission, and downlink MU-MIMO transmission, pilots in an HE-LTF in 802.11ax are sent according to a single flow (similar to 802.11ac).

In a specific example, during uplink MU-MIMO transmission, an HE-LTF sequence of each STA is multiplied by an identification code allocated by the AP, in frequency, and the AP may estimate a CFO of each STA depending on a frequency identification code of each STA. Therefore, there is no special pilot subcarrier in an HE-LTF sequence of uplink MU-MIMO, and the HE-LTF sequence of uplink MU-MIMO is different from an HE-LTF sequence of downlink MU-MIMO.

In some less preferred embodiments, some HE-LTFs or some methods for generating an HE-LTF are provided; however, the impact of a pilot is not considered, and in the corresponding methods, a PAPR is relatively high.

For example, in a less preferred embodiment, a Barker sequence, that is, x, whose length is 13, is provided. A sequence whose length is 121 is generated according to the Barker sequence, and is represented by using $M_1$. In addition, Barker sequences whose lengths are respectively 13 and 7 are found, and are respectively represented by using $M_2$ and $M_3$. Specific sequences are represented as follows:

| | |
|---|---|
| x = [+1 +1 +1 −1 −1 −1 +1 −1 −1 +1 −1]; | % Barker 11 tones |
| $M_1$ = [−x, x, −x, −x, x, −x, −x, −x, x, x, x]; | % 121 tones |
| $M_2$ = [+1 +1 +1 +1 +1 −1 −1 +1 +1 −1 +1 −1 +1]; | % Barker 13 tones |
| $M_3$ = [+1 +1 +1 −1 −1 +1 −1]; | % Barker 7 tones. |

Next, sequences x, $M_1$, $M_2$, and $M_3$ are used to generate an HE-LTF sequence in the 2×/4× mode. The generated HE-LTF sequence is as follows:

HE-LTF sequences in the 2× mode:

20 MHz 122 tones 2× sequence:

$LTF_{242}$ (−122:2:122)=[$M_1$ (61:121), 0, $M_1$ (1:61)];

40 MHz 242 tones 2× sequence:

$LTF_{484}$ (−244:2:244)=[$M_1$, 0, 0, 0, $M_1$];

80 MHz 498 tones 2× sequence:

$LTF_{996}$ (−500:2:500)=[−$M_1$, −$M_1$, $M_3$, 0, 0, 0, $M_3$, $M_1$, −$M_1$].

HE-LTF sequences in the 4× mode:

20 MHz 242 tones 4× sequence:

$LTF_{242}$ (−122:122)=[$M_1$, 0, 0, 0, $M_1$];

40 MHz 484 tones 4× sequence:

$LTF_{484}$=[$M_1$, 0, 0, 0, 0, 0, $M_1$, −$M_1$];

80 MHz 996 tones 4× sequence:

$LTF_{996}$=[$M_1$, −$M_1$, −$M_1$, −$M_1$, $M_2$, 1, 0, 0, 0, 0, 0, 1, $M_2$, $M_1$, −$M_1$, $M_1$, $M_1$];

However, all scenarios in which pilot subcarriers and other subcarriers in the HE-LTF in FIG. 5*a*, FIG. 5*b*, FIG. 5*c*, or FIG. 5*d* are multiplied by different phases are analyzed. It may be learned that in different cases, a PAPR changes significantly. In some cases, a PAPR is relatively high. In the foregoing case, phase change of pilot subcarrier(s) corresponds to a first row in a P-matrix, and phase change of other subcarriers corresponds to a corresponding row in the P-matrix in accordance with a spatial flow. These cases may be summarized into the following four cases: if a phase of a pilot subcarrier does not change and the pilot subcarrier is always multiplied by '+1', a phase of another subcarrier changes, and the another subcarrier is separately multiplied by '+1', '-1', 'w', or '$w^2$', where w=exp (−li*2*pi/6).

Figure 6:
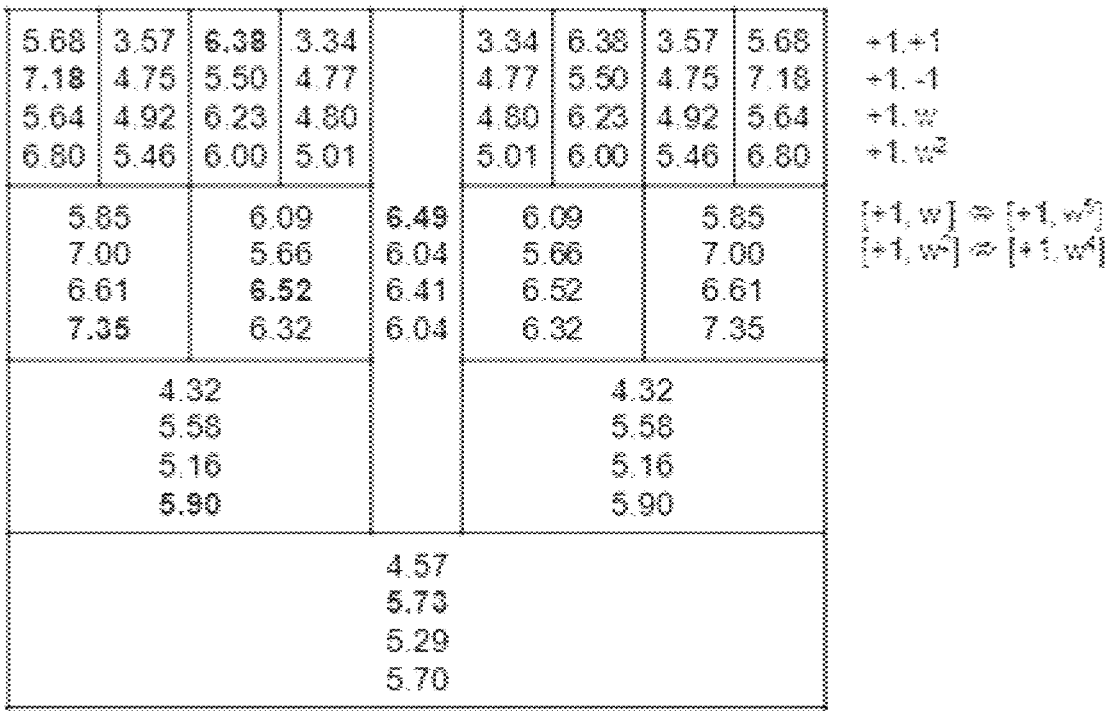
FIG. 6 is a schematic diagram of a PAPR that is obtained by means of simulation in a less preferred embodiment.

For example, in a solution in the prior art, results of a PAPR are as follows, where a phase of a pilot subcarrier does not change, and the pilot subcarrier is always multiplied by '+1', and a phase of another subcarrier changes, and the another subcarrier is separately multiplied by '+1', '−1', 'w', or '$w^2$'. A PAPR corresponding to each row is shown in FIG. 6. It may be learned that PAPRs change significantly, and some PAPRs already exceed 7 dB.

Some embodiments are provided below. In a corresponding HE-LTF sequence, because different values are set at a location of a pilot, PAPRs are all relatively low.

In some preferred embodiments, requirements such as a low storage load and easy implementation in hardware implementation may also be met.

According to an aspect, a method for sending an HE-LTF sequence is provided, including:

obtaining a corresponding HE-LTF sequence according to a bandwidth, where the HE-LTF sequence is specifically a sequence in the following embodiments; and sending, according to a size of an RU and a location of an RU that are in resource allocation information, a sequence segment at a location corresponding to the HE-LTF sequence.

Figure 7A:
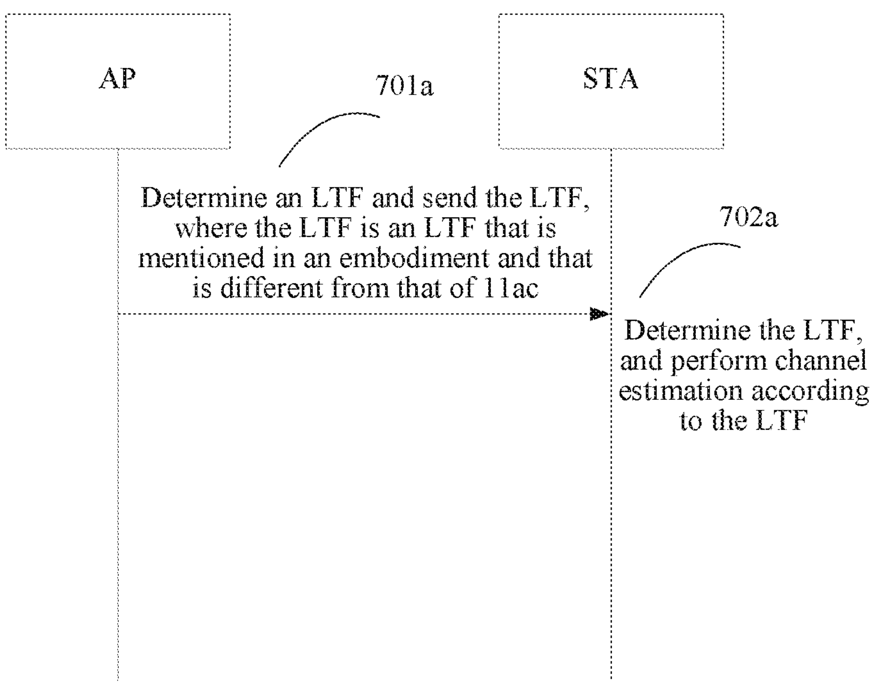
FIG. 7*a* and FIG. 7*b* are simple schematic diagrams in an uplink direction and a downlink direction in embodiments of the present invention.
Figure 7B:
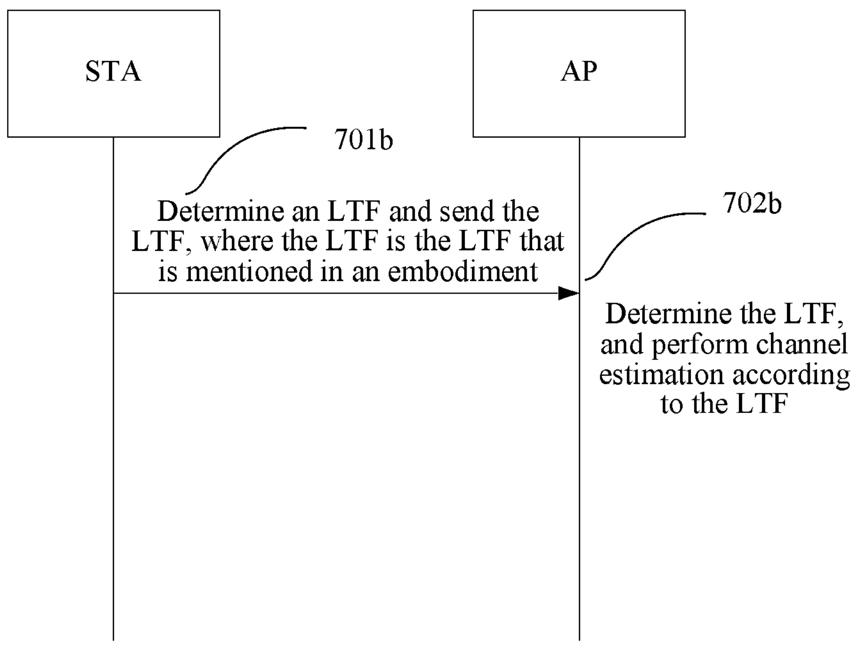

Referring to FIG. 7*a* and FIG. 7*b*, FIG. 7*a* and FIG. 7*b* are simple schematic diagrams of the foregoing method in an uplink direction and a downlink direction.

To make the foregoing method clearer, an uplink transmission procedure and a downlink transmission procedure are described below in detail.

Downlink Transmission Process:

An AP sends a data packet PPDU. For the PPDU, refer to the structure shown in FIG. 4. The downlink transmission process includes:

101: The AP obtains, according to a total transmission bandwidth, an HE-LTF sequence corresponding to the bandwidth.

The HE-LTF sequence may be stored on the AP, or may be obtained by generating according to a particular principle. For a specific example of the HE-LTF, refer to subsequent examples.

102: Obtain a corresponding HE-LTF sequence segment from the HE-LTF sequence according to a size and a location of a resource block RU allocated to a scheduled user, map the HE-LTF sequence segment to subcarriers in the allocated RU, and send the HE-LTF sequence segment.

In a preferred example, the PPDU includes multi-flow/multi-user transmission, and an HE-LTF needs to be sent on N symbols, where N should be greater than or equal to a maximum value M of a corresponding allocated total flow quantity of a user on each RU, which is denoted as N>=M, where N=1, 2, 4, 6, or 8, and M=1 to 8. The AP sequentially allocates, to each flow on an RU, a row in a P-matrix matrix whose size is N×N, where the row is used as a feature code used to distinguish a flow. Specifically, when an HE-LTF sequence of each flow on an RU is sent, a length value of a tone plan, excluding a location of a pilot subcarrier, on an $n^{th}$ symbol of an HE-LTF needs to be multiplied by an $n^{th}$ code word correspondingly used to distinguish a feature code of the flow. A person skilled in the art knows that for processing of a location of a pilot subcarrier, processing is performed according to an existing technical solution, and details are not described herein.

A method used by a downlink scheduled STA to receive data packet PPDU of 802.11ax includes:

201: A scheduled STA receives a PPDU, to obtain a total transmission bandwidth that is in an HE-SIG-A and that is indicated by an AP.

202: Obtain, according to the total transmission bandwidth, an HE-LTF sequence corresponding to the bandwidth.

The HE-LTF sequence may be stored on an AP or a STA, or may be obtained by generating according to a particular principle. For a specific example of the HE-LTF sequence, refer to subsequent embodiments.

203: The scheduled STA identifies, according to an HE-SIG-B in the PPDU and by using a STA ID of the scheduled STA, information indicating that the scheduled STA is scheduled, and obtains, from the indication information, a size and a location of an RU allocated by the AP, to a user. According to the indicated size and location of the RU, from an HE-LTF sequence corresponding to a size of the total transmission bandwidth, a corresponding HE-LTF sequence segment is selected as a reference sequence that is at a receive end, that corresponds to the RU, and that is used for channel estimation, so as to perform a subsequent channel estimation operation. A principle is not described herein again.

Uplink Transmission Process:

For sending an 802.11ax data packet PPDU by an uplink STA, refer to FIG. 4 above. An AP indicates uplink scheduling information by using a triggering frame, where the uplink scheduling information includes a transmission bandwidth of an uplink user STA, an ID of an uplink scheduled STA, and a size and a location of an RU allocated to the STA, or an HE-LTF length for alignment of multiple uplink users. The HE-LTF length is a quantity N of symbols, and a maximum value of a corresponding allocated total flow quantity of a user on each RU is M, where N>=M, N=1, 2, 4, 6, or 8, and M=1 to 8.

When the uplink STA sends a data packet PPDU of 802.11ax:

301: The STA obtains, according to a size of an indicated total transmission bandwidth, an HE-LTF sequence corresponding to the bandwidth.

The HE-LTF sequence may be stored on the AP or the STA, or may be obtained by generating according to a particular principle. For a specific example of the HE-LTF sequence, refer to subsequent embodiments.

302: The STA selects an HE-LTF sequence segment that is at a corresponding location from the HE-LTF sequence according to a size and a location of an allocated resource block RU, so as to map the HE-LTF sequence segment at subcarriers in the allocated RU to send the HE-LTF sequence segment.

303: Send N symbols according to an indicated HE-LTF length, where each symbol carries an HE-LTF.

Correspondingly, when an uplink AP receives a data packet PPDU of 802.11ax, including:

401: An AP obtains, according to a total transmission bandwidth, an HE-LTF sequence corresponding to the bandwidth.

The HE-LTF sequence may be stored on the AP, or may be obtained by generating according to a particular principle. For a specific example of the HE-LTF sequence, refer to subsequent embodiments.

402: The AP selects a corresponding HE-LTF sequence segment from the HE-LTF sequence as a reference sequence of the RU according to a size and a location of a resource block RU allocated by each uplink scheduled user (station), so as to perform channel estimation.

A person skilled in the art knows that a data packet that complies with 802.11ax may have a transmission mode or data structure of SU, MU, OFDMA, or the like. An HE-LTF sequence provided in embodiments of the present invention is not limited to being applied in transmission of a specific data structure, but instead may be applied in transmission of various data packets that comply with the 802.11ax standard. For example, in the SU transmission mode, the size and location of the resource block RU allocated to the station mentioned in the foregoing embodiments is an entire bandwidth that is used in current transmission, and details are not described herein again.

In an embodiment of the present invention, a method for generating an HE-LTF sequence is provided, and may be applied in the foregoing embodiments, especially, for sizes and locations of different resource blocks RUs in an 802.11ax OFDMA tone plan:

501: Select, in an OFDMA subcarrier layout, one or a group of basic HE-LTF sequences with a small RU length. The small RU herein may refer to the foregoing RU whose quantity of subcarriers is 26. For a 4× mode, the basic HE-LTF sequence is a sub-sequence whose length is 26. For a 2× mode, because an HE-LTF sequence number corresponds to a 4×HE-LTF sequence number divided by 2, and a basic HE-LTF sequence in the 2× mode is a sub-sequence whose length is 13.

502: According to sizes and locations of different RUs in an OFDMA tone plan, repeat the basic HE-LTF sequence, or repeat one basic HE-LTF sequence in the group of basic HE-LTF sequences, and perform phase rotation of +1 or −1 by using the basic HE-LTF sequence as a unit.

503: Concatenate several basic HE-LTF sequences that are obtained after the phase rotation, so as to generate an HE-LTF sequence of a large RU, and further pad +1 or −1 at a corresponding location according to a quantity and locations of leftover subcarriers between several small RUs corresponding to the large RU.

504: Perform concatenation from a small RU to a large RU within a transmission bandwidth, and select a PAPR sequence with an optimal PAPR of various RUs as an HE-LTF sequence corresponding to the bandwidth.

It should be noted that for different bandwidths, an HE-LTF sequence generated according to the foregoing method may be respectively stored at an AP end and a STA end in a wireless local area network, so that the HE-LTF sequence is directly used in the uplink and downlink transmission processes mentioned above.

Some more specific embodiments are described below. In the foregoing embodiments, it is mentioned that in different OFDMA subcarrier mapping manners, a transmitter (an AP or a STA) sends different HE-LTF sequences according to different bandwidths, different RU locations, and different RU sizes. The manner includes the following steps:

601: Select one HE-LTF sequence according to a bandwidth, where the one HE-LTF sequence has two forms that respectively correspond to a 2× mode and a 4× mode in 802.11ax.

Preferably, the HE-LTF in the 2× mode includes: a sub-sequence Ga, a sub-sequence Gb, and +1 or −1 that is located at a leftover subcarrier location. Ga and Gb are sequences that are formed by +1 or −1 and that have a length of 13. In a specific example, Ga and Gb are respectively:

$G_a$={+1, +1, −1, +1, +1, +1, −1, +1, −1, −1, +1, −1}

$G_b$={+1, +1, +1, −1, −1, −1, −1, +1, −1, −1, −1, +1}.

The HE-LTF in the 2× mode may further include a sequence that is generated according to Ga and Gb. Herein, the sequence generated according to Ga and Gb is referred to as a derived sequence, which specifically includes, but is not limited to:

- a sequence that is obtained after a phase of a value at a pilot location of the Ga sequence is reversed, where the sequence may be represented by $G_a^p$;
- a sequence that is obtained after a phase of a value at a pilot location of the Gb sequence is reversed, where the sequence may be represented by $G_b^p$;
- a sequence that is obtained after a phase of a value on an even-numbered subcarrier of the Ga sequence is reversed, where the sequence may be represented by $G_c$; and
- a sequence that is obtained after a phase of a value on an even-numbered subcarrier of the Gb sequence is reversed, where the sequence may be represented by $G_d$.

In addition, the derived sequence further includes: a sequence that is obtained after a phase of a value at a pilot location of a $G_c$ sequence is reversed, where the sequence may be represented by $G_c^p$; and a sequence that is obtained after a phase of a value at a pilot location of a $G_d$ sequence is reversed, where the sequence may be represented by $G_d^p$.

In addition, the derived sequence further includes: a sequence that is obtained after a phase of a value at a pilot location of a $G_c$ sequence is reversed, where the sequence may be represented by $G_c^p$; and a sequence that is obtained after a phase of a value at a pilot location of a $G_d$ sequence is reversed, where the sequence may be represented by $G_d^p$.

The foregoing derived sequences may be generated by using the following formula:

$$G_a^p = G_a \cdot * G_{ap} \quad G_b^p = G_b \cdot * G_{bp}$$

$$G_c = G_a \cdot * G_{xp} \quad G_d = G_b \cdot * G_{xp}$$

$$G_c^p = G_c \cdot * G_{ap} \quad G_d^p = G_d \cdot * G_{bp}$$

where $G_{ap}$=+{1, +1, −1, +1, +1, +1, +1, +1, +1, −1, +1, +1, +1} indicates that negation is performed at a pilot location (that is, locations of subcarriers whose sequence numbers are 3 and 10);

$G_{bp}$={+1, +1, +1, −1, +1, +1, +1, +1, +1, +1, −1, +1, +1} indicates that negation is performed at a pilot location (that is, locations of subcarriers whose sequence numbers are 4 and 11); and $G_{xp}$={+1, −1, +1, −1, +1, −1, +1, −1, +1, −1, +1, −1, +1} indicates that negation is performed at an even-numbered location.

It should be noted that the foregoing $G_a$, $G_c$, $G_a^p$, $G_c^p$, $G_b$, $G_d$, $G_b^p$, and $G_d^p$ have the following relationships.

1. A PAPR value of the Ga sequence after IFFT is equal to a PAPR value of the $G_c$ sequence after IFFT.

2. Maximum PAPR values obtained after different phase changes are performed on values at pilot locations of the sequences $G_a$, $G_c$, $G_a^p$, and $G_c^p$ and IFFT are the same.

3. Similar to $G_a$ and a derived sequence of $G_a$, $G_b$ and a derived sequence of $G_b$ have properties the same as those described in the foregoing 1 and 2.

A person skilled in the art may know that the foregoing derived sequences may have different Equation manners. For example, the foregoing $G_c$ is replaced with $\tilde{G}_a$, $G_d$ is replaced with $\tilde{G}_b$, $G_c^p$ is replaced with $\tilde{G}_a^p$, and $G_d^p$ is replaced with $\tilde{G}_b^p$. The essence thereof stays the same. Alternatively, all basic sub-sequences and corresponding derived sequences have different Equation manners.

The HE-LTF in the 4× mode includes: a sequence Ga, a sub-sequence Gb, and +1 or −1 that is located at a leftover subcarrier location. The Ga or Gb is a sequence that is formed by +1 or −1 and that has a length of 26. Specifically:

Ga=[+1+1+1+1+1+1−1+1+1+1−1+1+1−1−1−1+1−1+1−1−1+1+1−1+1−1]; and

Gb=[+1+1+1+1−1−1+1+1+1+1+1−1+1+1−1−1−1+1−1−1−1+1−1+1−1+1].

The HE-LTF in the 4× mode may further include a sequence that is generated according to Ga or Gb. Herein, the sequence that is generated according to Ga or Gb is referred to as a derived sequence, which includes, but is not limited to:

- a sequence that is obtained after a phase of a value at a pilot location of the Ga sequence is reversed, where the sequence may be denoted as $G_a^p$.
- a sequence that is obtained after a phase of a value at a pilot location of the Gb sequence is reversed, where the sequence may be denoted as $G_b^p$;
- a sequence that is obtained after a phase of a value on an even-numbered subcarrier of the Ga sequence is reversed, where the sequence may be denoted as $G_c$;
- a sequence that is obtained after a phase of a value on an even-numbered subcarrier of the Gb sequence is reversed, where the sequence may be denoted as $G_d$;
- a sequence that is obtained after a phase of a value at a pilot location of a $G_c$ sequence is reversed, where the sequence may be denoted as $G_c^p$; and a sequence that is obtained after a phase of a value at a pilot location of a $G_d$ sequence is reversed, where the sequence may be denoted as $G_d^P$.

The foregoing derived sequence may be generated by using the following formula:

$$G_a^p = G_a \cdot * G_{ap} \quad G_b^p = G_b \cdot * G_{bp}$$

$$G_c = G_a \cdot * G_{xp} \quad G_d = G_b \cdot * G_{xp}$$

$$G_c^p = G_c \cdot * G_{ap} \quad G_d^p = G_d \cdot * G_{bp}$$

where $G_{ap}$={1, 1, 1, 1, 1, −1, 1, 1, 1, 1, 1, 1, 1, 1, 1, 1, 1, 1, 1, −1, 1, 1, 1, 1, 1, 1} indicates that negation is performed at a pilot location (that is, subcarrier whose sequence numbers are 6 and 20).

$G_{bp}$={1, 1, 1, 1, 1, 1, −1, 1, 1, 1, 1, 1, 1, 1, 1, 1, 1, 1, 1, 1, −1, 1, 1, 1, 1, 1} indicates that negation is performed at a pilot location (that is, subcarriers whose sequence numbers are 7 and 21).

$G_{xp}$={+1, −1, +1, −1, +1, −1, +1, −1, +1, −1, +1, −1, +1, −1, +1, −1, +1, −1, +1, −1, +1, −1, +1, −1, +1, −1} indicates that negation is performed at an even-numbered location.

It should be noted that the foregoing $G_a$, $G_c$, $G_a^P$, $G_c^P$, $G_b$, $G_d$, $G_b^P$, and $G_d^P$ have the following relationships.

1: A PAPR value of the $G_a$ sequence after IFFT is equal to a PAPR value of the $G_c$ sequence after IFFT.

2: Maximum PAPR values obtained after different phase changes are performed on values at pilot locations of the sequences $G_a$, $G_c$, $G_a^P$, and $G_c^P$ and IFFT are the same.

3. Similar to G and a derived sequence of $G_a$, $G_b$ and a derived sequence of $G_b$ have properties the same as those described in the foregoing 1 and 2.

A person skilled in the art may know that the foregoing sub-sequences and derived sequences may have different Equation manners. For example, the foregoing $G_c$ is replaced with $\tilde{G}_a$, $G_d$ is replaced with $\tilde{G}_b$, $G_c^P$ is replaced with $\tilde{G}_a^P$, and $G_d^P$ is replaced with $\tilde{G}_b^P$. The essence thereof stays the same. Alternatively, all basic sub-sequences and corresponding derived sequences have different Equation manners, and the essence thereof stays the same.

In a preferred embodiment, for different 2×/4× modes, the HE-LTF sequence further includes different combinations of derived sequences.

For the Ga sequence, the Gb sequence, and different derived sequences that are generated according to the Ga sequence and the Gb sequence, a concatenated combination in the 2× mode includes, but is not limited to, one or any combination of the following sequences:

{+Ga, $+G_a^P$}, {+Ga, $-G_a^P$}, {$+G_a^P$, +Ga}, {$+G_a^P$, −Ga}, {$+G_c$, $+G_c^P$}, {$+G_c$, $-G_c^P$}, {$+G_c^P+G_c$}, {$+G_c^P$, $-G_c$}, {+Gb, $+G_b^P$}, {+Gb, $-G_b^P$}, {$+G_b^P$, +Gb}, {$+G_b^P$, −Gb}, {$+G_d$, $+G_d^P$}, {$+G_d$, $-G_d^P$}, {$+G_d^P$, $+G_d$}, and {$+G_d^P$, $G_d$}.

For the Ga sequence, the Gb sequence, and different derived sequences that are generated according to the Ga sequence and the Gb sequence, a concatenated combination in the 4× mode includes, but is not limited to, one or any combination of the following sequences:

{+Ga, $+G_a^P$}, {+Ga, $-G_a^P$}, {$+G_a^P$, +Ga}, {$+G_a^P$, −Ga}, {−Ga, $-G_a^P$}, {−Ga, $+G_a^P$}, {$-G_a^P$, −Ga}, {$-G_a^P$, +Ga}, {$+G_c$, $+G_c^P$}, {$+G_c$, $-G_c^P$}, {$+G_c^P$, $+G_c$}, {$+G_c^P$, $-G_c$}, {$-G_c$, $-G_c^P$}, {$-G_c$, $+G_c^P$}, {$-G_c^P$, $-G_c$}, {$-G_c^P$, $+G_c$}, {+Gb, $+G_b^P$}, {+Gb, $-G_b^P$}, {$+G_b^P$, +Gb}, {$+G_b^P$, −Gb}, {−Gb, $-G_b^P$}, {−Gb, $+G_b^P$}, {$-G_b^P$, −Gb}, {$-G_b^P$, +Gb}, {$+G_d$, $+G_d^P$}, {$+G_d$, $-G_d^P$}, {$+G_d^P$, $+G_d$}, {$+G_d^P$, $-G_d$}, {$-G_d$, $-G_d^P$}, {$-G_d+G_d^P$}, {$-G_d^P$, $-G_d$}, and {$-G_d^P$, $+G_d$}.

Certainly, according to different Equation manners of a sequence, the foregoing concatenated combination may also have a corresponding different Equation manner, and content of the different Equation manner is substantially the same.

Herein, it should be noted that in an AP or a STA in a wireless local area network, only the sub-sequence Ga and the sub-sequence Gb may be stored. When a PPDU needs to be sent, an HE-LTF sequence is generated and is then sent, or the foregoing HE-LTF sequence may also be directly stored in the AP or STA, and the HE-LTF sequence is sent on a corresponding subcarrier when necessary.

602: Send the HE-LTF sequence according to a size of an RU and a location of an RU that are in resource allocation information.

Specifically, with reference to tone plans in FIG. 1*a*, FIG. 1*b*, and FIG. 1*c*, a sub-sequence segment at a corresponding location of an HE-LTF sequence is placed on a subcarrier at the corresponding location and is then sent.

Some more specific HE-LTF sequences are provided below, and these sequences all have the foregoing feature that a PAPR is relatively low.

Embodiment 1

There are 128 subcarriers on a 2× symbol of a 20-MHz bandwidth in the 2× mode. According to different resource block sizes, as shown in FIG. 1*a*, an RU size may be 13, 26, 54, or 121 subcarriers.

There are many types of 2×HE-LTF sequences in an 20-MHz transmission. Only several types of preferred HE-LTF sequences are listed below.

$$HELTF_{2x}(-122{:}2{:}122) =$$
$$\{+1, +G_a, -G_a^p, +G_b, +G_b^p, -1, -1, +1, -1, -1, +1, -1, +1, 0,$$
$$-1, -1, -1, +1, +1, -1, -1, -1, +G_c, -G_c^p, -G_b^p, -G_b, -1\}.$$

A person skilled in the art knows that −122:2:122 means subcarriers with even indexes in indexes −122 to 122, i.e., subcarriers with indexes {−122, −120, . . . , −2, 0, +2, . . . , +120, +122}. Values (mapped) on the above subcarriers are elements at corresponding locations in the foregoing sequence. Values (mapped) on subcarriers with other locations (indexes) are 0. Subsequently, such an Equation manner will not be described repeatedly.

The HE-LTF sequence includes the Ga sequence, the Gb sequence, sequences $G_a^P$, $G_b^P$, $G_c$, and $G_c^P$ that are generated according to the Ga sequence and the Gb sequence (for specific content, refer to the foregoing descriptions), and +1 or −1 that is located at a leftover subcarrier location, and may further include consecutive $+G_a$, $-G_a^P$, consecutive $+G_b$, $+G_b^P$, consecutive $+G_c$, $-G_c^P$, consecutive $-G_b^P$, $-G_b$, or the like, where $G_a$={+1, +1, +1, −1, +1, +1, +1, −1, +1, −1, −1, +1, −1} and $G_b$={+1, +1, +1, −1, −1, −1, −1, +1, −1, −1, −1, −1, −1}.

For details and generating processes of the foregoing sequences, refer to the foregoing descriptions of the 2×HE-LTF sequence.

More specifically, the foregoing 2×HE-LTF sequence may be directly stored as:

$$HELTF_{2x}(-122:2:122) = [+1, +1, +1, +1, -1, +1, +1, +1, -1, +1, -1,$$
$$-1, +1, -1, -1, -1, +1, +1, -1, -1, -1, +1, -1, -1, +1, -1, +1,$$
$$+1, +1, +1, -1, -1, -1, -1, +1, -1, -1, -1, +1, -1, +1, +1, +1,$$
$$+1, -1, -1, -1, +1, -1, -1, +1, +1, -1, -1, -1, +1, -1, -1, +1,$$
$$-1, +1, 0, -1, -1, -1, +1, +1, -1, -1, -1, +1, -1, +1, +1, +1,$$
$$-1, +1, +1, +1, +1, -1, -1, -1, -1, +1, +1, -1, -1, +1, -1, -1,$$
$$-1, +1, +1, +1, +1, -1, -1, -1, -1, +1, +1, +1, -1, +1, +1, -1,$$
$$-1, +1, -1, -1, -1, +1, +1, +1, +1, -1, +1, +1, +1, -1, +1, -1].$$

Figure 8A:
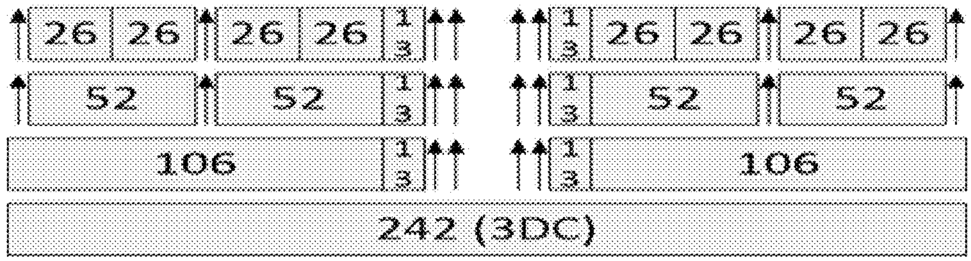
FIG. 8*a* and FIG. 8*b* show PAPR values that are obtained by means of preferred 2×HE-LTF sequence simulation in a 20-MHz bandwidth.

FIG. 8*a* shows PAPR values when the foregoing HE-LTF sequence is used in an 20-MHz bandwidth transmission. It may be learned, according to the group of PAPR values, that when different rotational phases are introduced in pilot subcarriers and other subcarriers, PAPR values are still very small.

The first group of PAPR values is sequentially PAPR values corresponding to 26-subcarrier resource blocks from left to right. Values in the first row, 2.76, 3.68, 2.76, 3.68, . . . , are PAPR values corresponding to an HE-LTF sequence when values at data locations are all multiplied by +1 and values at pilot locations are all multiplied by +1, and sequentially from left to right in the first row, 2.76 is a PAPR value corresponding to a first 26-subcarrier resource block, 3.68 is a PAPR value corresponding to a second 26-subcarrier resource block from left to right, and so on. Values in the second row, 3.67, 2.76, 3.68, 2.76, . . . , are PAPR values corresponding to an HE-LTF sequence when values at data locations are all multiplied by −1 and values at pilot locations are all multiplied by +1, and sequentially from left to right in the second row, 3.68 is a PAPR value corresponding to a first 26-subcarrier resource block, 2.76 is a PAPR value corresponding to a second 26-subcarrier resource block from left to right, and so on. Values in the third row, 3.30, 4.46, 3.30, 4.46, . . . , are PAPR values corresponding to an HE-LTF sequence when values at data locations are all multiplied by w and values at pilot locations are all multiplied by +1, and sequentially from left to right in the third row, 3.30 is a PAPR value corresponding to a first 26-subcarrier resource block, 4.46 is a PAPR value corresponding to a second 26-subcarrier resource block from left to right, and so on. Values in the fourth row, 4.46, 3.30, 4.46, 3.30, . . . , are PAPR values corresponding to an HE-LTF sequence when values at data locations are all multiplied by $w^2$ and values at pilot locations are all multiplied by +1, and sequentially from left to right in the fourth row, 4.46 is a PAPR value corresponding to a first 26-subcarrier resource block, 3.30 is a PAPR value corresponding to a second 26-subcarrier resource block from left to right, and so on.

The second group of PAPR values is sequentially PAPR values corresponding to 52-subcarrier resource blocks in a second row from left to right. Values in the first row, 4.68, 4.68, 4.33, 4.68, . . . , are PAPR values corresponding to an HE-LTF sequence when values at data locations are all multiplied by +1 and values at pilot locations are all multiplied by +1, and sequentially from left to right in the second row, the first 4.68 is a PAPR value corresponding to a first 52-subcarrier resource block, the second 4.68 is a PAPR value corresponding to a second 52-subcarrier resource block from left to right, and so on.

Values in the second row, 4.68, 4.68, 4.48, and 4.68, are PAPR values corresponding to an HE-LTF sequence when values at data locations are all multiplied by −1 and values at pilot locations are all multiplied by +1, and sequentially from left to right in the second row, the first 4.68 is a PAPR value corresponding to a first 52-subcarrier resource block, the second 4.68 is a PAPR value corresponding to a second 52-subcarrier resource block from left to right, and so on. Values in the third row, 4.69, 4.69, 4.35, and 4.69, are PAPR values corresponding to an HE-LTF sequence when values at data locations are all multiplied by w and values at pilot locations are all multiplied by +1, and sequentially from left to right in the third row, the first 4.69 is a PAPR value corresponding to a first 52-subcarrier resource block, the second 4.69 is a PAPR value corresponding to a second 52-subcarrier resource block from left to right, and so on. Values in the fourth row, 4.69, 4.69, 4.77, and 4.69, are PAPR values corresponding to an HE-LTF sequence when values at data locations are all multiplied by $w^2$ and values at pilot locations are all multiplied by +1, and sequentially from left to right in the fourth row, the first 4.69 is a PAPR value corresponding to a first 52-subcarrier resource block, the second 4.69 is a PAPR value corresponding to a second 52-subcarrier resource block from left to right, and so on.

The third group of PAPR values is sequentially PAPR values corresponding to 106-subcarrier resource blocks in the third row from left to right. Values in the first row, 4.89 and 3.93, are PAPR values corresponding to an HE-LTF sequence when values at data locations are all multiplied by +1 and values at pilot locations are all multiplied by +1, and sequentially from left to right in the third row, 4.89 is a PAPR value corresponding to a first 106-subcarrier resource block, and 3.93 is a PAPR value corresponding to a second 106-subcarrier resource block from left to right. Values in the second row, 4.23 and 4.76, are PAPR values corresponding to an HE-LTF sequence when values at data locations are all multiplied by −1 and values at pilot locations are all multiplied by +1, and sequentially from left to right in the second row, 4.23 is a PAPR value corresponding to a first 106-subcarrier resource block, and 4.76 is a PAPR value corresponding to a second 106-subcarrier resource block from left to right. Values in the third row, 4.79 and 4.73, are PAPR values corresponding to an HE-LTF sequence when values at data locations are all multiplied by w and values at pilot locations are all multiplied by +1, and sequentially from left to right in the third row, 4.79 is a PAPR value corresponding to a first 106-subcarrier resource block, and 4.73 is a PAPR value corresponding to a second 106-subcarrier resource block from left to right. Values in the fourth row, 4.38 and 4.87, are PAPR values corresponding to an HE-LTF sequence when values at data locations are all multiplied by $w^2$ and values at pilot locations are all multiplied by +1, and sequentially from left to right in the fourth row, 4.38 is a PAPR value corresponding to a first 106-subcarrier resource block, and 4.87 is a PAPR value corresponding to a second 106-subcarrier resource block from left to right.

The fourth group of values, 5.31, 5.32, 5.48, and 5.46, are PAPR values corresponding to 242-subcarrier resource blocks in a fourth row, where the first 5.31 is a PAPR value corresponding to an HE-LTF sequence when values at data locations are all multiplied by +1 and values at pilot locations are all multiplied by +1; the second 5.32 is a PAPR value corresponding to an HE-LTF sequence when values at data locations are all multiplied by −1 and values at pilot locations are all multiplied by +1; the third 5.48 is a PAPR value corresponding to an HE-LTF sequence when values at data locations are all multiplied by w and values at pilot locations are all multiplied by +1; the first 5.46 is a PAPR value corresponding to an HE-LTF sequence when values at data locations are all multiplied by $w^2$ and values at pilot locations are all multiplied by +1.

A second HE-LTF sequence in the 2× mode:

$$HELTF_{2x}(-122{:}2{:}122) =$$
$$\{+1, -G_c, -G_c^p, -G_d, +G_d^p, +1, -1, -1, -1, +1, +1, +1, +1,$$
$$0, -1, +1, -1, -1, +1, +1, -1, +1, +G_a, +G_a^p, -G_d^p, +G_d, -1\}.$$

The HE-LTF sequence in the 2× mode includes the Ga sequence and sequences $G_c$, $G_a^p$, $G_c^p$, $G_d$ and $G_d^p$ that are generated according to the Ga sequence and the Gb sequence, and +1 or −1 that is located at leftover subcarrier locations. For the content of the foregoing sequences, refer to the foregoing embodiments, and details are not described again.

Further, the HE-LTF sequence further includes consecutive $-G_c$, $-G_c^p$ or consecutive $+G_a$, $+G_a^p$, (or for example, the consecutive $-G_d$, $-G_d^p$ listed in the foregoing sequence, consecutive $+G_a$, $+G_a^p$, or consecutive $-G_d^p$, $+G_d$).

Certainly, the foregoing HE-LTF sequence in the 2× mode may be directly stored as:

$$HELTF_{2x}(-122{:}2{:}122) = [+1, -1, +1, -1, -1, -1, +1, -1, -1, -1, -1,$$
$$+1, +1, +1, -1, +1, +1, -1, -1, +1, -1, -1, -1, +1, +1, +1, +1,$$
$$-1, +1, -1, -1, +1, -1, +1, +1, +1, -1, +1, +1, +1, +1, -1, +1,$$
$$-1, -1, +1, -1, -1, -1, +1, +1, -1, -1, +1, -1, -1, -1, +1, +1,$$
$$+1, +1, 0, -1, +1, -1, -1, +1, +1, -1, +1, +1, +1, +1, -1, +1,$$
$$+1, +1, -1, +1, -1, -1, +1, -1, +1, +1, -1, -1, +1, +1, +1, -1,$$
$$+1, +1, -1, +1, -1, -1, +1, -1, +1, +1, -1, +1, +1, +1, -1, -1,$$
$$+1, +1, +1, -1, +1, +1, -1, +1, -1, -1, -1, +1, -1, -1, -1, -1].$$

PAPR values obtained by using the foregoing HE-LTF sequence are the same as those shown in FIG. 8*a*.

A third HE-LTF sequence in the 2× mode:

$$HELTF_{2x}(-122{:}2{:}122) =$$
$$\{+1, +G_a, -G_a^p, +G_d^p, +G_d, -1, +1, -1, -1, +1, +1, -1, +1,$$
$$0, -1, -1, -1, -1, +1, +1, +1, -1, +G_a^p, -G_a, -G_b^p, -G_b, -1\}.$$

The HE-LTF sequence includes the Ga sequence and the Gb sequence, sequences $G_a^p$, $G_d^p$, $G_d$, and $G_b^p$ that are generated according to the Ga sequence and the Gb sequence, and +1 or −1 that are located at leftover subcarrier locations. Further, the HE-LTF sequence may further include consecutive $+G_a$, $-G_a^p$, consecutive $+G_d^p$, $+G_d$, consecutive $+G_a^p$, $-G_a$, and consecutive $-G_b^p$, $-G_b$. For the specific content of each sequence, refer to the foregoing embodiments, and details are not described again.

The HE-LTF sequence in the foregoing 2× mode may be directly stored as:

$$HELTF_{2x}(-122{:}2{:}122) = [+1, +1, +1, +1, -1, +1, +1, +1, -1, +1, -1,$$
$$-1, +1, -1, -1, -1, +1, +1, -1, -1, -1, +1, -1, -1, +1, -1, +1,$$
$$+1, -1, +1, -1, -1, +1, -1, -1, -1, +1, +1, -1, -1, +1, -1, +1,$$
$$+1, -1, +1, -1, -1, -1, +1, -1, -1, -1, -1, +1, -1, -1, +1, +1,$$
$$-1, +1, 0, -1, -1, -1, -1, +1, +1, +1, -1, +1, +1, -1, -1, +1,$$
$$+1, +1, -1, +1, +1, -1, +1, -1, -1, -1, -1, +1, -1, -1, -1, +1,$$
$$-1, +1, +1, -1, +1, -1, -1, -1, -1, +1, +1, +1, -1, +1, +1, -1,$$
$$-1, +1, -1, -1, -1, +1, +1, +1, +1, -1, +1, +1, +1, -1, +1, -1].$$

Figure 8B:
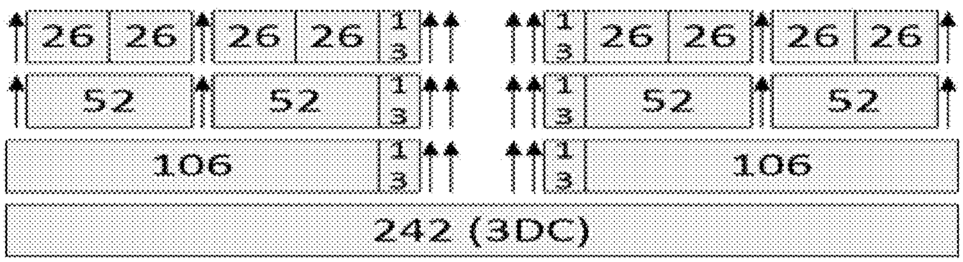

FIG. 8*b* shows PAPR values of an HE-LTF sequence in the 20-MHz bandwidth. It may be learned, according to the group of PAPR values, that when different rotational phases are introduced in pilot subcarriers and other subcarriers, PAPR values are still very small.

The first group of values is sequentially PAPR values corresponding to 26-subcarrier resource blocks from left to right. Values in the first row, 2.76, 3.68, 2.76, 3.68, . . . , are PAPR values corresponding to an HE-LTF sequence when values at data locations are all multiplied by +1 and values at pilot locations are all multiplied by +1, and sequentially from left to right in the first row, 2.76 is a PAPR value corresponding to a first 26-subcarrier resource block, 3.68 is a PAPR value corresponding to a second 26-subcarrier resource block from left to right, and so on. Values in the second row, 3.68, 2.76, 3.68, 2.76, . . . , are PAPR values corresponding to an HE-LTF sequence when values at data locations are all multiplied by −1 and values at pilot locations are all multiplied by +1, and sequentially from left to right in the second row, 3.68 is a PAPR value corresponding to a first 26-subcarrier resource block, 2.76 is a PAPR value corresponding to a second 26-subcarrier resource block from left to right, and so on. Values in the third row, 3.30, 4.46, 4.46, 3.30, . . . , are PAPR values corresponding to an HE-LTF sequence when values at data locations are all multiplied by w and values at pilot locations are all multiplied by +1, and sequentially from left to right in the third row, 3.30 is a PAPR value corresponding to a first 26-subcarrier resource block, 4.46 is a PAPR value corresponding to a second 26-subcarrier resource block from left to right, and so on. Values in the fourth row, 4.46, 3.30, 3.30, 4.46, . . . , are PAPR values corresponding to an HE-LTF sequence when values at data locations are all multiplied by $w^2$ and values at pilot locations are all multiplied by +1, and sequentially from left to right in the fourth row, 4.46 is a PAPR value corresponding to a first 26-subcarrier resource block, 3.30 is a PAPR value corresponding to a second 26-subcarrier resource block from left to right, and so on.

The second group of values is sequentially PAPR values corresponding to 52-subcarrier resource blocks in a second row from left to right. Values in the first row, 4.68, 4.33, 4.68, and 4.68, are PAPR values corresponding to an HE-LTF sequence when values at data locations are all multiplied by +1 and values at pilot locations are all multiplied by +1, and sequentially from left to right in the second row, the first 4.68 is a PAPR value corresponding to the first 52-subcarrier resource block, the second 4.33 is a PAPR value corresponding to a second 52-subcarrier resource block from left to right, and so on.

Values in the second row, 4.68, 4.48, 4.68, and 4.68, are PAPR values corresponding to an HE-LTF sequence when values at data locations are all multiplied by −1 and values at pilot locations are all multiplied by +1, and sequentially from left to right in the second row, the first 4.48 is a PAPR value corresponding to a first 52-subcarrier resource block, the second 4.68 is a PAPR value corresponding to a second 52-subcarrier resource block from left to right, and so on. Values in the third row, 4.69, 4.35, 4.69, and 4.69, are PAPR values corresponding to an HE-LTF sequence when values at data locations are all multiplied by w and values at pilot locations are all multiplied by +1, and sequentially from left to right in the third row, the first 4.69 is a PAPR value corresponding to a first 52-subcarrier resource block, the second 4.35 is a PAPR value corresponding to a second 52-subcarrier resource block from left to right, and so on. Values in the fourth row, 4.69, 4.77, 4.69, 4.69, are PAPR values corresponding to an HE-LTF sequence when values at data locations are all multiplied by $w^2$ and values at pilot locations are all multiplied by +1, and sequentially from left to right in the fourth row, the first 4.69 is a PAPR value corresponding to a first 52-subcarrier resource block, the second 4.77 is a PAPR value corresponding to a second 52-subcarrier resource block from left to right, and so on.

The third group of values is sequentially from left to right PAPR values corresponding to 106-subcarrier resource blocks in a third row. Values in the first row, 3.93 and 4.89, are PAPR values corresponding to an HE-LTF sequence when values at data locations are all multiplied by +1 and values at pilot locations are all multiplied by +1, and sequentially from left to right in the third row, 3.93 is a PAPR value corresponding to a first 106-subcarrier resource block, and 4.89 is a PAPR value corresponding to a second 106-subcarrier resource block from left to right. Values in the second row, 4.76 and 4.23, are PAPR values corresponding to an HE-LTF sequence when values at data locations are all multiplied by −1 and values at pilot locations are all multiplied by +1, and sequentially from left to right in the second row, 4.76 is a PAPR value corresponding to a first 106-subcarrier resource block, and 4.23 is a PAPR value corresponding to a second 106-subcarrier resource block from left to right. Values in the third row, 4.73 and 4.79, are PAPR values corresponding to an HE-LTF sequence when values at data locations are all multiplied by w and values at pilot locations are all multiplied by +1, and sequentially from left to right in the third row, 4.73 is a PAPR value corresponding to a first 106-subcarrier resource block, and 4.79 is a PAPR value corresponding to a second 106-subcarrier resource block from left to right. Values in the fourth row, 4.87 and 4.38, are PAPR values corresponding to an HE-LTF sequence when values at data locations are all multiplied by $w^2$ and values at pilot locations are all multiplied by +1, and sequentially from left to right in the fourth row, 4.87 is a PAPR value corresponding to a first 106-subcarrier resource block, and 4.38 is a PAPR value corresponding to a second 106-subcarrier resource block from left to right.

The fourth group of values, 5.31, 5.32, 5.48, and 5.46, are PAPR values corresponding to 242-subcarrier resource blocks in a fourth row. The first 5.31 is a PAPR value corresponding to an HE-LTF sequence when values at data locations are all multiplied by +1 and values at pilot locations are all multiplied by +1. The second 5.32 is a PAPR value corresponding to an HE-LTF sequence when values at data locations are all multiplied by −1 and values at pilot locations are all multiplied by +1. The third 5.48 is a PAPR value corresponding to an HE-LTF sequence when values at data locations are all multiplied by w and values at pilot locations are all multiplied by +1. The first 5.46 is a PAPR value corresponding to an HE-LTF sequence when values at data locations are all multiplied by $w^2$ and values at pilot locations are all multiplied by +1.

A fourth HE-LTF sequence in the 2× mode:

$$HELTF_{2x}(-122{:}2{:}122) =$$
$$\{+1, -G_c, -G_c^p, -G_b^p, +G_b, +1, +1, +1, -1, -1, +1, +1, +1,$$
$$0, -1, +1, -1, +1, +1, -1, +1, +1, +G_c^p, +G_c, -G_d^p, +G_d, -1\}.$$

The HE-LTF sequence includes the Gb sequence, sequences $G_c$, $G_c^P$, $G_b^P$, $G_d^P$, and $G_d$ that are generated according to the Ga sequence and the Gb sequence, and +1 or −1 that is located at a leftover subcarrier location. Further, the HE-LTF sequence may further include consecutive $-G_c$, $-G_c^P$, consecutive $-G_b^P$, $+G_b$, consecutive $+G_c^P$, $+G_c$, or consecutive $-G_d^P$, $+G_d$.

In addition to using another sequence Equation manner, the HE-LTF sequence may also be directly stored as:

$$HELTF_{2x}(-122{:}2{:}122) = [+1, -1, +1, -1, -1, -1, +1, -1, -1, -1, -1,$$
$$+1, +1, +1, -1, +1, +1, -1, -1, +1, -1, -1, -1, +1, +1, +1, +1,$$
$$-1, -1, -1, -1, +1, +1, +1, -1, +1, +1, -1, -1, +1, +1, +1, +1,$$
$$-1, -1, -1, -1, +1, -1, -1, -1, +1, -1, +1, +1, +1, -1, -1, +1,$$
$$+1, +1, 0, -1, +1, -1, +1, +1, -1, +1, +1, +1, -1, -1, +1, +1,$$
$$-1, +1, +1, +1, -1, -1, -1, -1, +1, -1, +1, +1, +1, -1, +1, +1,$$
$$+1, +1, -1, -1, -1, -1, +1, -1, +1, +1, -1, +1, +1, +1, -1, -1,$$
$$+1, +1, +1, -1, +1, +1, -1, +1, -1, -1, -1, +1, -1, -1, -1, -1]$$

PAPR values obtained by using the foregoing HE-LTF sequence are the same as those shown in FIG. 8*b*, and details are not described herein again.

Embodiment 2

There are 512 subcarriers on a 2× symbol of a 40-MHz bandwidth. According to different resource block sizes, as shown in FIG. 1*b*, an RU size may be 26, 52, 106, 242, or 484 subcarriers.

There are many types of HE-LTF sequences in the 40-MHz 484-subcarrier 2× mode. Only several types of the HE-LTF sequences are listed below.

A first HE-LTF sequence in the 40-MHz 2× mode:

$HELTF_{2x}$ (−244:2:244)={+1, $-G_c$, $-G_c^P$, −1, $-G_a$, $+G_a^P$, $-G_d^P$, +1, $+G_a$, $+G_a^P$, +1, $+G_c^P$, $-G_c$, 0, 0, 0, $+G_d$, $+G_d^P$, +1, $+G_b^P$, $-G_d$, −1, $+G_c^P$, $+G_b^P$, $+G_b$+1, $+G_p^d$, $-G_d$, +1}.

The HE-LTF sequence includes the Ga sequence and the Gb sequence, sequences $G_c$, $G_c^P$, $G_a^P$, $G_b^P$, $G_d^P$, and $G_d$ that are generated according to the Ga sequence and the Gb sequence, and +1 or −1 that is located at a leftover subcarrier location. Further, the HE-LTF sequence may further include: consecutive $-G_c$, $-G_c^P$, consecutive $-G_a$, $+G_a^P$, $-G_d^P$, consecutive $+G_a$, $+G_a^P$, consecutive $+G_c^P$, $-G_c$, consecutive $+G_d$, $+G_d^P$, consecutive $+G_b^P$, $-G_d$, consecutive $+G_b^P$, $-G_b$, consecutive $+G_c^P$, $+G_b^P$, $+G_b$, or consecutive $+G_d^P$, $-G_d$. For the content of the foregoing sequences, refer to sequences on a 2× symbol of the foregoing 40-MHz bandwidth.

In addition to using another Equation manner, the foregoing sequence may be further directly stored as:

$$
\begin{aligned}
&HELTF_{2x}(-244{:}2{:}244) = [+1, -1, +1, -1, -1, -1, +1, -1, -1, -1,\\
&-1, +1, +1, +1, -1, +1, +1, -1, -1, +1, -1, -1, -1, +1, +1, +1,\\
&+1, -1, -1, -1, -1, +1, -1, -1, -1, +1, -1, +1, +1, -1, +1,\\
&+1, +1, -1, -1, +1, +1, +1, -1, +1, +1, -1, +1, -1, -1, +1,\\
&-1 < +1, +1, -1, +1, +1, +1, -1, -1, +1, +1, +1, +1, +1, +1,\\
&-1, +1, +1, +1, -1, +1, -1, -1, +1, -1, +1, +1, -1, -1, +1, +1,\\
&+1, -1, +1, +1, -1, +1, -1, +1, +1, -1, -1, +1, +1, -1, +1, +1,\\
&+1, -1, -1, -1, -1, -1, +1, -1, -1, -1, +1, -1, -1, -1, -1, +1,\\
&+1, +1, 0, 0, 0, +1, -1, +1, +1, -1, +1, -1, -1, -1, +1, -1, -1,\\
&-1, +1, -1, +1, -1, -1, +1, -1, -1, -1, +1, +1, -1, -1, +1, +1,\\
&+1, +1, +1, -1, -1, -1, +1, -1, -1, +1, +1, -1, -1, -1, -1, +1,\\
&+1, +1, +1, -1, +1, +1, +1, -1, +1, -1, +1, -1, -1, +1, +1, -1,\\
&+1, +1, +1, -1, -1, -1, -1, +1, +1, +1, +1, -1, -1, -1, +1, -1,\\
&-1, +1, +1, -1, +1, +1, +1, -1, -1, -1, -1, +1, -1, -1, -1,\\
&+1, -1, +1, +1, -1, +1, -1, -1, +1, -1, -1, -1, +1, +1, -1,\\
&-1, -1, +1, -1, -1, +1, -1, +1, +1, +1, -1, +1, +1, +1, +1]
\end{aligned}
$$

A person skilled in the art knows that the foregoing sequence that is simply expressed by using the foregoing Equation should be:

$$HELTF_{2x}\ (-244{:}2{:}244)=\{+1, -G_c, -G_c^P, -1, -G_a, +G_a^P, -G_d^P, +1, +G_a, +G_a^P, +1, +G_c^P, -G_c, 0, 0, 0, +G_d, +G_d^P, +1, +G_b^P, -G_b, -1, +G_c^P, +G_b^P, +G_b+1, +G_d^P, -G_d, +1\}.$$

Figure 9:
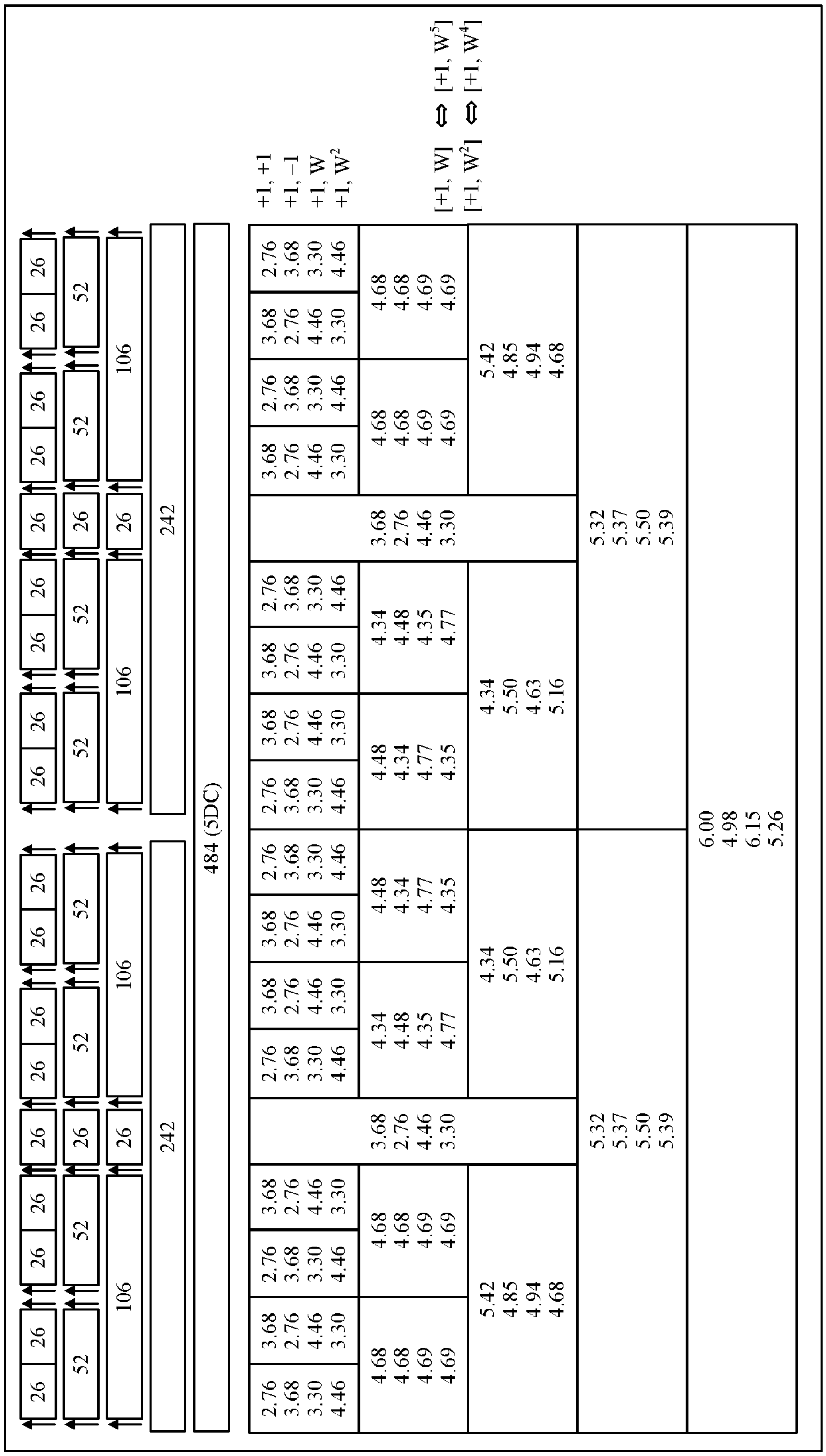
FIG. 9 shows PAPR values that are obtained by means of preferred 2×HE-LTF sequence simulation in an 40 MHz transmission.

FIG. 9 shows PAPR values of an HE-LTF sequence in the 40-MHz bandwidth. It may be learned, according to the group of PAPR values, that when different rotational phases are introduced in pilot subcarriers and other subcarriers, PAPR values are still very small.

The first group of values is sequentially PAPR values corresponding to 26-subcarrier resource blocks from left to right. Values in the first row, 2.76, 3.68, 2.76, 3.68, . . . , are PAPR values corresponding to an HE-LTF sequence when values at data locations are all multiplied by +1 and values at pilot locations are all multiplied by +1, and sequentially from left to right in the first row, 2.76 is a PAPR value corresponding to a first 26-subcarrier resource block, 3.68 is a PAPR value corresponding to a second 26-subcarrier resource block from left to right, and so on. Values in the second row, 3.68, 2.76, 3.68, 2.76, . . . , are PAPR values corresponding to an HE-LTF sequence when values at data locations are all multiplied by −1 and values at pilot locations are all multiplied by +1, and sequentially from left to right in the second row, 3.68 is a PAPR value corresponding to a first 26-subcarrier resource block, 2.76 is a PAPR value corresponding to a second 26-subcarrier resource block from left to right, and so on. Values in the third row, 3.30, 4.46, 3.30, 4.46 . . . , are PAPR values corresponding to an HE-LTF sequence when values at data locations are all multiplied by w and values at pilot locations are all multiplied by +1, and sequentially from left to right in the third row, 3.30 is a PAPR value corresponding to a first 26-subcarrier resource block, 4.46 is a PAPR value corresponding to a second 26-subcarrier resource block from left to right, and so on. Values in the fourth row, 4.46, 3.30, 4.46, 3.30, . . . , are PAPR values corresponding to an HE-LTF sequence when values at data locations are all multiplied by $w^2$ and values at pilot locations are all multiplied by +1, and sequentially from left to right in the fourth row, 4.46 is a PAPR value corresponding to a first 26-subcarrier resource block, 3.30 is a PAPR value corresponding to a second 26-subcarrier resource block from left to right, and so on.

The second group of values is sequentially PAPR values corresponding to 52-subcarrier resource blocks in a second row from left to right. Values in the first row, 4.68, 4.68, 4.34, 4.48, . . . , are PAPR values corresponding to an HE-LTF sequence when values at data locations are all multiplied by +1 and values at pilot locations are all multiplied by +1, and sequentially from left to right in the first row, the first 4.68 is a PAPR value corresponding to the first 52-subcarrier resource block, the second 4.68 is a PAPR value corresponding to a second 52-subcarrier resource block from left to right, and so on. Values in the second row, 4.68, 4.68, 4.48, 4.34, . . . , are PAPR values corresponding to an HE-LTF sequence when values at data locations are all multiplied by −1 and values at pilot locations are all multiplied by +1, and sequentially from left to right in the second row, the first 4.68 is a PAPR value corresponding to a first 52-subcarrier resource block, the second 4.68 is a PAPR value corresponding to a second 52-subcarrier resource block from left to right, and so on. Values in the third row, 4.69, 4.69, 4.35, 4.77, . . . , are PAPR values corresponding to an HE-LTF sequence when values at data locations are all multiplied by w and values at pilot locations are all multiplied by +1, and sequentially from left to right in the third row, the first 4.69 is a PAPR value corresponding to a first 52-subcarrier resource block, the second 4.69 is a PAPR value corresponding to a second 52-subcarrier resource block from left to right, and so on. Values in the fourth row, 4.69, 4.69, 4.77, and 4.35, are PAPR values corresponding to an HE-LTF sequence when values at data locations are all multiplied by $w^2$ and values at pilot locations are all multiplied by +1, and sequentially from left to right in the fourth row, the first 4.69 is a PAPR value corresponding to a first 52-subcarrier resource block, the second 4.69 is a PAPR value corresponding to a second 52-subcarrier resource block from left to right, and so on.

The third group of values is sequentially PAPR values corresponding to 106-subcarrier resource blocks in a third row from left to right. Values in the first row, 5.42, 4.34, 4.34, and 5.42, are PAPR values corresponding to an HE-LTF sequence when values at data locations are all multiplied by +1 and values at pilot locations are all multiplied by +1, and sequentially from left to right in the first row, 5.42 is a PAPR value corresponding to a first 106-subcarrier resource block, 4.34 is a PAPR value corresponding to a second 106-subcarrier resource block from left to right, and so on. Values in the second row, 4.85, 5.50, 5.50, and 4.85, are PAPR values corresponding to an HE-LTF sequence when values at data locations are all multiplied by −1 and values at pilot locations are all multiplied by +1, and sequentially from left to right in the second row, 4.85 is a PAPR value corresponding to a first 106-subcarrier resource block, 5.50 is a PAPR value corresponding to a second 106-subcarrier resource block from left to right, and so on. Values in the third row, 4.94, 4.63, 4.63, and 4.94, are PAPR values corresponding to an HE-LTF sequence when values at data locations are all multiplied by w and values at pilot locations are all multiplied by +1, and sequentially from left to right in the third row, 4.94 is a PAPR value corresponding to a first 106-subcarrier resource block, 4.63 is a PAPR value corresponding to a second 106-subcarrier resource block from left to right, and so on. Values in the fourth row, 4.68, 5.16, 5.16, and 4.68, are PAPR values corresponding to an HE-LTF sequence when values at data locations are all multiplied by $w^2$ and values at pilot locations are all multiplied by +1, and sequentially from left to right in the fourth row, 4.68 is a PAPR value corresponding to a first 106-subcarrier resource block, and 5.16 is a PAPR value corresponding to a second 106-subcarrier resource block from left to right.

The fourth group of values is sequentially PAPR values corresponding to 242-subcarrier resource blocks from left to right in a third row. Values in the first row, 5.32 and 5.32, are PAPR values corresponding to an HE-LTF sequence when values at data locations are all multiplied by +1 and values at pilot locations are all multiplied by +1, and sequentially from left to right in the first row, the first 5.32 is a PAPR value corresponding to a first 242-subcarrier resource block, and the second 5.32 is a PAPR value corresponding to a second 242-subcarrier resource block from left to right. Values in the second row, 5.37 and 5.37, are PAPR values corresponding to an HE-LTF sequence when values at data locations are all multiplied by −1 and values at pilot locations are all multiplied by +1, and sequentially from left to right in the second row, the first 5.37 is a PAPR value corresponding to a first 242-subcarrier resource block, and the second 5.37 is a PAPR value corresponding to a second 242-subcarrier resource block from left to right. Values in the third row, 5.50 and 5.50, are PAPR values corresponding to an HE-LTF sequence when values at data locations are all multiplied by w and values at pilot locations are all multiplied by +1, and sequentially from left to right in the third row, the first 5.50 is a PAPR value corresponding to a first 242-subcarrier resource block, and the second 5.50 is a PAPR value corresponding to a second 242-subcarrier resource block from left to right. Values in the fourth row, 5.39 and 5.39, are PAPR values corresponding to an HE-LTF sequence when values at data locations are all multiplied by $w^2$ and values at pilot locations are all multiplied by +1, and sequentially from left to right in the fourth row, the first 5.39 is a PAPR value corresponding to a first 242-subcarrier resource block, and the second 5.39 is a PAPR value corresponding to a second 242-subcarrier resource block from left to right.

The fifth group of values, 6.00, 4.98, 6.15, and 5.26, are PAPR values corresponding to 242-subcarrier resource blocks in a fourth row. The first 6.00 is a PAPR value corresponding to an HE-LTF sequence when values at data locations are all multiplied by +1 and values at pilot locations are all multiplied by +1. The second 4.98 is a PAPR value corresponding to an HE-LTF sequence when values at data locations are all multiplied by −1 and values at pilot locations are all multiplied by +1. The third 6.15 is a PAPR value corresponding to an HE-LTF sequence when values at data locations are all multiplied by w and values at pilot locations are all multiplied by +1. The first 5.26 is a PAPR value corresponding to an HE-LTF sequence when values at data locations are all multiplied by $w^2$ and values at pilot locations are all multiplied by +1.

A second HE-LTF sequence in the 40-MHz 2× mode:

$HELTF_{2x}(-244:2:244)=\{+1, +G_a, -G_a^P, +1, -G_c, -G_c^P, -G_b^P, -1, +G_c, -G_c^P, +1, -G_a^P, -G_a, 0, 0, 0, +G_b, -G_b^P, +1, -G_d^P, -G_b, +1, +G_a^P, -G_d^P, +G_d, -1, +G_b^P, +G_b, +1\}$.

The HE-LTF sequence includes the Ga sequence and the Gb sequence, sequences $G_c$, $G_c^P$, $G_a^P$, $G_d^P$, $G_d$ and a that are generated according to the Ga sequence and the Gb sequence, and +1 or −1 that is located at a leftover subcarrier location.

Further, the HE-LTF sequence may include consecutive $+G_a$, $-G_a^P$, consecutive $-G_c$, $-G_c^P$, $-G_b^P$, consecutive $+G_c$, $-G_c^P$, consecutive $-G_a^P$, $-G_a$, consecutive $+G_b$, $-G_b^P$, consecutive $-G_d^P$, $-G_d$, consecutive $+G_a^P$, $-G_d^P$, $+G_d$, or consecutive $+G_b^P$, $+G_b$.

Similarly, the HE-LTF sequence may be directly stored as:

$$HELTF_{2x}(-244:2:244) = [+1, +1, +1, +1, -1, +1, +1, +1, -1, +1,$$
$$-1, -1, +1, -1, -1, -1, +1, +1, -1, -1, -1, +1, -1, -1, +1, -1,$$
$$+1, +1, -1, +1, -1, -1, -1, +1, -1, -1, -1, -1, +1, +1, +1, -1,$$
$$+1, +1, -1, -1, +1, -1, -1, -1, +1, +1, +1, +1, -1, -1, -1, -1,$$
$$+1, +1, +1, -1, +1, +1, -1, -1, +1, -1, +1, -1, +1, +1, +1, -1,$$
$$+1, +1, +1, +1, -1, -1, -1, -1, +1, +1, -1, -1, +1, -1, -1, -1,$$
$$+1, +1, +1, +1, +1, -1, -1, +1, +1, -1, -1, -1, +1, -1, -1, +1,$$
$$-1, +1, -1, -1, -1, +1, -1, -1, -1, +1, -1, +1, +1, -1, +1, 0,$$
$$0, 0, +1, +1, +1, -1, -1, -1, -1, +1, -1, -1, -1, +1, -1, -1,$$
$$-1, -1, -1, +1, +1, +1, -1, +1, +1, -1, -1, +1, +1, -1, +1, -1,$$
$$+1, +1, -1, +1, +1, +1, -1, -1, +1, +1, -1, +1, -1, -1, +1, -1,$$
$$+1, +1, +1, -1, +1, +1, +1, +1, +1, +1, -1, -1, +1, +1, +1,$$
$$-1, +1, +1, -1, +1, -1, -1, +1, -1, +1, +1, -1, +1, +1, +1,$$
$$-1, -1, +1, +1, +1, -1, +1, +1, -1, +1, -1, -1, -1, +1, -1,$$
$$-1, -1, -1, +1, +1, +1, +1, -1, -1, -1, +1, -1, -1, +1, +1,$$
$$-1, +1, +1, +1, -1, -1, -1, -1, +1, -1, -1, -1, +1, -1, +1]$$

A person skilled in the art knows that the foregoing sequence that is simply expressed by using the foregoing Equation should be:

$HELTF_{2x}(-244:2:244)=\{+1, +G_a, -G_a^P, +1, -G_c, -G_c^P, -G_b^P, -1, +G_c, -G_c^P, +1, -G_a^P, -G_a, 0, 0, 0, +G_b, -G_b^P, +1, -G_d^P, -G_d, +1, +G_a^P, -G_d^P, +G_d, -1, +G_b^P, +G_b, +1\}$.

PAPR values obtained by using the foregoing HE-LTF sequence are the same as those shown in FIG. 9, and details are not described again.

Embodiment 3

There are 256 subcarriers on a 2× symbol of an 80-MHz bandwidth. According to different resource block sizes, as shown in FIG. 1*c*, an RU size may be 26, 52, 106, 242, 484, or 996 subcarriers.

There may be many types of HE-LTF sequences for 2× symbol of the 996 subcarriers in an 80 MHz transmission. Several types of the HE-LTF sequences are listed as follows:

A first 2×HE-LTF sequence in an 80 MHz transmission is:

$$HELTF_{2x}(-500:2:500) =$$
$$\{+1, -G_a, +G_a^p, -1, +G_c, +G_c^p, +G_b, +1, +G_a^p, -G_a, +1, -G_c^p, -G_c,$$
$$-1, -G_c, -G_c^p - 1, -G_a, +G_a^p, -G_d, +1, -G_c^p, -G_c, -1, G_a^p, +G_a,$$
$$+1, +1, -1, +1, +1, -1, +1, 0, 0, 0, +1, +1, -1, -1, +1, +1, +1,$$
$$+G_d, -G_d^p, +1, -G_b, -G_b^p, -1, -G_a, -G_d^p, -G_d, +1, -G_b^p, -G_b, +1,$$
$$+G_b, +G_b^p, +1, +G_d, -G_d^p, +1, -G_c, -G_b^p, -G_b, -1, -G_d^p, +G_d, +1\}.$$

The HE-LTF sequence includes the $G_a$ sequence and the $G_b$ sequence, sequences $G_a^P$, $G_c$, $G_c^P$, $G_b^P$, $G_d$, and $G_d^P$ that are generated according to the $G_a$ sequence and the $G_b$ sequence, and +1 or −1 that is located at a leftover subcarrier location. Further, the HE-LTF sequence may further include consecutive $-G_a$, $+G_a^P$, consecutive $+G_c$, $+G_c^P$, $+G_b$, consecutive $+G_a^P$, $-G_a$, consecutive $-G_c^P$, $-G_c$, consecutive $-G_c$, $-G_c^P$, consecutive $-G_a$, $+G_a^P$, $-G_b^P$, consecutive $-G_a$, $-G_d^P$, $-G_d$, consecutive $-G_a$, $+G_d^P$, $-G_d$, consecutive $-G_b^P$, $-G_b$, consecutive consecutive $-G_a$, $-G_d^P$, $-G_d$, consecutive $-G_a$, $-G_d^P$, $-G_d$, consecutive $-G_b^P$, $-G_b$, consecutive $G_b$, $+G_b^P$, consecutive $+G_d$, $-G_d^P$, consecutive $-G_c$, $-G_b^P$, $-G_b$, or consecutive $-G_d^P$, $+G_d$.

Certainly, the HE-LTF sequence may also be stored as:

HELTF2x (−500:2:500) =
[+1, −1, −1, −1, +1, −1, −1, −1, +1, −1, +1, +1, −1, +1, +1,
+1, −1, −1, +1, +1, +1, −1, +1, +1, −1, +1, −1, −1, +1, −1,
+1, +1, +1, −1, +1, +1, +1, +1, −1, −1, −1, +1, −1, −1, +1,
+1, −1, +1, +1, +1, −1, −1, −1, −1, +1, +1, +1, −1, −1, −1,
−1, +1, −1, −1, −1, +1, −1, +1, +1, +1, −1, −1, +1, +1, +1,
−1, +1, +1, −1, +1, −1, −1, −1, −1, +1, −1, −1, −1, +1, −1,
+1, +1, −1, +1, +1, −1, +1, +1, −1, −1, +1, −1, −1, −1, +1,
+1, +1, +1, −1, +1, −1, −1, −1, +1, −1, −1, −1, −1, +1, +1,
+1, −1, −1, +1, −1, −1, −1, +1, −1, −1, −1, −1, +1, +1, +1,
−1, +1, +1, −1, −1, +1, −1, −1, −1, +1, +1, +1, +1, −1, −1,
−1, −1, +1, −1, −1, −1, +1, −1, +1, +1, −1, +1, +1, +1, −1,
−1, +1, +1, +1, −1, +1, +1, −1, +1, −1, −1, +1, −1, −1, +1,
−1, +1, +1, +1, −1, +1, +1, +1, +1, −1, +1, +1, −1, −1, +1,
−1, −1, −1, +1, +1, +1, +1, −1, +1, −1, −1, −1, +1, −1, −1,
−1, −1, +1, +1, +1, −1, −1, −1, +1, +1, −1, −1, −1, +1, −1,
−1, +1, −1, +1, +1, +1, +1, −1, +1, +1, +1, −1, +1, −1, −1,
+1, −1, +1, +1, −1, +1, +1, −1, +1, 0, 0, 0, +1, +1, −1,
−1, +1, +1, +1, +1, −1, +1, +1, −1, +1, −1, −1, −1, +1, −1,
−1, −1, −1, +1, −1, +1, +1, −1, +1, +1, +1, −1, −1, +1, +1,
+1, −1, −1, −1, +1, +1, +1, +1, −1, +1, +1, +1, −1, +1, −1,
−1, −1, −1, +1, +1, +1, −1, +1, +1, −1, −1, +1, −1, −1, −1,
−1, +1, −1, −1, −1, +1, −1, +1, +1, −1, +1, +1, −1, +1, −1,
−1, +1, −1, −1, −1, +1, +1, −1, −1, −1, +1, −1, −1, +1, −1,
+1, +1, +1, −1, +1, +1, +1, +1, −1, −1, −1, −1, +1, +1, +1,
−1, +1, +1, −1, −1, +1, −1, −1, −1, +1, +1, +1, +1, −1, +1,
+1, +1, −1, +1, +1, +1, +1, +1, −1, −1, −1, −1, +1, −1, −1,
−1, +1, −1, +1, +1, +1, +1, −1, −1, −1, +1, −1, −1, +1, +1,
−1, +1, +1, −1, +1, +1, −1, +1, −1, −1, −1, +1, −1, −1, −1,
−1, +1, −1, +1, +1, −1, +1, +1, +1, −1, −1, +1, +1, +1, −1,
+1, −1, −1, −1, +1, −1, −1, −1, −1, +1, +1, +1, −1, −1, −1,
−1, +1, +1, +1, −1, +1, +1, −1, −1, +1, −1, −1, −1, +1, +1,
+1, +1, −1, +1, +1, +1, −1, +1, −1, −1, +1, −1, +1, +1, −1,
+1, +1, +1, −1, −1, +1, +1, +1, −1, +1, +1, −1, +1, −1, −1,
−1, +1, −1, −1, −1, +1]

A person skilled in the art knows that the foregoing sequence that is simply expressed by using the foregoing Equation should be:

$$HELTF_{2x}(-500{:}2{:}500) =$$

$$\{+1, -G_a, +G_a^p, -1, +G_c, +G_c^p, +G_b, +1, +G_a^p, -G_a, +1, -G_c^p, -G_c,$$

$$-1, -G_c, -G_c^p, -1, -G_a, +G_a^p, -G_d, +1, -G_c^p, -G_c, -1, -G_a^p, +G_a,$$

$$+1, +1, -1, +1, +1, -1, +1, 0, 0, 0, +1, +1, -1, -1, +1, +1, +1,$$

$$+G_d, -G_d^p, +1, -G_b, -G_b^p, -1, -G_a, +G_d^p, -G_d, +1, -G_b^p, -G_b, +1,$$

$$+G_b, +G_b^p, +1, +G_d, -G_d^p, +1, -G_c, -G_b^p, -G_b, -1, -G_d^p, +G_d, +1\}.$$

FIG. 10 shows PAPR values of an HE-LTF sequence in the 80-MHz bandwidth. It may be learned, according to the group of PAPR values, that when different rotational phases are introduced in pilot subcarriers and other subcarriers, PAPR values are still very small.

The first group of values is sequentially PAPR values corresponding to 26-subcarrier resource blocks from left to right. Values in the first row, 2.76, 3.68, 2.76, 3.68, . . . , are PAPR values corresponding to an HE-LTF sequence when values at data locations are all multiplied by +1 and values at pilot locations are all multiplied by +1, and sequentially from left to right in the first row, 2.76 is a PAPR value corresponding to a first 26-subcarrier resource block, 3.68 is a PAPR value corresponding to a second 26-subcarrier resource block from left to right, and so on. Values in the second row, 3.68, 2.76, 3.68, 2.76, . . . , are PAPR values corresponding to an HE-LTF sequence when values at data locations are all multiplied by +1 and values at pilot locations are all multiplied by −1, and sequentially from left to right in the second row, 3.68 is a PAPR value corresponding to a first 26-subcarrier resource block, 2.76 is a PAPR value corresponding to a second 26-subcarrier resource block from left to right, and so on. Values in the third row, 3.30, 4.46, 3.30, 4.46, . . . , are PAPR values corresponding to an HE-LTF sequence when values at data locations are all multiplied by w and values at pilot locations are all multiplied by +1, and sequentially from left to right in the third row, 3.30 is a PAPR value corresponding to a first 26-subcarrier resource block, 4.46 is a PAPR value corresponding to a second 26-subcarrier resource block from left to right, and so on. Values in the fourth row, 4.46, 3.30, 4.46, 3.30, . . . , are PAPR values corresponding to an HE-LTF sequence when values at data locations are all multiplied by $w^2$ and values at pilot locations are all multiplied by +1, and sequentially from left to right in the fourth row, 4.46 is a PAPR value corresponding to a first 26-subcarrier resource block, 3.30 is a PAPR value corresponding to a second 26-subcarrier resource block from left to right, and so on.

The second group of values is sequentially PAPR values corresponding to 52-subcarrier resource blocks in a second row from left to right. Values in the first row, 4.68, 4.68, 4.69, 4.69, . . . , are PAPR values corresponding to an HE-LTF sequence when values at data locations are all multiplied by +1 and values at pilot locations are all multiplied by +1, and sequentially from left to right in the first row, the first 4.68 is a PAPR value corresponding to a first 52-subcarrier resource block, the second 4.68 is a PAPR value corresponding to a second 52-subcarrier resource block from left to right, and so on. Values in the second row, 4.68, 4.68, 4.69, 4.69, . . . , are PAPR values corresponding to an HE-LTF sequence when values at data locations are all multiplied by −1 and values at pilot locations are all multiplied by +1, and sequentially from left to right in the second row, the first 4.68 is a PAPR value corresponding to a first 52-subcarrier resource block, the second 4.68 is a PAPR value corresponding to a second 52-subcarrier resource block from left to right, and so on. Values in the third row, 4.68, 4.68, 4.69, 4.69, . . . , are PAPR values corresponding to an HE-LTF sequence when values at data locations are all multiplied by w and values at pilot locations are all multiplied by +1, and sequentially from left to right in the third row, the first 4.68 is a PAPR value corresponding to a first 52-subcarrier resource block, the second 4.68 is a PAPR value corresponding to a second 52-subcarrier resource block from left to right, and so on. Values in the fourth row, 4.68, 4.68, 4.69, and 4.69, are PAPR values corresponding to an HE-LTF sequence when values at data locations are all multiplied by $w^2$ and values at pilot locations are all multiplied by +1, and sequentially from left to right in the fourth row, the first 4.68 is a PAPR value corresponding to a first 52-subcarrier resource block, the second 4.68 is a PAPR value corresponding to a second 52-subcarrier resource block from left to right, and so on.

The third group of values is sequentially PAPR values corresponding to 106-subcarrier resource blocks in a third row from left to right. Values in the first row, 5.42, 5.33, 5.42, 5.33 . . . , are PAPR values corresponding to an HE-LTF sequence when values at data locations are all multiplied by +1 and values at pilot locations are all multiplied by +1, and sequentially from left to right in the first row, 5.42 is a PAPR value corresponding to a first 106-subcarrier resource block, 5.33 is a PAPR value corresponding to a second 106-subcarrier resource block from left to right, and so on. Values in the second row, 4.85, 5.41, 4.85, 5.41, . . . , are that PAPR values corresponding to an HE-LTF sequence when values at data locations are all multiplied by −1 and values at pilot locations are all multiplied by +1, and sequentially from left to right in the second row, 4.85 is a PAPR value corresponding to a first 106-subcarrier resource block, 5.50 is a PAPR value corresponding to a second 106-subcarrier resource block from left to right, and so on. Values in the third row, 4.95, 5.18, 4.95, 5.18, . . . , are PAPR values corresponding to an HE-LTF sequence when values at data locations are all multiplied by w and values at pilot locations are all multiplied by +1, and sequentially from left to right in the third row, 4.95 is a PAPR value corresponding to a first 106-subcarrier resource block, 5.18 is a PAPR value corresponding to a second 106-subcarrier resource block from left to right, and so on. Values in the fourth row, 4.68, 4.97, 4.68, 4.97, . . . , are PAPR values corresponding to an HE-LTF sequence when values at data locations are all multiplied by $w^2$ and values at pilot locations are all multiplied by +1, and sequentially from left to right in the fourth row, 4.68 is a PAPR value corresponding to a first 106-subcarrier resource block, and 4.97 is a PAPR value corresponding to a second 106-subcarrier resource block from left to right.

The fourth group of values is sequentially PAPR values corresponding to 242-subcarrier resource blocks from left to right in a fourth row Values in the first row, 5.29 and 5.29, are that PAPR values corresponding to an HE-LTF sequence when values at data locations are all multiplied by +1 and values at pilot locations are all multiplied by +1, and sequentially from left to right in the first row, the first 5.29 is a PAPR value corresponding to a first 242-subcarrier resource block, and the second 5.29 is a PAPR value corresponding to a second 242-subcarrier resource block from left to right. Values in the second row, 5.58 and 5.58, are PAPR values corresponding to an HE-LTF sequence when values at data locations are all multiplied by −1 and values at pilot locations are all multiplied by +1, and sequentially from left to right in the second row, the first 5.58 is a PAPR value corresponding to a first 242-subcarrier resource block, the second 5.58 is a PAPR value corresponding to a second 242-subcarrier resource block from left to right. Values in the third row, 5.40 and 5.40, are PAPR values corresponding to an HE-LTF sequence when values at data locations are all multiplied by w and values at pilot locations are all multiplied by +1, and sequentially from left to right in the third row, the first 5.40 is a PAPR value corresponding to a first 242-subcarrier resource block, and the second 5.40 is a PAPR value corresponding to a second 242-subcarrier resource block from left to right. Values in the fourth row, 5.46 and 5.46, are PAPR values corresponding to an HE-LTF sequence when values at data locations are all multiplied by $w^2$ and values at pilot locations are all multiplied by +1, and sequentially from left to right in the fourth row, the first 5.46 is a PAPR value corresponding to a first 242-subcarrier resource block, and the second 5.46 is a PAPR value corresponding to a second 242-subcarrier resource block from left to right.

The fifth group of values is sequentially PAPR values corresponding to 484-subcarrier resource blocks in a fifth row from left to right. Values in the first row, 6.27 and 6.13, are PAPR values corresponding to an HE-LTF sequence when values at data locations are all multiplied by +1 and values at pilot locations are all multiplied by +1, and sequentially from left to right in the first row, 6.27 is a PAPR value corresponding to a first 484-subcarrier resource block, and 6.13 is a PAPR value corresponding to a second 484-subcarrier resource block from left to right. Values in the second row, 6.11 and 6.40, are PAPR values corresponding to an HE-LTF sequence when values at data locations are all multiplied by −1 and values at pilot locations are all multiplied by +1, and sequentially from left to right in the second row, 6.11 is a PAPR value corresponding to a first 242-subcarrier resource block, and 6.40 is a PAPR value corresponding to a second 484-subcarrier resource block from left to right. Values in the third row, 6.24 and 6.34, are PAPR values corresponding to an HE-LTF sequence when values at data locations are all multiplied by w and values at pilot locations are all multiplied by +1, and sequentially from left to right in the third row, 6.24 is a PAPR value corresponding to a first 484-subcarrier resource block, and 6.34 is a PAPR value corresponding to a second 484-subcarrier resource block from left to right. Values in the fourth row, 6.29 and 6.25, are PAPR values corresponding to an HE-LTF sequence when values at data locations are all multiplied by $w^2$ and values at pilot locations are all multiplied by +1, and sequentially from left to right in the fourth row, 6.29 is a PAPR value corresponding to a first 484-subcarrier resource block, and 6.25 is a PAPR value corresponding to a second 484-subcarrier resource block from left to right.

The sixth group of values, 6.01, 5.68, 6.08, and 5.92, are PAPR values corresponding to 996-subcarrier resource blocks in a sixth row. The first 6.08 is a PAPR value corresponding to an HE-LTF sequence when values at data locations are all multiplied by +1 and values at pilot locations are all multiplied by +1. The second 5.68 is a PAPR value corresponding to an HE-LTF sequence when values at data locations are all multiplied by −1 and values at pilot locations are all multiplied by +1. The third 6.08 is a PAPR value corresponding to an HE-LTF sequence when values at data locations are all multiplied by w and values at pilot locations are all multiplied by +1. The fourth 5.92 is a PAPR value corresponding to an HE-LTF sequence when values at data locations are all multiplied by $w^2$ and values at pilot locations are all multiplied by +1.

A second HE-LTF sequence in 80 MHz 2×:

$$HELTF_{2x}(-500:2:500) =$$

$$\{+1, +G_c, +G_c^p, +1, +G_a, -G_a^p, +G_d, -1, +G_c^p + G_c, +1, +G_a^p, -G_a, +1,$$
$$-G_a, +1, -G_a, +G_a^p, -1, +G_c, +G_c^p, +G_b, +1, +G_a^p, -G_a, +1, -G_c^p,$$
$$-G_c, +1, -1, -1, -1, +1, +1, +1, 0, 0, 0, +1, -1, -1, +1, +1, -1, +1,$$
$$-G_b, -G_b^p, -1, -G_d, +G_d^p, -1, +G_c, +G_b^p, +G_b, +1, G_d^p, -G_d, -1,$$
$$+G_d, -G_d^p, +1, -G_b, -G_b^p, -1, -G_a, +G_d^p, -G_d, +1, -G_b^p, -G_b, +1\}.$$

The HE-LTF sequence includes the $G_a$ sequence and the $G_b$ sequence, sequences $G_a^p$, $G_c$, $G_c^p$, $G_b^p$, $G_d$, and $G_d^p$ that are generated according to the Ga sequence and the $G_b$ sequence, and +1 or −1 that is located at a leftover subcarrier location. Further, the HE-LTF sequence may further include consecutive $+G_c$, $+G_c^p$, consecutive $+G_a$, $-G_a^p$, $+G_d$, consecutive $+G_c^p$, $+G_c$, consecutive $+G_a^p$, $-G_a$, consecutive $-G_a$, $+G_a^p$, consecutive $+G_c$, $+G_c^p$, $+G_b$, consecutive $+G_a^p$, $-G_a$, consecutive $-G_c^p$, $-G_c$, consecutive $-G_b$, $-G_b^p$, consecutive $-G_d$, $+G_d^p$, consecutive $+G_c$, $+G_b^p$, $+G_b$, consecutive $+G_d^p$, $-G_d$, consecutive $+G_d$, $-G_d^p$, consecutive $-G_b$, $-G_b^p$, consecutive $-G_a$, $+G_d^p$, $-G_d$, or consecutive $-G_b^p$, $-G_b$.

The HE-LTF sequence may also be directly stored as:

$HE\text{-}LTF_{2x}$ (−500:2:500) =
[+1, +1, −1, +1, +1, +1, −1, +1, +1, +1, +1, −1, −1, −1, +1,
−1, −1, +1, +1, −1, +1, +1, +1, −1, −1, −1, −1, +1, +1, +1,
+1, −1, +1, +1, +1, −1, +1, −1, −1, +1, −1, −1, −1, +1, +1,
−1, −1, −1, +1, −1, −1, +1, −1, +1, +1, −1, +1, +1, −1, +1,
−1, −1, −1, +1, −1, −1, −1, −1, +1, −1, −1, +1, +1, −1, +1,
+1, +1, −1, −1, −1, −1, +1, −1, +1, +1, +1, −1, +1, +1, +1,
+1, −1, −1, −1, +1, +1, +1, −1, −1, +1, +1, +1, −1, +1, +1,
−1, +1, −1, −1, −1, −1, +1, −1, −1, −1, +1, −1, +1, +1, −1,
+1, +1, −1, −1, −1, +1, −1, −1, −1, +1, −1, +1, +1, −1, +1,
+1, +1, −1, −1, +1, +1, +1, −1, +1, +1, −1, +1, −1, −1, +1,
−1, +1, +1, +1, −1, +1, +1, +1, +1, −1, −1, −1, +1, −1, −1,
+1, +1, −1, +1, +1, +1, −1, −1, −1, −1, +1, +1, +1, −1, −1,
−1, −1, +1, −1, −1, −1, +1, −1, +1, +1, +1, −1, −1, +1, +1,
+1, −1, +1, +1, −1, +1, −1, −1, −1, −1, +1, −1, −1, −1, +1,
−1, +1, +1, −1, +1, +1, −1, +1, +1, −1, −1, +1, −1, −1, −1,
+1, +1, +1, +1, −1, +1, −1, −1, −1, +1, −1, −1, −1, −1, +1,
+1, +1, +1, −1, −1, −1, +1, +1, +1, 0, 0, 0, +1, −1, −1,
+1, +1, −1, +1, −1, −1, −1, +1, +1, +1, +1, −1, +1, +1, +1,
−1, +1, −1, −1, −1, −1, +1, +1, +1, −1, +1, +1, −1, −1, +1,
−1, −1, +1, −1, −1, +1, −1, +1, +1, +1, −1, +1, +1, +1, +1,
−1, +1, −1, −1, +1, −1, −1, −1, +1, +1, −1, −1, −1, +1, −1,
+1, +1, +1, −1, +1, +1, +1, +1, −1, −1, −1, +1, +1, +1, +1,
−1, −1, −1, +1, −1, −1, +1, +1, −1, +1, +1, +1, −1, −1, −1,
−1, +1, −1, −1, −1, +1, −1, +1, +1, −1, +1, −1, −1, +1, −1,
−1, −1, +1, +1, −1, −1, −1, +1, −1, −1, +1, −1, +1, +1, +1,
−1, +1, +1, +1, −1, +1, −1, +1, +1, −1, +1, −1, −1, −1, +1,
−1, −1, −1, −1, +1, −1, +1, +1, −1, +1, +1, +1, −1, −1, +1,
+1, +1, −1, −1, −1, +1, +1, +1, +1, −1, +1, +1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, +1, +1, −1, +1,
−1, −1, +1, −1, −1, −1, +1, +1, −1, −1, −1, +1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, +1, +1, +1, −1,
+1, +1, +1, −1, +1, +1]

After the second HE-LTF sequence is used, PAPR values corresponding to the second HE-LTF sequence are the same as PAPR values (shown in FIG. 10) of the first HE-LTF sequence.

A third HE-LTF sequence in 80 MHz 2×:

$HELTF_{2x}$ (−500:2:500) =
{+1, $-G_a + G_a^p$, −1, $+G_c$, $+G_c^p$, $+G_b$, +1, $+G_a^p$, $-G_a$, +1, $-G_c^p$, $-G_c$,
+1, $+G_c$, $+G_c^p$, +1, $+G_a$, $-G_a^p$, $+G_d$, −1, $+G_c^p$, $+G_c$, +1, $+G_a^p$, $-G_a$,
+1, +1, +1 −1 −1, +1, +1, 0, 0, 0, +1, −1, +1, +1, −1, +1, +1,
$-G_d$, $+G_d^p$, −1, $+G_b$, $+G_b^p$, +1, $+G_a$, $-G_d^p$, $+G_d$, −1, $+G_b^p$, $+G_b$, −1,
$+G_b$, $+G_b^p$, +1, $+G_d$, $-G_d^p$, +1, $-G_c$, $-G_b^p$, $-G_b$, −1, $-G_d^p$, $+G_d$, +1}.

The HE-LTF sequence includes the $G_a$ sequence and the $G_b$ sequence, sequences $G_a^p$, $G_c$, $G_c^p$, $G_b^p$, $G_d$, and $G_d^p$ that are generated according to the $G_a$ sequence and the $G_b$ sequence, and +1 or −1 that is located at a leftover subcarrier location. Further, the HE-LTF sequence may further include consecutive $-G_a$, $+G_a^p$, consecutive $+G_c$, $+G_c^p$, $+G_b$, consecutive $+G_a^p$, $-G_a$, consecutive $-G_c^p$, $-G_c$, consecutive $+G_c$, $+G_c^p$, consecutive $+G_a$, $-G_a^p$, $+G_d$, consecutive $+G_c^p$, $+G_c$, consecutive $+G_a^p$, $-G_a$, consecutive $-G_d$, $+G_d^p$, consecutive $+G_b$, $+G_b^p$, consecutive $+G_a$, $-G_d^p$, $+\tilde{G}_b$, consecutive $+G_a$, $-G_d^p$, $+G_d$, consecutive $+G_b^p$, $+G_b$, consecutive $+G_b$, $+G_b^p$, consecutive $+G_d$, $-G_d^p$ consecutive $-G_c$, $-G_b^p$, $-G_b$, or consecutive $-G_d^p$, $+G_d$.

The HE-LTF sequence may also be directly stored as the following sequence:

$HE\text{-}LTF_{2x}$ (−500:2:500) =
[+1, −1, −1, −1, +1, −1, −1, −1, +1, −1, +1, +1, −1, +1, +1,
+1, −1, −1, +1, +1, +1, −1, +1, +1, −1, +1, −1, −1, +1, −1,
+1, +1, +1, −1, +1, +1, +1, +1, −1, −1, −1, +1, −1, −1, +1,
+1, −1, +1, +1, +1, −1, −1, −1, −1, +1, +1, +1, −1, −1, −1,
−1, +1, −1, −1, −1, +1, −1, +1, +1, +1, −1, −1, +1, +1, +1,
−1, +1, +1, −1, +1, −1, −1, −1, −1, +1, −1, −1, −1, +1, −1,
+1, +1, −1, +1, +1, −1, +1, +1, −1, −1, +1, −1, −1, −1, +1,
+1, +1, +1, −1, +1, −1, −1, −1, +1, −1, −1, −1, −1, +1, +1,
+1, +1, +1, −1, +1, +1, +1, −1, +1, +1, +1, +1, −1, −1, −1,
+1, −1, −1, +1, +1, −1, +1, +1, +1, −1, −1, −1, −1, +1, +1,
+1, +1, −1, +1, +1, +1, −1, +1, −1, −1, +1, −1, −1, −1, +1,
+1, −1, −1, −1, +1, −1, −1, +1, −1, +1, +1, −1, +1, +1, −1,
+1, −1, −1, −1, +1, −1, −1, −1, −1, +1, −1, −1, +1, +1, −1,
+1, +1, +1, −1, −1, −1, −1, +1, −1, +1, +1, +1, −1, +1, +1,
+1, +1, −1, −1, −1, +1, +1, +1, −1, −1, +1, +1, +1, −1, +1,
+1, −1, +1, −1, −1, −1, −1, +1, −1, −1, −1, +1, −1, +1, +1,
−1, +1, +1, +1, +1, −1, −1, +1, +1, 0, 0, 0, +1, −1, +1,
+1, −1, +1, +1, −1, +1, −1, −1, +1, −1, +1, +1, +1, −1, +1,
+1, +1, +1, −1, +1, −1, −1, +1, −1, −1, −1, +1, +1, −1, −1,
−1, +1, +1, +1, −1, −1, −1, −1, +1, −1, −1, −1, +1, −1, +1,
+1, +1, +1, −1, −1, −1, +1, −1, −1, +1, +1, −1, +1, +1, +1,
+1, −1, +1, +1, +1, −1, +1, −1, −1, +1, −1, −1, +1, −1, +1,
+1, −1, +1, +1, +1, −1, −1, +1, +1, +1, −1, +1, +1, −1, +1,
−1, −1, −1, +1, −1, −1, −1, −1, +1, +1, +1, +1, −1, −1, −1,
+1, −1, −1, +1, +1, −1, +1, +1, +1, −1, −1, −1, −1, +1, −1,
−1, −1, +1, −1, −1, +1, +1, +1, −1, −1, −1, −1, +1, −1, −1,
−1, +1, −1, +1, +1, +1, +1, −1, −1, −1, +1, −1, −1, +1, +1,
−1, +1, +1, −1, +1, +1, −1, +1, −1, −1, −1, +1, −1, −1, −1,
−1, +1, −1, +1, +1, −1, +1, +1, +1, −1, −1, +1, +1, +1, −1,
+1, −1, −1, −1, +1, −1, −1, −1, −1, +1, +1, +1, −1, −1, −1,
−1, +1, +1, +1, −1, +1, +1, −1, −1, +1, −1, −1, −1, +1, +1,
+1, +1, −1, +1, +1, +1, −1, +1, −1, −1, +1, −1, +1, +1, −1,
+1, +1, +1, −1, −1, +1, +1, +1, −1, +1, +1, −1, +1, −1, −1,
−1, +1, −1, −1, −1, +1].

FIG. 11 shows PAPR values of an HE-LTF sequence in the 80-MHz bandwidth. It may be learned, according to the group of PAPR values, that when different rotational phases are introduced in pilot subcarriers and other subcarriers, PAPR values are still very small.

The first group of values are sequentially PAPR values corresponding to 26-subcarrier resource blocks from left to right. Values in the first row, 2.76, 3.68, 2.76, 3.68, . . . , are PAPR values corresponding to an HE-LTF sequence when values at data locations are all multiplied by +1 and values at pilot locations are all multiplied by +1, and sequentially from left to right in the first row, 2.76 is a PAPR value corresponding to a first 26-subcarrier resource block, 3.68 is a PAPR value corresponding to a second 26-subcarrier resource block from left to right, and so on. Values in the second row, 3.68, 2.76, 3.68, 2.76, . . . , are PAPR values corresponding to an HE-LTF sequence when values at data locations are all multiplied by +1 and values at pilot locations are all multiplied by −1, and sequentially from left to right in the second row, 3.68 is a PAPR value corresponding to a first 26-subcarrier resource block, 2.76 is a PAPR value corresponding to a second 26-subcarrier resource block from left to right, and so on. Values in the third row, 3.30, 4.46, 3.30, 4.46, . . . , are PAPR values corresponding to an HE-LTF sequence when values at data locations are all multiplied by w and values at pilot locations are all multiplied by +1, and sequentially from left to right in the third row, 3.30 is a PAPR value corresponding to a first 26-subcarrier resource block, 4.46 is a PAPR value corresponding to a second 26-subcarrier resource block from left to right, and so on. Values in the fourth row, 4.46, 3.30, 4.46, 3.30, . . . , are PAPR values corresponding to an HE-LTF sequence when values at data locations are all multiplied by $w^2$ and values at pilot locations are all multiplied by +1, and sequentially from left to right in the fourth row, 4.46 is a PAPR value corresponding to a first 26-subcarrier resource block, 3.30 is a PAPR value corresponding to a second 26-subcarrier resource block from left to right, and so on.

The second group of values are sequentially PAPR values corresponding to 52-subcarrier resource blocks in a second row from left to right. Values in the first row, 4.68, 4.68, 4.69, 4.69, . . . , are PAPR values corresponding to an HE-LTF sequence when values at data locations are all multiplied by +1 and values at pilot locations are all multiplied by +1, and sequentially from left to right in the first row, the first 4.68 is a PAPR value corresponding to a first 52-subcarrier resource block, and the second 4.68 is a PAPR value corresponding to a second 52-subcarrier resource block from left to right, and so on. Values in the second row, 4.68, 4.68, 4.69, 4.69, . . . , are PAPR values corresponding to an HE-LTF sequence when values at data locations are all multiplied by −1 and values at pilot locations are all multiplied by +1, and sequentially from left to right in the second row, the first 4.68 is a PAPR value corresponding to a first 52-subcarrier resource block, the second 4.68 is a PAPR value corresponding to a second 52-subcarrier resource block from left to right, and so on. Values in the third row, 4.68, 4.68, 4.69, 4.69, . . . , are PAPR values corresponding to an HE-LTF sequence when values at data locations are all multiplied by w and values at pilot locations are all multiplied by +1, and sequentially from left to right in the third row, the first 4.68 is a PAPR value corresponding to a first 52-subcarrier resource block, the second 4.68 is a PAPR value corresponding to a second 52-subcarrier resource block from left to right, and so on. Values in the fourth row, 4.68, 4.68, 4.69, and 4.69, are PAPR values corresponding to an HE-LTF sequence when values at data locations are all multiplied by $w^2$ and values at pilot locations are all multiplied by +1, and sequentially from left to right in the fourth row, the first 4.68 is a PAPR value corresponding to a first 52-subcarrier resource block, the second 4.68 is a PAPR value corresponding to a second 52-subcarrier resource block from left to right, and so on.

The third group of values are sequentially PAPR values corresponding to 106-subcarrier resource blocks in a third row from left to right. Values in the first row, 5.42, 5.33, 5.42, 5.33, . . . , are PAPR values corresponding to an HE-LTF sequence when values at data locations are all multiplied by +1 and values at pilot locations are all multiplied by +1, and sequentially from left to right in the first row, 5.42 is a PAPR value corresponding to a first 106-subcarrier resource block, 5.33 is a PAPR value corresponding to a second 106-subcarrier resource block from left to right, and so on. Values in the second row, 4.85, 5.41, 4.85, 5.41, . . . , are PAPR values corresponding to an HE-LTF sequence when values at data locations are all multiplied by −1 and values at pilot locations are all multiplied by +1, and sequentially from left to right in the second row, 4.85 is a PAPR value corresponding to a first 106-subcarrier resource block, 5.50 is a PAPR value corresponding to a second 106-subcarrier resource block from left to right, and so on. Values in the third row, 4.95, 5.18, 4.95, 5.18, . . . , are PAPR values corresponding to an HE-LTF sequence when values at data locations are all multiplied by w and values at pilot locations are all multiplied by +1, and sequentially from left to right in the third row, 4.95 is a PAPR value corresponding to a first 106-subcarrier resource block, 5.18 is a PAPR value corresponding to a second 106-subcarrier resource block from left to right, and so on. Values in the fourth row, 4.68, 4.97, 4.68, 4.97, . . . , are PAPR values corresponding to an HE-LTF sequence when values at data locations are all multiplied by $w^2$ and values at pilot locations are all multiplied by +1, and sequentially from left to right in the fourth row, 4.68 is a PAPR value corresponding to a first 106-subcarrier resource block, and 4.97 is a PAPR value corresponding to a second 106-subcarrier resource block from left to right.

The fourth group of values is sequentially PAPR values corresponding to 242-subcarrier resource blocks from left to right in a fourth row Values in the first row, 5.29 and 5.29, are PAPR values corresponding to an HE-LTF sequence when values at data locations are all multiplied by +1 and values at pilot locations are all multiplied by +1, and sequentially from left to right in the first row, the first 5.29 is a PAPR value corresponding to a first 242-subcarrier resource block, and the second 5.29 is a PAPR value corresponding to a second 242-subcarrier resource block from left to right. Values in the second row, 5.58 and 5.58, are PAPR values corresponding to an HE-LTF sequence when values at data locations are all multiplied by −1 and values at pilot locations are all multiplied by +1, and sequentially from left to right in the second row, the first 5.58 is a PAPR value corresponding to a first 242-subcarrier resource block, and the second 5.58 is a PAPR value corresponding to a second 242-subcarrier resource block from left to right. Values in the third row, 5.40 and 5.40, are PAPR values corresponding to an HE-LTF sequence when values at data locations are all multiplied by w and values at pilot locations are all multiplied by +1, and sequentially from left to right in the third row, the first 5.40 is a PAPR value corresponding to a first 242-subcarrier resource block, and the second 5.40 is a PAPR value corresponding to a second 242-subcarrier resource block from left to right. Values in the fourth row, 5.46 and 5.46, are PAPR values corresponding to an HE-LTF sequence when values at data locations are all multiplied by $w^2$ and values at pilot locations are all multiplied by +1, and sequentially from left to right in the fourth row, the first 5.46 is a PAPR value corresponding to a first 242-subcarrier resource block, and the second 5.46 is a PAPR value corresponding to a second 242-subcarrier resource block from left to right.

The fifth group of values is sequentially PAPR values corresponding to 484-subcarrier resource blocks in a fifth row from left to right. Values in the first row, 6.13 and 6.27, are PAPR values corresponding to an HE-LTF sequence when values at data locations are all multiplied by +1 and values at pilot locations are all multiplied by +1, and sequentially from left to right in the first row, 6.13 is a PAPR value corresponding to a first 484-subcarrier resource block, and 6.27 is a PAPR value corresponding to a second 484-subcarrier resource block from left to right. Values in the second row, 6.40 and 6.11, are PAPR values corresponding to an HE-LTF sequence when values at data locations are all multiplied by −1 and values at pilot locations are all multiplied by +1, and sequentially from left to right in the second row, 6.40 is a PAPR value corresponding to a first 242-subcarrier resource block, and 6.11 is a PAPR value corresponding to a second 484-subcarrier resource block from left to right. Values in the third row, 6.34 and 6.24, are PAPR values corresponding to an HE-LTF sequence when values at data locations are all multiplied by w and values at pilot locations are all multiplied by +1, and sequentially from left to right in the third row, 6.34 is a PAPR value corresponding to a first 484-subcarrier resource block, and 6.24 is a PAPR value corresponding to a second 484-subcarrier resource block from left to right. Values in the fourth row, 6.25 and 6.29, are PAPR values corresponding to an HE-LTF sequence when values at data locations are all multiplied by $w^2$ and values at pilot locations are all multiplied by +1, and sequentially from left to right in the fourth row, 6.25 is a PAPR value corresponding to a first 484-subcarrier resource block, and 6.29 is a PAPR value corresponding to a second 484-subcarrier resource block from left to right.

The sixth group of values, 6.01, 5.68, 6.08, and 5.92, are PAPR values corresponding to 996-subcarrier resource blocks in a sixth row. The first 6.08 is a PAPR value corresponding to an HE-LTF sequence when values at data locations are all multiplied by +1 and values at pilot locations are all multiplied by +1. The second 5.68 is a PAPR value corresponding to an HE-LTF sequence when values at data locations are all multiplied by −1 and values at pilot locations are all multiplied by +1. The third 6.08 is a PAPR value corresponding to an HE-LTF sequence when values at data locations are all multiplied by w and values at pilot locations are all multiplied by +1. The fourth 5.92 is a PAPR value corresponding to an HE-LTF sequence when values at data locations are all multiplied by $w^2$ and values at pilot locations are all multiplied by +1.

A fourth HE-LTF sequence in the 80 MHz 2× mode:

$$HELTF_{2x}(-500:2:500) =$$

$$\{+1, +G_c, +G_c^p, +1, +G_a, -G_a^p, +G_d, -1, +G_c^p, +G_c, +1, +G_a^p, -G_a,$$

$$-1, +G_a - G_a^p, +1, -G_c, -G_c^p, -G_b, -1, -G_a^p, +G_a, -1, +G_c^p, +G_c,$$

$$+1, -1, +1, +1, -1, -1, +1, 0, 0, 0, +1, +1, +1, -1, -1, -1, +1,$$

$$+G_b, +G_b^p, +1, +G_d, -G_d^p, +1, -G_c, -G_b^p, -G_b, -1, -G_d^p, +G_d, +1,$$

$$+G_d, -G_d^p, +1, -G_b, -G_b^p, -1, -G_a, +G_d^p, -G_d, +1, -G_d^p, -G_b, +1\}.$$

The HE-LTF sequence includes the $G_a$ sequence and $G_b$ sequence, sequences $G_a^P$, $G_c$, $G_c^P$, $G_b^P$, $G_d$, and $G_d^P$ that are generated according to the $G_a$ sequence and the $G_b$ sequence, and +1 or −1 that is located at a leftover subcarrier location. Further, the HE-LTF sequence may further include consecutive $+G_c$, $+G_c^P$, consecutive $+G_a$, $-G_a^P$, $+G_d$, consecutive $+G_c^P$, $+G_c$, consecutive $+G_a^P$, $-G_a$ consecutive $+G_a-G_a^P$, consecutive $-G_c$, $-G_c^P$, $-G_b$, consecutive $-G_a^P$, $+G_a$, consecutive $+G_c^P$, $+G_c$, consecutive $+G_b$, $+G_b^P$, consecutive $+G_d$, $-G_d^P$, consecutive $-G_c$, $-G_b^P$, $-G_b$, consecutive $-G_d^P$, $+G_d$, consecutive $+G_d$, $-G_d^P$, consecutive $-G_b$, $-G_b^P$, consecutive $-G_a$, $+G_d^P$, $-G_d$, or consecutive $-G_b^P$, $-G_b$.

$HE\text{-}LTF_{2x}$ (−500:2:500) =
[+1, +1, −1, +1, +1, +1, −1, +1, +1, +1, +1, −1, −1, −1, +1,
−1, −1, +1, +1, −1, +1, +1, +1, −1, −1, −1, −1, +1, +1, +1,
+1, −1, +1, +1, +1, −1, +1, −1, −1, +1, −1, −1, −1, +1, +1,
−1, −1, −1, +1, −1, −1, +1, −1, +1, +1, −1, +1, +1, −1, +1,
−1, −1, −1, +1, −1, −1, −1, −1, +1, −1, −1, +1, +1, −1, +1,
+1, +1, −1, −1, −1, −1, +1, −1, +1, +1, +1, −1, +1, +1, +1,
+1, −1, −1, −1, +1, +1, +1, −1, −1, +1, +1, +1, −1, +1, +1,
−1, +1, −1, −1, −1, −1, +1, −1, −1, −1, +1, −1, +1, +1, −1,
+1, −1, +1, +1, +1, −1, +1, +1, +1, −1, +1, −1, −1, +1, −1,
−1, −1, +1, +1, −1, −1, −1, +1, −1, −1, +1, −1, +1, +1, −1,
+1, −1, −1, −1, +1, −1, −1, −1, −1, +1, +1, +1, −1, +1, +1,
−1, −1, +1, −1, −1, −1, +1, +1, +1, +1, −1, −1, −1, +1, +1,
+1, +1, −1, +1, +1, +1, −1, +1, −1, −1, −1, +1, +1, −1, −1,
−1, +1, −1, −1, +1, −1, +1, +1, +1, +1, −1, +1, +1, +1, −1,
+1, −1, −1, +1, −1, −1, +1, −1, −1, +1, +1, −1, +1, +1, +1,
−1, −1, −1, −1, +1, −1, +1, +1, +1, −1, +1, +1, +1, +1, −1, -continued −1, −1, +1, −1, +1, +1, −1, −1, +1, 0, 0, 0, +1, +1, +1,
−1, −1, −1, +1, +1, +1, +1, −1, −1, −1, −1, +1, −1, −1, −1,
+1, −1, +1, +1, +1, +1, −1, −1, −1, +1, −1, −1, +1, +1, −1,
+1, +1, −1, +1, +1, −1, +1, −1, −1, −1, +1, −1, −1, −1, −1,
+1, −1, +1, +1, −1, +1, +1, +1, −1, −1, +1, +1, +1, −1, +1,
−1, −1, −1, +1, −1, −1, −1, −1, +1, +1, +1, −1, −1, −1, −1,
+1, +1, +1, −1, +1, +1, −1, −1, +1, −1, −1, −1, +1, +1, +1,
+1, −1, +1, +1, +1, −1, +1, −1, −1, +1, −1, +1, +1, −1, +1,
+1, +1, −1, −1, +1, +1, +1, −1, +1, +1, −1, +1, −1, −1, −1,
+1, −1, −1, −1, +1, +1, −1, +1, +1, −1, +1, −1, −1, −1, +1,
−1, −1, −1, −1, +1, −1, +1, +1, −1, +1, +1, +1, −1, −1, +1,
+1, +1, −1, −1, −1, +1, +1, +1, +1, −1, +1, +1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, +1, +1, −1, +1,
−1, −1, +1, −1, −1, −1, +1, +1, −1, −1, −1, +1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, +1, +1, +1, −1,
+1, +1, +1, −1, +1, +1]

After the fourth HE-LTF sequence is used, PAPR values corresponding to the fourth HE-LTF sequence are the same as the PAPR values of the third HE-LTF sequence. For details, refer to FIG. 11. It may be learned, according to the group of PAPR values, that when different rotational phases are introduced in pilot subcarriers and other subcarriers, PAPR values are still very small.

Embodiment 4

There are 256 subcarriers on a 4× symbol of the 20-MHz bandwidth in the 4× mode. According to different resource block sizes, an RU size shown in FIG. 1*a* may be 26, 52, 106, or 242 subcarriers.

There are many types of HE-LTF sequences in the 20-MHz 242-subcarrier 4× mode. Only several types of the HE-LTF sequences are listed below.

A first HE-LTF sequence in the 20-MHz 242-subcarrier 4× mode:

$$HELTF_{4x}(-122:122) = \{+1, -G_c, -G_c^p, +1, +G_d, -G_d^p, +G_e(1:13), +1,$$

$$-1, 0, 0, 0, +1, -1, +G_e(14:26), -G_c, +G_c^p, +1, +G_d, +G_d^p, +1\}$$

where $G_e$={1, −1, 1, −1, 1, 1, 1, 1, −1, −1, −1, 1, 1, 1, 1, 1, 1, 1, 1, −1, 1, −1, −1, 1, 1, −1}.

The HE-LTF sequence includes the $G_e$ sequence, derived sequences $G_c$, $G_c^P$, $G_d$, and $G_d^P$ that are generated according to the Ga sequence and the Gb sequence, and +1 or −1 that is located at a leftover subcarrier location. Further, the HE-LTF sequence may further include consecutive $-G_c$, $-G_c^P$, consecutive $+G_d$, $-G_d^P$, consecutive $-G_c$, $+G_c^P$, or consecutive $+G_d$, $+G_d^P$.

The HE-LTF sequence may also be directly stored as:

$$HE\text{-}LTF_{4x}(-122:122) = [+1, -1, +1, -1, +1, -1, +1, +1, +1, -1,$$

$$+1, +1, +1, -1, -1, +1, -1, -1, -1, -1, -1, +1, +1, -1, -1, -1,$$

$$-1, -1, +1, -1, +1, -1, -1, +1, +1, -1, +1, +1, +1, -1, -1, +1,$$

$$-1, -1, -1, -1, +1, +1, +1, -1, -1, -1, -1, +1, +1, -1, +1, -1,$$

$$-1, +1, +1, -1, +1, -1, +1, +1, +1, -1, -1, +1, -1, -1, -1, +1,$$

$$-1, -1, -1, -1, -1, -1, -1, +1, -1, +1, +1, -1, +1, +1, -1, +1,$$

$$-1, -1, -1, +1, +1, -1, +1, +1, +1, -1, -1, +1, +1, +1, +1, +1,$$

-continued

+1, −1, +1, −1, +1, +1, +1, +1, −1, −1, −1, +1, +1, +1, −1, 0, 0, 0, +1, −1, +1, +1, +1, +1, +1, +1, −1, +1, −1, −1, +1, +1,

−1, −1, +1, −1, +1, −1, +1, +1, +1, −1, +1, +1, +1, −1, −1, +1,

−1, −1, −1, −1, −1, +1, +1, −1, −1, −1, −1, +1, −1, +1, −1, +1,

+1, −1, −1, +1, −1, −1, −1, +1, +1, −1, +1, +1, +1, +1, −1,

−1, −1, +1, +1, +1, +1, +1, +1, −1, +1, −1, −1, +1, +1, −1,

+1, −1, +1, +1, +1, −1, −1, +1, −1, −1, −1, +1, −1, −1, −1,

−1, −1, −1, +1, −1, +1, −1, −1, +1, −1, −1, +1, −1, +1, +1,

+1, −1, −1, +1, −1, −1, −1, +1, +1, −1, −1, −1, −1, −1, +1].

Figure 12:
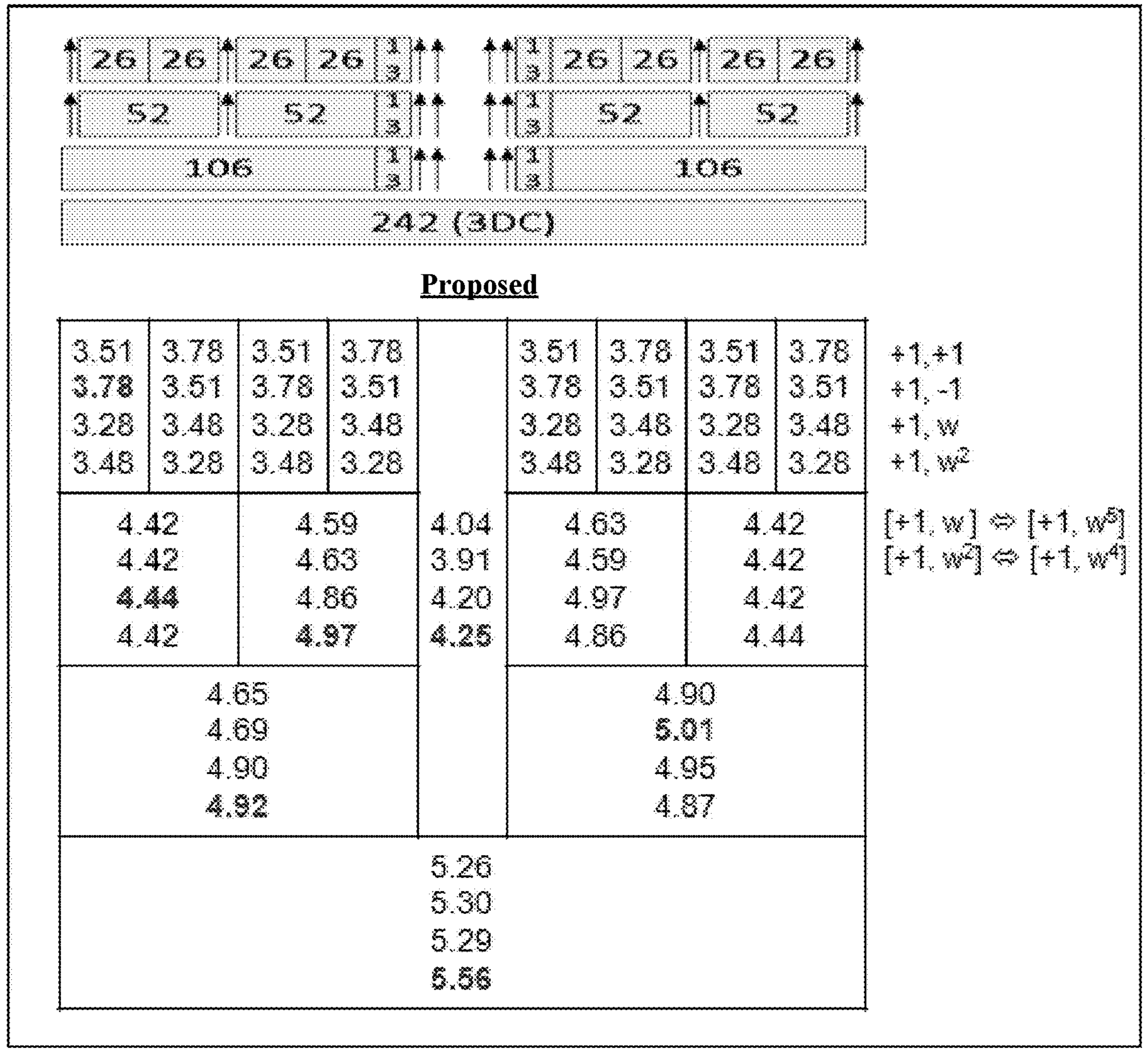
FIG. 12 shows PAPR values that are obtained by means of preferred 4×HE-LTF sequence simulation in a 20-MHz bandwidth transmission.

FIG. 12 shows PAPR values of an HE-LTF sequence in the 20-MHz bandwidth. It may be learned, according to the group of PAPR values, that when different rotational phases are introduced in pilot subcarriers and other subcarriers, PAPR values are still very small.

The first group of values is sequentially PAPR values corresponding to 26-subcarrier resource blocks from left to right. Values in the first row, 3.51, 3.78, 3.51, 3.78, . . . , are PAPR values corresponding to an HE-LTF sequence when values at data locations are all multiplied by +1 and values at pilot locations are all multiplied by +1, and sequentially from left to right in the first row, 3.51 is a PAPR value corresponding to a first 26-subcarrier resource block, 3.78 is a PAPR value corresponding to a second 26-subcarrier resource block from left to right, and so on. Values in the second row, 3.78, 3.51, 3.78, 3.51, . . . , are PAPR values corresponding to an HE-LTF sequence when values at data locations are all multiplied by −1 and values at pilot locations are all multiplied by +1, and sequentially from left to right in the second row, 3.78 is a PAPR value corresponding to a first 26-subcarrier resource block, 3.51 is a PAPR value corresponding to a second 26-subcarrier resource block from left to right, and so on. Values in the third row, 3.28, 3.48, 3.28, 3.48, . . . , are PAPR values corresponding to an HE-LTF sequence when values at data locations are all multiplied by w and values at pilot locations are all multiplied by +1, and sequentially from left to right in the third row, 3.28 is a PAPR value corresponding to a first 26-subcarrier resource block, 3.48 is a PAPR value corresponding to a second 26-subcarrier resource block from left to right, and so on. Values in the fourth row, 3.48, 3.28, 3.48, 3.28, . . . , are PAPR values corresponding to an HE-LTF sequence when values at data locations are all multiplied by $w^2$ and values at pilot locations are all multiplied by +1, and sequentially from left to right in the fourth row, 3.48 is a PAPR value corresponding to a first 26-subcarrier resource block, 3.28 is a PAPR value corresponding to a second 26-subcarrier resource block from left to right, and so on.

The second group of values is sequentially PAPR values corresponding to 52-subcarrier resource blocks in a second row from left to right. Values in the first row, 4.42, 4.59, 4.63, and 4.42, are PAPR values corresponding to an HE-LTF sequence when values at data locations are all multiplied by +1 and values at pilot locations are all multiplied by +1, and sequentially from left to right in the first row, the first 4.42 is a PAPR value corresponding to a first 52-subcarrier resource block, and the second 4.59 is a PAPR value corresponding to a second 52-subcarrier resource block from left to right, and so on. Values in the second row, 4.42, 4.63, 4.59, and 4.42, are PAPR values corresponding to an HE-LTF sequence when values at data locations are all multiplied by −1 and values at pilot locations are all multiplied by +1, and sequentially from left to right in the second row, the first 4.42 is a PAPR value corresponding to a first 52-subcarrier resource block, the second 4.63 is a PAPR value corresponding to a second 52-subcarrier resource block from left to right, and so on. Values in the third row, 4.44, 4.86, 4.97, and 4.42, are PAPR values corresponding to an HE-LTF sequence when values at data locations are all multiplied by w and values at pilot locations are all multiplied by +1, and sequentially from left to right in the third row, the first 4.44 is a PAPR value corresponding to a first 52-subcarrier resource block, a second 4.86 is a PAPR value corresponding to a second 52-subcarrier resource block from left to right, and so on. Values in the fourth row, 4.42, 4.97, 4.86, and 4.44, are PAPR values corresponding to an HE-LTF sequence when values at data locations are all multiplied by $w^2$ and values at pilot locations are all multiplied by +1, and sequentially from left to right in the fourth row, the first 4.42 is a PAPR value corresponding to a first 52-subcarrier resource block, the second 4.97 is a PAPR value corresponding to a second 52-subcarrier resource block from left to right, and so on.

The third group of values is sequentially PAPR values corresponding to 106-subcarrier resource blocks in a third row from left to right. Values in the first row, 4.65 and 4.90, are PAPR values corresponding to an HE-LTF sequence when values at data locations are all multiplied by +1 and values at pilot locations are all multiplied by +1, and sequentially from left to right in the first row, 4.65 is a PAPR value corresponding to a first 106-subcarrier resource block, and 4.90 is a PAPR value corresponding to a second 106-subcarrier resource block from left to right. Values in the second row, 4.69 and 5.01, are PAPR values corresponding to an HE-LTF sequence when values at data locations are all multiplied by −1 and values at pilot locations are all multiplied by +1, and sequentially from left to right in the second row, 4.69 is a PAPR value corresponding to a first 106-subcarrier resource block, and 5.01 is a PAPR value corresponding to a second 106-subcarrier resource block from left to right. Values in the third row, 4.90 and 4.95, are PAPR values corresponding to an HE-LTF sequence when values at data locations are all multiplied by w and values at pilot locations are all multiplied by +1, and sequentially from left to right in the third row, 4.90 is a PAPR value corresponding to a first 106-subcarrier resource block, and 4.95 is a PAPR value corresponding to a second 106-subcarrier resource block from left to right. Values in the fourth row, 4.92 and 4.87, are PAPR values corresponding to an HE-LTF sequence when values at data locations are all multiplied by $w^2$ and values at pilot locations are all multiplied by +1, and sequentially from left to right in the fourth row, 4.92 is a PAPR value corresponding to a first 106-subcarrier resource block, and 4.87 is a PAPR value corresponding to a second 106-subcarrier resource block from left to right.

The fourth group of values, 5.26, 5.30, 5.29, and 5.56, are PAPR values corresponding to 242-subcarrier resource blocks in a fourth row. The first 5.26 is a PAPR value corresponding to an HE-LTF sequence when values at data locations are all multiplied by +1 and values at pilot locations are all multiplied by +1. The second 5.30 is a PAPR value corresponding to an HE-LTF sequence when values at data locations are all multiplied by −1 and values at pilot locations are all multiplied by +1. The third 5.29 is a PAPR value corresponding to an HE-LTF sequence when values at data locations are all multiplied by w and values at pilot locations are all multiplied by +1. The first 5.56 is a PAPR value corresponding to an HE-LTF sequence when values at data locations are all multiplied by $w^2$ and values at pilot locations are all multiplied by +1.

A second HE-LTF sequence in the 20-MHz 242-subcarrier 4× mode:

$$\begin{aligned} HELTF_{4x}(-122:122) = \{&+1, +G_a, +G_a^p, -1, +G_b, -G_b^p, +G_e(1:13), -1,\\ &-1, 0, 0, 0, +1, +1, +G_e(14:26), -G_a, -G_a^p, -1, +G_b, +G_b^p, +1\} \end{aligned}$$

where $G_e$={1, 1, 1, 1, 1, −1, 1, −1, −1, 1, −1, −1, 1, 1, −1, 1, −1, 1, −1, −1, −1, −1, 1, 1, −1, −1}.

The HE-LTF sequence includes the $G_e$ sequence, the Ga sequence and the Gb sequence, derived sequences $G_a^P$ and $G_b^P$ that are generated according to the Ga sequence and Gb sequence, and +1 or −1 that is located at a leftover subcarrier location. Further, the HE-LTF sequence may further include: consecutive $+G_a$, $+G_a^P$, consecutive $+G_b$, $-G_b^P$, consecutive $+G_a$, $-G_a^P$, consecutive $+G_b$, $+G_b^P$, or $+G_e(1:13)$, $+G_e(14:26)$.

The HE-LTF sequence may also be directly stored as:

$$\begin{aligned} HE\text{-}LTF_{4x}(-122:122) = [&+1, +1, +1, +1, +1, +1, +1, -1, +1, +1, +1,\\ &-1, +1, +1, -1, -1, -1, +1, -1, +1, -1, -1, +1, +1, -1, +1, -1, +1,\\ &+1, +1, +1, +1, -1, -1, +1, +1, +1, -1, +1, +1, -1, -1, -1, +1, -1,\\ &+1, +1, -1, +1, +1, -1, +1, -1, -1, +1, +1, +1, +1, -1, -1, +1, +1,\\ &+1, +1, +1, -1, +1, +1, -1, -1, -1, +1, -1, -1, -1, +1, -1, +1, -1,\\ &+1, -1, -1, -1, -1, +1, +1, +1, -1, -1, -1, -1, +1, -1, -1, +1, +1,\\ &+1, -1, +1, +1, -1, -1, +1, -1, +1, -1, +1, +1, +1, +1, +1, -1, +1,\\ &-1, -1, +1, -1, -1, +1, -1, -1, 0, 0, 0, +1, +1, +1, -1, +1, -1, +1,\\ &-1, -1, -1, -1, +1, +1, -1, -1, +1, +1, +1, +1, +1, +1, -1, +1,\\ &+1, +1, -1, +1, +1, -1, -1, -1, +1, -1, +1, -1, -1, +1, +1, -1,\\ &+1, -1, -1, -1, -1, -1, -1, +1, +1, -1, -1, -1, +1, -1, -1, +1,\\ &+1, +1, -1, +1, -1, -1, +1, -1, -1, +1, -1, +1, -1, +1, +1, +1,\\ &+1, -1, -1, +1, +1, +1, +1, +1, -1, +1, +1, -1, -1, -1, +1, -1,\\ &-1, -1, +1, -1, +1, +1, +1, +1, +1, -1, -1, -1, +1, +1, +1, +1,\\ &-1, +1, +1, -1, -1, -1, +1, -1, -1, +1, +1, -1, +1, -1, +1, +1]. \end{aligned}$$

A person skilled in the art knows that if the foregoing brief Equation is used to express the foregoing sequence, the foregoing sequence should be:

$$\begin{aligned} &HELTF_{4x}(-122:122) =\\ &\{+1, +G_a, +G_a^p, -1, +G_b, -G_b^p, +G_e(1:13), -1, -1, 0,\\ &0, 0, +1, +1, +G_e(14:26), +G_a, -G_a^p, -1, +G_b, +G_b^p, +1\}. \end{aligned}$$

After the second HE-LTF sequence is used, PAPR values corresponding to the second HE-LTF sequence are the same as PAPR values of the first HE-LTF sequence. Referring to FIG. 12, it may be learned, according to the group of PAPR values, that when different rotational phases are introduced in pilot subcarriers and other subcarriers, PAPR values are still very small.

Embodiment 5

There are 512 subcarriers on a 4× symbol of the 40-MHz bandwidth in the 4× mode. According to different resource block sizes, as shown in FIG. 1*b*, an RU size may be 26, 52, 106, 242, or 484 subcarriers.

There are many types of HE-LTF sequences in the 40-MHz 484-subcarrier 4× mode. Only several types of the HE-LTF sequences are listed below.

A first HE-LTF sequence in the 40-MHz 4× mode:

$HELTF_{4x}(-244:244)=\{+1, -G_a, +G_a^P, +1, -1, -G_c, -G_c^P, +1, +\tilde{G}_b, +1, +G_a, -G_a^P, -1, +1, -G_c, -G_c^P, +1, 0, 0, 0, 0, 0, -1, +G_b^P, +G_b, -1, -1, -G_d^P, +G_d, +1, +G_c^P, +1, -G_b^P, -G_b, +1, -1, -G_d^P, +G_d, +1\}$.

The HE-LTF sequence includes the Ga sequence and the Gb sequence, sequences $G_c$, $G_c^P$, $G_a^P$, $G_b^P$, $G_d^P$, and $G_d$ that are generated according to the Ga sequence and the Gb sequence, and +1 or −1 that is located at a leftover subcarrier location.

Further, the HE-LTF sequence may further include consecutive $-G_a$, $+G_a^P$, consecutive $-G_c$, $-G_c^P$, consecutive $+G_a$, $-G_a^P$, consecutive $+G_b^P$, $+G_b$, consecutive $-G_d^P$, $+G_d$, or consecutive $-G_b^P$, $-G_b$.

The HE-LTF sequence may also be directly stored as:

$$\begin{aligned} HE\text{-}LTF_{4x}(-244:244) = [&+1, -1, -1, -1, -1, -1, -1, +1, -1, -1,\\ &-1, +1, -1, -1, +1, +1, +1, -1, +1, -1, +1, +1, -1, -1, +1, -1,\\ &+1, +1, +1, +1, +1, +1, -1, -1, +1, +1, +1, -1, +1, +1, -1, -1,\\ &-1, +1, -1, +1, +1, -1, +1, +1, -1, +1, -1, +1, -1, -1, +1, -1,\\ &+1, -1, +1, +1, +1, -1, +1, +1, +1, -1, -1, +1, -1, -1, -1, -1,\\ &-1, +1, +1, -1, -1, -1, -1, -1, +1, -1, +1, -1, -1, +1, +1, -1,\\ &+1, +1, +1, -1, -1, +1, -1, -1, -1, -1, +1, +1, +1, -1, -1, -1,\\ &-1, +1, +1, -1, +1, -1, -1, +1, +1, -1, +1, -1, +1, +1, +1, -1,\\ &-1, +1, -1, -1, -1, +1, -1, -1, -1, -1, -1, -1, +1, +1, +1, +1,\\ &+1, +1, +1, -1, +1, +1, +1, -1, +1, +1, -1, -1, -1, +1, -1, +1,\\ &-1, -1, +1, +1, -1, +1, -1, -1, -1, -1, -1, -1, +1, +1, -1, -1,\\ &-1, +1, -1, -1, +1, +1, +1, -1, +1, -1, -1, +1, -1, -1, +1, -1,\\ &+1, -1, +1, -1, +1, -1, +1, -1, +1, +1, +1, -1, +1, +1, +1, -1,\\ &-1, +1, -1, -1, -1, -1, -1, +1, +1, -1, -1, -1, -1, -1, +1, -1,\\ &+1, -1, -1, +1, +1, -1, +1, +1, +1, -1, -1, +1, -1, -1, -1, -1,\\ &+1, +1, +1, -1, -1, -1, -1, +1, 0, 0, 0, 0, 0, -1, +1, +1, +1,\\ &+1, -1, -1, -1, +1, +1, +1, +1, -1, +1, +1, -1, -1, -1, +1, -1,\\ &-1, +1, +1, -1, +1, -1, +1, +1, +1, +1, +1, -1, -1, +1, +1, +1,\\ &+1, +1, -1, +1, +1, -1, -1, -1, +1, -1, -1, -1, +1, -1, +1, -1,\\ &+1, -1, -1, -1, +1, -1, +1, +1, -1, +1, +1, -1, +1, -1, -1, -1,\\ &+1, +1, -1, +1, +1, +1, -1, -1, +1, +1, +1, +1, +1, +1, -1, +1,\\ &-1, -1, +1, +1, -1, +1, -1, +1, +1, +1, -1, -1, +1, -1, -1, -1,\\ &+1, -1, -1, -1, -1, -1, -1, +1, +1, -1, +1, -1, +1, +1, -1, -1,\\ &+1, -1, -1, -1, +1, +1, -1, +1, +1, +1, +1, -1, -1, -1, +1, +1,\\ &+1, +1, +1, -1, -1, -1, -1, +1, +1, +1, -1, -1, -1, -1, +1, -1,\\ &-1, +1, +1, +1, -1, +1, +1, -1, -1, +1, -1, +1, -1, -1, -1, -1,\\ &-1, +1, +1 - 1, -1, -1, -1, -1, +1, -1, -1, +1, +1, +1, -1, +1, \end{aligned}$$

-continued

+1, +1, −1, +1, −1, +1, −1, +1, −1, −1, +1, −1, +1, +1, −1, +1,
+1, −1, +1, −1, −1, −1, +1, +1, −1, +1, +1, +1, −1, −1, +1, +1,
+1, +1, +1, +1, −1, +1, −1, −1, +1, +1, −1, +1, −1, +1, +1,
+1, −1, −1, +1, −1, −1, −1, +1, −1, −1, −1, −1, −1, −1, +1].

A person skilled in the art knows that if the foregoing brief Equation is used to express the foregoing sequence, the foregoing sequence should be:

$HELTF_{4x}(-244:244)=\{+1, -G_a, +G_a^p, +1, -1, -G_c, -G_c^p, +1, +G_d, +1, +G_a, -G_a^p, -1, +1, -G_c, -G_c^p, +1, 0, 0, 0, 0, 0, -1, +G_b^p, +G_b, -1, -1, -G_d^p, +G_d, +1, +G_c^p, +1, -G_b^p, -G_b, +1, -1, -G_d^p, +G_d, +1\}$.

Figure 13:
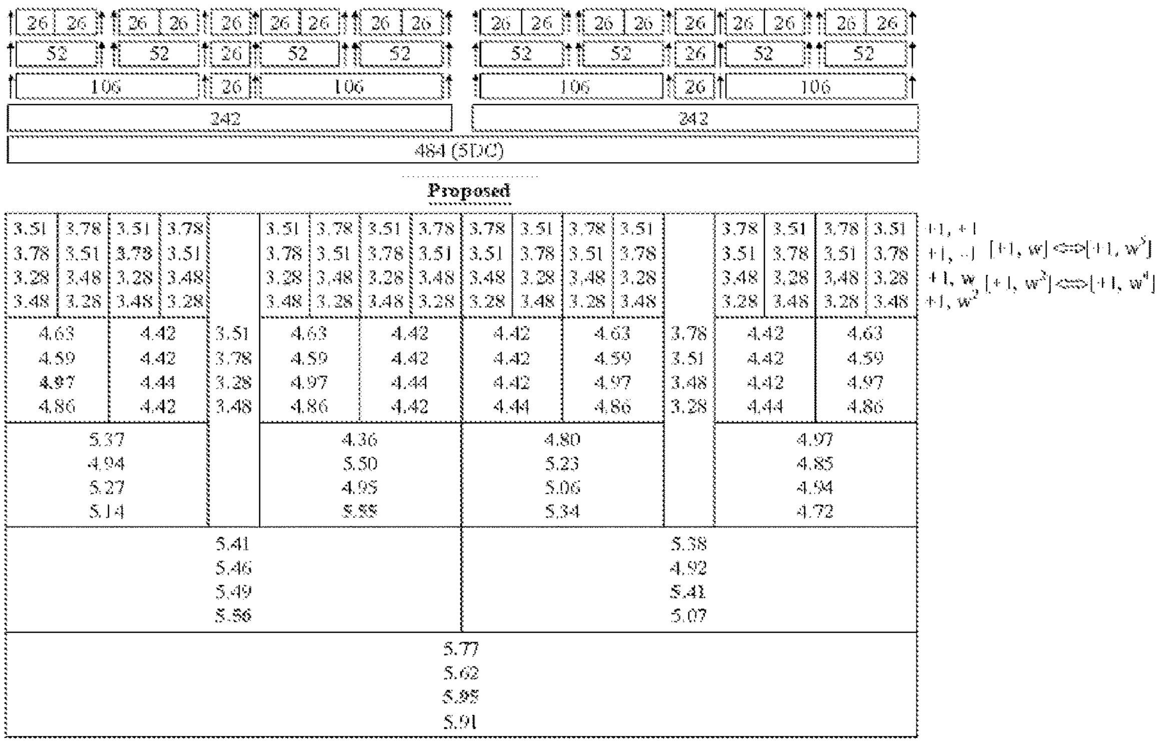
FIG. 13 shows PAPR values that are obtained by means of preferred 4×HE-LTF sequence simulation in a 40-MHz bandwidth transmission.

FIG. 13 shows PAPR values of an HE-LTF sequence in the 40-MHz bandwidth. It may be learned, according to the group of PAPR values, that when different rotational phases are introduced in pilot subcarriers and other subcarriers, PAPR values are still very small. For a manner of reading data in the table, refer to the foregoing embodiment, and details are not described herein again.

A second HE-LTF sequence in the 40-MHz 4× mode:

$HELTF_{4x}(-244:244)=\{+1, +G_c, -G_c^p, -1, -1, +G_a, +G_a^p, -1, +G_b, +1, -G_c, +G_c^p, +1, +1, -G_a, +G_a^p, -1, 0, 0, 0, 0, 0, +1, +G_d^p, +G_d, -1, +1, -G_b^p, +G_b, +1, -G_a^p, -1, -G_d^p, -G_d, +1, +1, -G_b^p, +G_b, +1\}$.

The HE-LTF sequence includes the Ga sequence and the Gb sequence, sequences $G_c$, $G_c^p$, $G_a^p$, $G_b^p$, $G_d^p$, and $G_d$ that are generated according to the Ga sequence and the Gb sequence, and +1 or −1 that is located at a leftover subcarrier location.

Further, the HE-LTF sequence may further include consecutive $G_c$, $-G_c^p$, consecutive $+G_a$, $+G_a^p$, consecutive $-G_c$, $+G_c^p$, consecutive $+G_d^p$, $+G_d$, consecutive $-G_b^p$, $+G_b$, or consecutive $-G_b^p$, $+G_b$.

The HE-LTF sequence may also be directly stored as:

$HE\text{-}LTF_{4x}(-244:244)$ = [+1, +1, −1, +1, −1, +1, −1, −1, −1, +1,
−1, −1, −1, +1, +1, −1, +1, +1, +1, +1, +1, −1, −1, +1, +1, +1,
+1, −1, +1, −1, +1, −1, −1, +1, +1, −1, +1, +1, +1, −1, −1, +1,
−1, −1, −1, −1, +1, +1, +1, −1, −1, −1, −1, −1, −1, +1, +1, +1,
+1, +1, +1, −1, +1, +1, +1, −1, +1, +1, −1, −1, −1, +1, −1, +1,
−1, −1, +1, +1, −1, +1, −1, +1, +1, +1, +1, +1, −1, −1, +1, +1,
+1, −1, +1, +1, −1, −1, −1, +1, −1, +1, +1, −1, +1, +1, −1, +1,
−1, −1, +1, +1, +1, +1, −1, −1, +1, +1, +1, +1, +1, −1, +1, +1,
−1, −1, −1, +1, −1, −1, −1, +1, −1, +1, −1, +1, +1, −1, +1, −1,
+1, −1, +1, +1, +1, −1, +1, +1, +1, −1, −1, +1, −1, −1, −1, −1,
−1, +1, +1, −1, −1, −1, −1, +1, −1, +1, −1, +1, +1, −1, −1, −1,
+1, −1, −1, −1, +1, +1, −1, +1, +1, +1, +1, −1, −1, −1, +1, +1,
+1, +1, +1, +1, +1, +1, +1, +1, +1, +1, −1, +1, +1, +1, −1, +1,
+1, −1, −1, −1, +1, −1, +1, −1, −1, +1, +1, −1, +1, −1, +1, +1,
+1, +1, +1, −1, −1, +1, +1, +1, −1, +1, +1, −1, −1, −1, +1, −1,
+1, +1, −1, +1, +1, −1, +1, −1, −1, 0, 0, 0, 0, 0, +1, +1, −1, +1,
−1, −1, +1, −1, −1, +1, −1, +1, +1, +1, −1, −1, +1, −1, −1, −1,
+1, +1, −1, −1, −1, −1, −1, +1, −1, +1, −1, −1, +1, +1, −1, +1, -continued −1, +1, +1, +1, −1, −1, +1, −1, −1, −1, +1, −1, −1, −1, −1, −1,
−1, −1, +1, −1, −1, −1, −1, +1, +1, +1 − 1, −1, −1, −1, +1, −1,
−1, +1, +1, +1, −1, +1, +1, −1, −1, +1, −1, +1, −1, +1, +1, +1,
+1, −1, −1, +1, +1, +1, +1, +1, −1, +1, +1, −1, −1, −1, +1, −1,
−1, −1, +1, −1, +1, −1, +1, +1, −1, −1, −1, −1, −1, +1, +1, −1,
−1, −1, +1, −1, −1, +1, +1, +1, −1, +1, −1, −1, +1, −1, −1, +1,
−1, +1, −1, −1, +1, −1, +1, +1, −1, +1, +1, −1, +1, −1, −1, −1,
+1, +1, −1, +1, +1, +1, −1, −1, +1, +1, +1, +1, +1, −1, +1, −1,
+1, +1, −1, −1, +1, −1, +1, −1, −1, −1, +1, +1, −1, +1, +1, +1,
−1, +1, +1, +1, +1, +1, +1, +1, +1, −1, −1, −1, −1, +1, +1, +1,
−1, −1, −1, −1, +1, −1, −1, +1, +1, +1, −1, +1, +1, −1, −1, +1,
−1, +1, −1, +1, +1, +1, +1, −1, −1, +1, +1, +1, +1, +1, −1,
+1, +1, −1, −1, −1, +1, −1, −1, −1, +1, −1, +1, −1, +1, +1].

After the second HE-LTF sequence is used, PAPR values corresponding to the second HE-LTF sequence are the same as PAPR values of the first HE-LTF sequence. Referring to FIG. 13, it may be learned, according to the group of PAPR values, that when different rotational phases are introduced in pilot subcarriers and other subcarriers, PAPR values are still very small.

Embodiment 6

The 80-MHz bandwidth has 1024 subcarriers. According to different resource block sizes, as shown in FIG. 1*c*, an RU size may be 26, 52, 106, 242, 484, or 996 subcarriers.

There may be many types of HE-LTF sequences for 4× symbol of the 996 subcarriers in an 80 MHz transmission. Several types of the HE-LTF sequences are listed as follows:

A first 4×HE-LTF sequence in an 80 MHz transmission is:

$$HELTF_{4x}(-500:500) =$$
$$\{+1, +G_c, -G_c^p, -1, -1, +G_a, +G_a^p, -1, +G_b, +1, -G_c, +G_c^p, -1, +1, +G_a, +G_a^p, -1, +1, -G_c, +G_c^p, -1, +1, -G_a, -G_a^p, +1, +G_b, +1, -G_c, +G_c^p, -1, -1, +G_a, +G_a^p, -1, -G_c(1:13), +1, 0, 0, 0, 0, 0, +1, -G_e(14:26), +1, -G_d, +G_d^p, +1, -1, -G_b, -G_b^p, -1, -G_a^p, +1, G_d, -G_d^p, -1, +1, -G_b, -G_b^p, +1, +1, +G_d, -G_d^p, -1, +1, +G_b, +G_b^p, -1, -G_a^p, -1, +G_d, -G_d^p, -1, +1, -G_b, -G_b^p, +1\}$$

where $G_e$={1, −1, 1, −1, 1, 1, 1, 1, −1, −1, −1, 1, 1, 1, 1, 1, 1, 1, 1, −1, 1, −1, −1, 1, 1, −1}.

The HE-LTF sequence includes the Ge sequence, the Ga sequence, and the Gb sequence, sequences $G_c$, $G_c^p$, $G_a^p$, $G_b^p$, $G_d^p$, and $G_d$ that are generated according to the Ga sequence and the Gb sequence, and +1 or −1 that is located at a leftover subcarrier location.

Further, the HE-LTF sequence may further include consecutive $+G_c$, $-G_c^p$, consecutive $+G_a$, $+G_a^p$, consecutive $-G_c$, $+G_c^p$, consecutive $+G_a$, $+G_a^p$, consecutive $-G_c$, $+G_c^p$, consecutive $-G_a$, $-G_a^p$, consecutive $-G_d$, $+G_d^p$, consecutive $-G_b$, $-G_b^p$, consecutive $+G_d$, $-G_d^p$, consecutive $-G_b$, $-G_b^p$, consecutive $+G_d$, $-G_d^p$, consecutive $+G_b$, $+G_b^p$, or $-G_e$(1:13), $-G_e$(14:26).

The HE-LTF sequence may also be directly stored as:

HE-LTF$_{4x}$ (−500:500) = [+1, +1, −1, +1, −1, +1, −1, −1,
−1, +1, −1, −1, −1, +1, +1,
−1, +1, +1, +1, +1, +1, −1, −1, +1, +1, +1, +1, −1, +1, −1,
+1, −1, −1, +1, +1, −1, +1, +1, +1, −1, −1, +1, −1, −1, −1,
−1, +1, +1, +1, −1, −1, −1, −1, −1, −1, +1, +1, +1, +1, +1,
+1, −1, +1, +1, +1, −1, +1, +1, −1, −1, −1, +1, −1, +1, −1,
−1, +1, +1, −1, +1, −1, +1, +1, +1, +1, +1, −1, −1, +1, +1,
+1, −1, +1, +1, −1, −1, −1, +1, −1, +1, +1, −1, +1, +1, −1,
+1, −1, −1, +1, +1, +1, +1, −1, −1, +1, +1, +1, +1, +1, −1,
+1, +1, −1, −1, −1, +1, −1, −1, −1, +1, −1, +1, −1, +1, +1,
−1, +1, −1, +1, −1, +1, +1, +1, −1, +1, +1, +1, −1, −1, +1,
−1, −1, −1, −1, −1, +1, +1, −1, −1, −1, −1, +1, −1, +1, −1,
+1, +1, −1, −1, +1, −1, −1, −1, +1, +1, −1, +1, +1, +1, +1,
−1, −1, −1, +1, +1, +1, +1, −1, +1, +1, +1, +1, +1, +1, +1,
−1, +1, +1, +1, −1, +1, +1, −1, −1, −1, +1, −1, +1, −1, −1,
+1, +1, −1, +1, −1, +1, +1, +1, +1, +1, −1, −1, +1, +1, +1,
−1, +1, +1, −1, −1, −1, +1, −1, +1, +1, −1, +1, +1, −1, +1,
−1, −1, +1, −1, +1, −1, +1, −1, +1, +1, +1, −1, +1, +1, +1,
−1, −1, +1, −1, −1, −1, −1, −1, +1, +1, −1, −1, −1, −1, +1,
−1, +1, −1, +1, +1, −1, −1, +1, −1, −1, −1, +1, +1, −1, +1,
+1, +1, +1, −1, −1, −1, +1, +1, +1, +1, −1, +1, −1, −1, −1,
−1, −1, −1, +1, −1, −1, −1, +1, −1, −1, +1, +1, +1, −1, +1,
−1, +1, +1, −1, −1, +1, −1, +1, −1, −1, −1, −1, −1, +1, +1,
−1, −1, −1, +1, −1, −1, +1, +1, +1, −1, +1, −1, −1, +1, −1,
−1, +1, −1, +1, +1, +1, +1, +1, +1, −1, −1, +1, +1, +1, +1,
+1, −1, +1, +1, −1, −1, −1, +1, −1, −1, −1, +1, −1, +1, −1,
+1, +1, −1, +1, −1, +1, −1, +1, +1, +1, −1, +1, +1, +1, −1,
−1, +1, −1, −1, −1, −1, −1, +1, +1, −1, −1, −1, −1, +1, −1,
+1, −1, +1, +1, −1, −1, +1, −1, −1, −1, +1, +1, −1, +1, +1,
+1, +1, −1, −1, −1, +1, +1, +1, +1, −1, −1, +1, +1, +1, +1,
+1, +1, −1, +1, +1, +1, −1, +1, +1, −1, −1, −1, +1, −1, +1,
−1, −1, +1, +1, −1, +1, −1, +1, +1, +1, +1, +1, −1, −1, +1,
+1, +1, −1, +1, +1, −1, −1, −1, +1, −1, +1, +1, −1, +1, +1,
−1, +1, −1, −1, −1, +1, −1, +1, −1, −1, −1, −1, +1, +1, +1,
−1, −1, +1, 0, 0, 0, 0, 0, +1, −1, −1, −1, −1, −1, −1,
+1, −1, +1, +1, −1, −1, +1, +1, −1, +1, −1, +1, +1, −1, −1,
+1, −1, +1, −1, −1, −1, +1, +1, −1, +1, +1, +1, −1, +1, +1,
+1, +1, +1, +1, +1, −1, +1, −1, −1, +1, −1, −1, +1, −1, +1,
+1, +1, −1, −1, +1, −1, −1, −1, +1, +1, −1, −1, −1, −1, −1,
+1, −1, −1, −1, −1, −1, +1, +1, −1, −1, −1, −1, −1, +1, −1,
−1, +1, +1, +1, −1, +1, +1, +1, −1, +1, −1, +1, −1, −1, −1,
−1, −1, +1, +1, +1, −1, −1, −1, −1, +1, −1, −1, +1, +1, +1,
−1, +1, +1, −1, −1, +1, −1, +1, −1, −1, −1, −1, −1, −1, −1,
+1, +1, −1, −1, −1, +1, −1, −1, +1, +1, +1, −1, +1, −1, −1,
+1, −1, −1, +1, −1, +1, +1, +1, −1, +1, −1, −1, +1, +1, −1,
+1, −1, +1, +1, +1, −1, −1, +1, −1, −1, −1, +1, −1, −1, −1,
−1, −1, −1, −1, +1, −1, +1, +1, −1, +1, +1, −1, +1, −1, −1,
−1, +1, +1, −1, +1, +1, +1, −1, −1, +1, +1, +1, +1, +1, −1,
+1, −1, −1, −1, −1, +1, +1, −1, −1, −1, −1, −1, +1, −1, −1,
+1, +1, +1, −1, +1, +1, +1, −1, +1, −1, +1, −1, −1, −1, −1,
−1, +1, +1, +1, −1, −1, −1, −1, +1, −1, −1, +1, +1, +1, −1,
+1, +1, −1, −1, +1, −1, +1, −1, +1, +1, +1, −1, +1, −1, −1,
+1, +1, −1, +1, −1, +1, +1, +1, −1, −1, +1, −1, −1, −1, +1,
−1, −1, −1, −1, −1, −1, −1, +1, −1, +1, +1, −1, +1, +1, −1,
+1, −1, −1, −1, +1, +1, −1, +1, +1, +1, −1, −1, +1, +1, +1,
+1, +1, −1, +1, +1, +1, +1, +1, −1, −1, +1, +1, +1, +1, +1,
−1, +1, +1, −1, −1, −1, +1, −1, −1, −1, +1, −1, +1, −1, +1,
+1, +1, +1, +1, −1, −1, −1, +1, +1, +1, +1, −1, +1, +1, −1,
−1, −1, +1, −1, −1, +1, +1, −1, +1, −1, +1, −1, −1, −1, −1,
−1, −1, +1, +1, −1, −1, −1, +1, −1, −1, +1, +1, +1, −1, +1,
−1, −1, +1, −1, −1, +1, −1, +1, −1, +1, −1, +1, −1, −1, +1,
+1, −1, +1, −1, +1, +1, +1, −1, −1, +1, −1, −1, −1, +1, −1,
−1, −1, −1, −1, −1, −1, +1, −1, +1, +1, −1, +1, +1, −1, +1,
−1, −1, −1, +1, +1, −1, +1, +1, +1, −1, −1, +1, +1, +1, +1,
+1, −1, +1, −1, −1, −1, −1, +1, +1, −1, −1, −1, −1, −1, +1,
−1, −1, +1, +1, +1, −1, +1, +1, +1, −1, +1, −1, +1, −1, −1,
−1, −1, −1, +1, +1, +1, −1, −1, −1, −1, +1, −1, −1, +1, +1,
+1, −1, +1, +1, −1, −1, +1, −1, +1, −1, +1].

Figure 14:
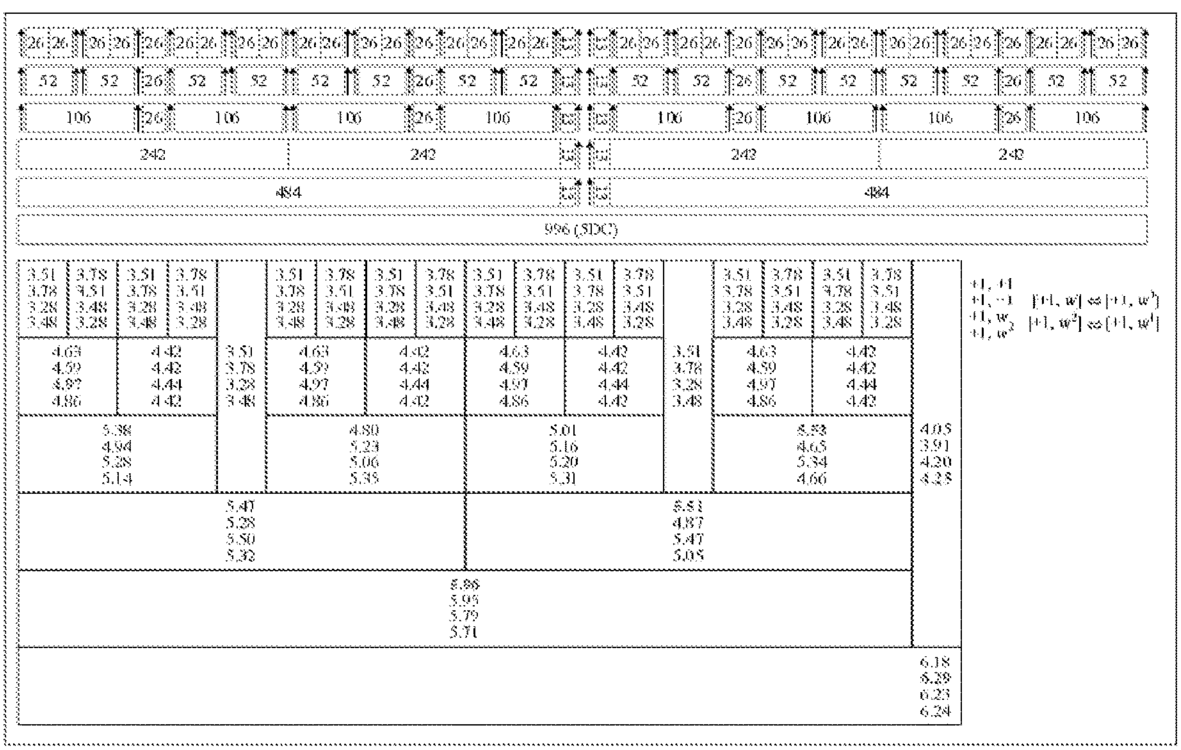
FIG. 14 shows PAPR values that are obtained by means of preferred 4×HE-LTF sequence simulation in an 80-MHz bandwidth transmission.

FIG. 14 shows PAPR values of an HE-LTF sequence in the 80-MHz bandwidth. It may be learned, according to the group of PAPR values, that when different rotational phases are introduced in pilot subcarriers and other subcarriers, PAPR values are still very small.

Second HE-LTF sequence on the 4× mode of the 80-MHz bandwidth:

$$HELTF_{4x}(-500:500) =$$

$$\{+1, -G_a, +G_a^p, +1, -1, -G_c, -G_c^p, +1, +G_d, +1, +G_a, -G_a^p, +1,$$
$$+1, -G_c, -G_c^p, +1, +1, +G_a, -G_a^p, +1, +1, +G_c, +G_c^p, -1, +G_d,$$
$$+1, +G_a, -G_a^p, +1, -1, -G_c, -G_c^p, +1, -G_e(1:13), -1, 0, 0, 0, 0,$$
$$0, -1, -G_e(14:26), -1, -G_b, +G_b^p, +1 +1, -G_d, -G_d^p, -1, +G_c^p,$$
$$-1, +G_b, -G_b^p, -1, -1, -G_d, -G_d^p, +1, -1, +G_b, -G_b^p, -1, -1,$$
$$+G_d, +G_d^p, -1, +G_c^p, +1, +G_b, -G_b^p, -1, -1, -G_d, -G_d^p, +1\}$$

where $G_e$={1, 1, 1, 1, 1, −1, 1, −1, −1, 1, −1, −1, 1, 1, −1, 1, −1, 1, −1, −1, −1, −1, 1, −1, −1}.

The HE-LTF sequence includes the Ge sequence, the Ga sequence, and the Gb sequence, sequences $G_c$, $G_c^P$, $G_a^P$, $G_b^P$, $G_d^P$, and $G_d$ that are generated according to the Ga sequence and the Gb sequence, and +1 or −1 that is located at a leftover subcarrier location.

Further, the HE-LTF sequence may further include consecutive $-G_a$, $+G_a^P$, consecutive $-G_c$, $-G_c^P$, consecutive $+G_a$, $-G_a^P$, consecutive $-G_c$, $-G_c^P$, consecutive $+G_a$, $-G_a^P$, consecutive $+G_c$, $+G_c^P$, consecutive $-G_b$, $+G_b^P$, consecutive $-G_d$, $-_d^P$, consecutive $+G_b$, $-G_b^P$, consecutive $-G_d$, $-G_d^P$, consecutive $+G_b$, $-G_b^P$, consecutive $+G_d$, $+G_d^P$, or $-G_e$(1:13), $-G_e$(14:26).

The HE-LTF sequence may also be directly stored as:

HE-LTF$_{4x}$ (−500:500) =
[+1, −1, −1, −1, −1, −1, −1, +1, −1, −1, −1, +1, −1, −1, +1,
+1, +1, −1, +1, −1, +1, +1, −1, −1, −1, −1, +1, +1, +1, +1,
+1, +1, −1, −1, +1, +1, +1, −1, +1, −1, −1, −1, −1, +1, −1,
+1, +1, −1, +1, +1, −1, +1, −1, +1, −1, −1, +1, −1, +1, −1,
+1, +1, +1, −1, +1, +1, +1, −1, −1, −1, −1, −1, −1, −1, −1,
+1, +1, −1, −1, −1, −1, −1, +1, −1, −1, −1, −1, +1, +1, −1,
+1, +1, +1, −1, −1, +1, −1, −1, −1, −1, +1, +1, +1, −1, −1,
−1, −1, +1, +1, −1, +1, −1, −1, +1, −1, −1, +1, −1, +1, +1,
+1, −1, −1, +1, −1, −1, −1, +1, −1, −1, −1, −1, −1, −1, +1,
+1, +1, +1, +1, +1, +1, −1, +1, +1, −1, −1, +1, +1, −1, −1,
−1, +1, −1, +1, −1, −1, +1, +1, −1, −1, −1, −1, −1, −1, −1,
−1, +1, +1, −1, −1, −1, +1, −1, −1, −1, +1, +1, −1, +1, −1,
−1, +1, −1, −1, +1, −1, +1, +1, +1, −1, +1, −1, +1, −1, +1,
+1, +1, −1, +1, +1, +1, −1, −1, +1, −1, −1, −1, −1, −1, +1,
+1, −1, −1, −1, −1, −1, +1, −1, +1, −1, −1, +1, +1, −1, +1,
+1, +1, −1, −1, +1, −1, −1, −1, −1, +1, +1, +1, −1, −1, −1,
−1, +1, +1, +1, +1, +1, +1, +1, +1, −1, +1, +1, +1, −1, +1,
+1, −1, −1, −1, +1, −1, +1, −1, −1, −1, +1, −1, +1, −1, −1,
−1, −1, −1, −1, +1, +1, −1, −1, −1, −1, −1, −1, +1, +1, +1,
−1, +1, −1, −1, +1, −1, −1, +1, −1, −1, +1, +1, +1, −1, +1,
−1, +1, −1, −1, −1, +1, −1, −1, −1, −1, +1, −1, +1, +1, +1,
+1, +1, −1, −1, +1, +1, +1, +1, +1, −1, +1, −1, +1, +1, −1,
−1, +1, −1, −1, −1, +1, +1, −1, +1, −1, +1, +1, −1, −1, −1,
+1, +1, +1, +1, −1, +1, −1, +1, −1, −1, +1, +1, −1, +1, −1,
+1, +1, +1, −1, −1, +1, −1, −1, −1, −1, −1, −1, −1, −1, −1,
−1, +1, +1, +1, +1, +1, +1, +1, −1, −1, +1, +1, −1, +1, +1,
−1, −1, −1, +1, −1, +1, −1, −1, +1, −1, −1, +1, −1, −1, −1,
−1, −1, −1, +1, +1, −1, −1, −1, +1, −1, −1, +1, +1, +1, −1,
+1, −1, −1, +1, −1, −1, +1, −1, +1, −1, −1, −1, +1, −1, +1,
−1, +1, +1, +1, −1, +1, +1, +1, −1, −1, +1, −1, −1, −1, −1,
−1, +1, +1, −1, −1, −1, −1, −1, +1, −1, +1, −1, −1, +1, +1,
−1, +1, +1, +1, −1, −1, +1, −1, −1, −1, −1, +1, +1, +1, −1,
−1, −1, −1, +1, −1, −1, −1, −1, −1, −1, −1, +1, +1, −1, +1,
+1, −1, −1, 0, 0, 0, 0, 0, −1, −1, +1, −1, +1, −1, +1,
+1, +1, +1, −1, −1, +1, +1, −1, −1, −1, −1, −1, +1, +1, −1,
−1, −1, −1, −1, +1, −1, −1, +1, +1, −1, −1, +1, +1, +1, −1,
+1, −1, +1, −1, +1, +1, +1, +1, −1, −1, −1, +1, +1, +1, +1,
−1, +1, +1, −1, −1, −1, +1, −1, −1, −1, +1, −1, +1, −1, +1,
+1, +1, −1, +1, −1, +1, +1, −1, −1, −1, −1, +1, −1, −1, −1,
+1, +1, −1, +1, +1, +1, −1, +1, +1, −1, +1, +1, +1, −1, +1,

-continued

−1, +1, +1, −1, +1, +1, −1, +1, −1, −1, −1, +1, +1, −1, +1,
+1, +1, −1, −1, +1, +1, +1, +1, +1, −1, +1, −1, +1, −1, +1,
+1, −1, −1, +1, −1, −1, −1, +1, +1, −1, +1, +1, +1, +1, −1,
−1, −1, +1, +1, +1, +1, −1, +1, +1, −1, +1, −1, −1, +1, +1,
+1, +1, +1, −1, +1, +1, −1, −1, −1, −1, −1, −1, −1, +1, −1,
+1, −1, +1, −1, −1, −1, −1, +1, +1, −1, −1, −1, −1, −1, +1,
−1, −1, +1, +1, +1, −1, +1, +1, −1, −1, +1, −1, +1, −1, −1,
−1, −1, +1, −1, +1, +1, −1, −1, +1, −1, +1, −1, −1, −1, +1,
+1, −1, +1, +1, +1, −1, +1, +1, +1, −1, +1, +1, −1, +1, −1,
+1, +1, −1, +1, +1, −1, +1, −1, −1, −1, +1, +1, −1, +1, +1,
+1, −1, −1, +1, +1, +1, +1, +1, +1, −1, +1, +1, +1, +1, −1,
−1, +1, +1, +1, +1, +1, −1, +1, +1, −1, −1, −1, +1, −1, −1,
−1, +1, −1, +1, −1, +1, −1, −1, −1, −1, +1, +1, +1, −1, −1,
−1, −1, +1, −1, −1, +1, +1, +1, −1, −1, +1, −1, −1, +1, −1,
+1, −1, −1, −1, +1, −1, +1, −1, −1, −1, +1, −1, +1, −1, +1,
+1, +1, −1, −1, +1, −1, −1, −1, +1, −1, −1, −1, −1, −1, −1,
+1, −1, +1, −1, −1, +1, −1, −1, +1, −1, +1, +1, +1, −1, −1,
+1, −1, −1, −1, +1, +1, −1, −1, −1, −1, −1, −1, +1, −1, +1,
−1, +1, +1, −1, −1, +1, −1, −1, −1, −1, +1, −1, +1, +1, +1,
+1, −1, −1, −1, +1, +1, +1, +1, +1, −1, +1, +1, +1, −1, −1,
+1, +1, +1, +1, +1, −1, +1, +1, −1, −1, −1, +1, −1, −1, −1,
+1, −1, +1, −1, +1, −1, −1, −1, −1, −1, +1, +1, −1, −1, −1,
−1, +1, −1, −1, +1, +1, +1, −1, +1, −1, −1, −1, +1, −1, +1,
−1, −1, −1, −1, +1, −1, +1, +1, −1, −1, +1, −1, +1, −1, −1,
−1, +1, +1, −1, +1, +1, +1, −1, +1, −1, +1, +1, +1, +1, −1,
+1, −1, +1, +1, −1, +1, +1, −1, +1, −1, −1, −1, +1, +1, −1,
+1, +1, +1, −1, −1, +1, +1, +1, +1, −1, +1].

After the second HE-LTF sequence on the 4× mode of the 80-MHz bandwidth is used, PAPR values corresponding to the second HE-LTF sequence are the same as PAPR values of the first HE-LTF sequence. Referring to FIG. 14, it may be learned, according to the group of PAPR values, that when different rotational phases are introduced in pilot subcarriers and other subcarriers, PAPR values are still very small.

Embodiment 7

A subcarrier design of a 4× symbol of the 160-MHz bandwidth may be obtained by splicing two subcarrier designs of a 4× symbol of the 80-MHz bandwidth. A primary 80 M band and a secondary 80 M band may be consecutively spliced or separated at a spacing of a particular bandwidth (for example, a spacing of 100 MHz). In addition, successive band locations of the primary 80 M band and the secondary 80 M band may be flexibly adjusted according to an actual case. Therefore, a 4×HE-LTF sequence ($LTF_{80\ MHz\_prime}$) of the primary 80 M band and a 4×HE-LTF sequence ($LTF_{80\ MHz\_second}$) Of the secondary 80 M band may be separately defined, and polarity is flexibly adjusted according to the spacing between the primary 80 M band and the secondary 80 M band and a successive order of the primary 80 M band and the secondary 80 M band by using an entire 80 M sequence as a unit, so as to obtain a lower PAPR.

For ease of description, P1 is used to denote a polarity adjustment coefficient of the primary 80 M sequence, and P2 is used to denote a polarity adjustment coefficient of the secondary 80 M sequence. If P1 is always +1, P2 may be +1 or −1. In this case, when an arrangement relationship of two 80 M channels is [primary 80 M, secondary 80 M], a 160 M sequence is: $HE\text{-}LTF_{160\ MHz}$=[P1*$LTF_{80\ MHz\_prime}$, BI, P2*$LTF_{80\ MHz\_second}$]; and when an arrangement relationship of two 80 M channels is [secondary 80 M, primary 80 M], the 160 M sequence is: $HE\text{-}LTF_{160\ MHz}$=[P2*$LTF_{80\ MHz\_second}$, BI, P1*$LTF_{80\ MHz\_prime}$]. BI indicates a frequency spacing between edge subcarriers of the two 80 M channels.

When the primary 80 M channel and the secondary 80 M channel are adjacent, BI=zeros (1, 23), that is, twenty-three 0s; and the $HE\text{-}LTF_{160\ MHz}$ sequence may be represented by:

in a case of [primary 80 M, secondary 80 M]:

$HE\text{-}LTF_{160\ MHz}$ (−1012:1012)=[P1*$LTF_{80\ MHz\_prime}$, zeros (1, 23), P2*$LTF_{80\ MHz\_second}$]

in a case of [secondary 80 M, primary 80 M]:

$HE\text{-}LTF_{160\ MHz}$ (−1012:1012)=[P2*$LTF_{80\ MHz\_second}$, zeros (1, 23), P1*$LTF_{80\ MHz\_prime}$]

where zeros (1, 23) indicates twenty-three 0s; and values at locations corresponding to the rest subcarrier indication numbers (for example, −1024:−1013 and 1013:1023) that are not displayed are 0 by default.

If the primary 80 M channel and the secondary 80 M channel are not adjacent, BI may be correspondingly adjusted.

In this embodiment, the HE-LTF sequence on a 996-subcarrier 4× symbol corresponding to a primary 80 MHz ($LTF_{80\ MHz\_\_prime}$) bandwidth is the first HE-LTF sequence in the 4× mode of the 80-MHz bandwidth in Embodiment 6, and the HE-LTF sequence on the 996-subcarrier 4× symbol of the primary 80 MHz bandwidth may be represented by:

$$LTF_{80MHz\_prime} =$$
$$\{+1, +G_c, -G_c^p, -1, -1, G_a, +G_a^p, -1, +G_b, +1, -G_c, +G_c^p, -1,$$
$$+1, +G_a, +G_a^p, -1, +1, -G_c, +G_c^p, -1, +1, -G_a, -G_a^p, +1, +G_b,$$
$$+1, -G_c, +G_c^p, -1, -1, +G_a, +G_a^p, -1, -G_e(1{:}13), +1, 0, 0, 0, 0,$$
$$0, +1, -G_e(14{:}26), +1, -G_d, +G_d^p, +1, -1, -G_b, -G_b^p, -1, -G_a^p,$$
$$+1, +G_d, -G_d^p, -1, +1, -G_b, -G_b^p, +1, +1, +G_d, -G_d^p, -1, +1,$$
$$+G_b, +G_b^p, -1, -G_a^p, -1, +G_d, -G_d^p, -1, +1, -G_b, -G_b^p, +1\}.$$

The HE-LTF sequence may also be represented by:

$LTF_{80\ MHz\_prime}$ = [+1, +1, −1, +1, −1, +1, −1, −1, −1, +1,
−1, −1, −1, +1, +1, −1, +1, +1, +1, +1, +1, −1, −1, +1, +1,
+1, +1, −1, +1, −1, +1, −1, −1, +1, +1, −1, +1, +1, +1, −1,
−1, +1, −1, −1, −1, −1, +1, +1, +1, −1, −1, −1, −1, −1, −1,
+1, +1, +1, +1, +1, +1, −1, +1, +1, +1, −1, +1, +1, −1, −1,
−1, +1, −1, +1, −1, −1, +1, +1, −1, +1, −1, +1, +1, +1, +1,
+1, −1, −1, +1, +1, +1, −1, +1, +1, −1, −1, −1, +1, −1, +1,
+1, −1, +1, +1, −1, +1, −1, −1, +1, +1, +1, +1, −1, −1, +1,
+1, +1, +1, +1, −1, +1, +1, −1, −1, −1, +1, −1, −1, −1, +1,
−1, +1, −1, +1, +1, −1, +1, −1, +1, −1, +1, +1, +1, −1, +1,
+1, +1, −1, −1, +1, −1, −1, −1, −1, −1, +1, +1, −1, −1, −1,
−1, +1, −1, +1, −1, +1, +1, −1, −1, +1, −1, −1, −1, +1, +1,
−1, +1, +1, +1, +1, −1, −1, −1, +1, +1, +1, +1, −1, +1, +1,
+1, +1, +1, +1, +1, −1, +1, +1, +1, −1, +1, +1, −1, −1, −1,
+1, −1, +1, −1, −1, +1, +1, −1, +1, −1, +1, +1, +1, +1, +1,
−1, −1, +1, +1, +1, −1, +1, +1, −1, −1, −1, +1, −1, +1, +1,
−1, +1, +1, −1, +1, −1, −1, +1, −1, +1, −1, +1, −1, +1, +1,
+1, −1, +1, +1, +1, −1, −1, +1, −1, −1, −1, −1, −1, +1, +1,
−1, −1, −1, −1, +1, −1, +1, −1, +1, +1, −1, −1, +1, −1, −1,
−1, +1, +1, −1, +1, +1, +1, +1, −1, −1, −1, +1, +1, +1, +1,
−1, +1, −1, −1, −1, −1, −1, −1, +1, −1, −1, −1, +1, −1, −1,
+1, +1, +1, −1, +1, −1, +1, +1, −1, −1, +1, −1, +1, −1, −1,
−1, −1, −1, +1, +1, −1, −1, −1, +1, −1, −1, +1, +1, +1, −1,
+1, −1, −1, +1, −1, −1, +1, −1, +1, +1, +1, +1, +1, +1, −1,
−1, +1, +1, +1, +1, +1, −1, +1, +1, −1, −1, −1, +1, −1, −1,
−1, +1, −1, +1, −1, +1, +1, −1, +1, −1, +1, −1, +1, +1, +1,
−1, +1, +1, +1, −1, −1, +1, −1, −1, −1, −1, −1, +1, +1, −1,
−1, −1, −1, +1, −1, +1, −1, +1, +1, −1, −1, +1, −1, −1, −1,
+1, +1, −1, +1, +1, +1, +1, −1, −1, −1, +1, +1, +1, +1, −1,
−1, +1, +1, +1, +1, +1, +1, −1, +1, +1, +1, −1, +1, +1, −1,
−1, −1, +1, −1, +1, −1, −1, +1, +1, −1, +1, −1, +1, +1, +1,
+1, +1, −1, −1, +1, +1, +1, −1, +1, +1, −1, −1, −1, +1, −1,
+1, +1, −1, +1, +1, −1, +1, −1, −1, −1, +1, −1, +1, −1, −1,
−1, −1, +1, +1, +1, −1, −1, +1, 0, 0, 0, 0, 0, +1, −1,
−1, −1, −1, −1, −1, +1, −1, +1, +1, −1, −1, +1, +1, −1, +1,
−1, +1, +1, −1, −1, +1, −1, +1, −1, −1, −1, +1, +1, −1, +1,
+1, +1, −1, +1, +1, +1, +1, +1, +1, +1, −1, +1, −1, −1, +1, -continued −1, −1, +1, −1, +1, +1, +1, −1, −1, +1, −1, −1, −1, +1, +1,
−1, −1, −1, −1, −1, +1, −1, −1, −1, −1, −1, +1, +1, −1, −1,
−1, −1, −1, +1, −1, −1, +1, +1, +1, −1, +1, +1, +1, −1, +1,
−1, +1, −1, −1, −1, −1, −1, +1, +1, +1, −1, −1, −1, −1, +1,
−1, −1, +1, +1, +1, −1, +1, +1, −1, −1, +1, −1, +1, −1, −1,
−1, −1, −1, −1, −1, +1, +1, −1, −1, −1, +1, −1, −1, +1, +1,
+1, −1, +1, −1, −1, +1, −1, −1, +1, −1, +1, +1, +1, −1, +1,
−1, −1, +1, +1, −1, +1, −1, +1, +1, +1, −1, −1, +1, −1, −1,
−1, +1, −1, −1, −1, −1, −1, −1, −1, +1, −1, +1, +1, −1, +1,
+1, −1, +1, −1, −1, −1, +1, +1, −1, +1, +1, +1, −1, −1, +1,
+1, +1, +1, +1, −1, +1, −1, −1, −1, −1, +1, +1, −1, −1, −1,
−1, −1, +1, −1, −1, +1, +1, +1, −1, +1, +1, +1, −1, +1, −1,
+1, −1, −1, −1, −1, −1, +1, +1, +1, −1, −1, −1, −1, +1, −1,
−1, +1, +1, +1, −1, +1, +1, −1, −1, +1, −1, +1, −1, +1, +1,
+1, −1, +1, −1, −1, +1, +1, −1, +1, −1, +1, +1, +1, −1, −1,
+1, −1, −1, −1, +1, −1, −1, −1, −1, −1, −1, −1, +1, −1, +1,
+1, −1, +1, +1, −1, +1, −1, −1, −1, +1, +1, −1, +1, +1, +1,
−1, −1, +1, +1, +1, +1, +1, −1, +1, +1, +1, +1, +1, −1, −1,
+1, +1, +1, +1, +1, −1, +1, +1, −1, −1, −1, +1, −1, −1, −1,
+1, −1, +1, −1, +1, +1, +1, +1, +1, −1, −1, −1, +1, +1, +1,
+1, −1, +1, +1, −1, −1, −1, +1, −1, −1, +1, +1, −1, +1, −1,
+1, −1, −1, −1, −1, −1, −1, +1, +1, −1, −1, −1, +1, −1, −1,
+1, +1, +1, −1, +1, −1, −1, +1, −1, −1, +1, −1, +1, −1, +1,
−1, +1, −1, −1, +1, +1, −1, +1, −1, +1, +1, +1, −1, −1, +1,
−1, −1, −1, +1, −1, −1, −1, −1, −1, −1, −1, +1, −1, +1, +1,
−1, +1, +1, −1, +1, −1, −1, −1, +1, +1, −1, +1, +1, +1, −1,
−1, +1, +1, +1, +1, +1, −1, +1, −1, −1, −1, −1, +1, +1, −1,
−1, −1, −1, −1, +1, −1, −1, +1, +1, +1, −1, +1, +1, +1, −1,
+1, −1, +1, −1, −1, −1, −1, −1, +1, +1, +1, −1, −1, −1, −1,
+1, −1, −1, +1, +1, +1, −1, +1, +1, −1, −1, +1, −1, +1, −1, +1].

The foregoing $LTF_{80\ MHz\_prime}$ may also be represented by:

$LTF_{80\ MHz\_prime}$=[{1st-484-RU}, {central-26-RU}, {2nd-484-RU}].

The 1st-484-RU is represented by:

1st-484-RU={+1, $+G_c$, $-G_c^p$, −1, −1, $+G_a$, $+G_a^p$, −1, $+G_b$, +1, $-G_c$, $+G_c^p$, −1, +1, $+G_a$, $+G_a^p$, −1, +1, $-G_c$, $+G_c^p$, −1, +1, $-G_a$, $-G_a^p$, +1, $+G_b$, +1, $-G_c$, $+G_c^p$, −1, −1, $+G_a$, $+G_a^p$, −1}.

The central-26-RU is represented by:

central-26-RU={$-G_e$(1:13), +1, 0, 0, 0, 0, 0, +1, $-G_e$(14:26)}.

The 2nd-484-RU is represented by:

2nd-484-RU={+1, $-G_d^p$, $+G_d^p$, +1, −1, $-G_b$, $-G_b^p$, −1, $-G_a^p$, +1, $+G_d$, $-G_d^p$, −1, +1, $-G_b$, $-G_b^p$, +1, +1, $+G_d$, $-G_d^p$, −1, +1, $+G_b$, $+G_b^p$, −1, $-G_d$, −1, $+G_d$, $-G_d^p$, −1, +1, $-G_b$, $-G_b^p$, +1}.

The HE-LTF sequence on a 996-subcarrier 4× symbol of a secondary 80 MHz ($LTF_{80\ MHz\_second}$) bandwidth is formed by the 1st-484-RU, the 2nd-484-RU, and a new central-26-RU (new Central-26-RU), where the new Central-26-RU may be represented by:

newCentral-26-RU=[+1, +1, +1, −1, −1, −1, +1, +1, −1, −1, −1, −1, −1, +1, 0, 0, 0, 0, 0, −1, −1, −1, −1, +1, −1, +1, +1, +1, +1, −1, +1, +1, −1]

The $LTF_{80\ MHz\_second}$ may be represented as follows:

$LTF_{80\ MHz\_second}$=[{1st-484-RU}, newCentral-26-RU, (−1)*{2nd-484-RU}];

The $LTF_{80\ MHz\_second}$ may also be represented by:

$LTF_{80\ MHz\_second}$ =
[+1, +1, −1, +1, −1, +1, −1, −1, −1, +1, −1, −1, −1, +1, +1, −1,
+1, +1, +1, +1, +1, −1, −1, +1, +1, +1, +1, −1, +1, −1, +1, −1,
−1, +1, +1, −1, +1, +1, +1, −1, −1, +1, −1, −1, −1, −1, +1, +1,
+1, −1, −1, −1, −1, −1, −1, +1, +1, +1, +1, +1, +1, −1, +1, +1,
+1, −1, +1, +1, −1, −1, −1, +1, −1, +1, −1, −1, +1, +1, −1, +1,
−1, +1, +1, +1, +1, +1, −1, −1, +1, +1, +1, −1, +1, +1, −1, −1,
−1, +1, −1, +1, +1, −1, +1, +1, −1, +1, −1, −1, +1, +1, +1, +1,
−1, −1, +1, +1, +1, +1, +1, −1, +1, +1, −1, −1, −1, +1, −1, −1, -continued −1, +1, −1, +1, −1, +1, +1, −1, +1, −1, +1, −1, +1, +1, +1, −1,
+1, +1, +1, −1, −1, +1, −1, −1, −1, −1, −1, +1, +1, −1, −1, −1,
−1, +1, −1, +1, −1, +1, +1, −1, −1, +1, −1, −1, −1, +1, +1, −1,
+1, +1, +1, +1, −1, −1, −1, +1, +1, +1, +1, −1, +1, +1, +1, +1,
+1, +1, +1, −1, +1, +1, +1, −1, +1, +1, −1, −1, −1, +1, −1, +1,
−1, −1, +1, +1, −1, +1, −1, +1, +1, +1, +1, +1, −1, −1, +1, +1,
+1, −1, +1, +1, −1, −1, −1, +1, −1, +1, +1, −1, +1, +1, −1, +1,
−1, −1, +1, −1, +1, −1, +1, −1, +1, +1, +1, −1, +1, +1, +1, −1,
−1, +1, −1, −1, −1, −1, −1, +1, +1, −1, −1, −1, −1, +1, −1, +1,
−1, +1, +1, −1, −1, +1, −1, −1, −1, +1, +1, −1, +1, +1, +1, +1,
−1, −1, −1, +1, +1, +1, +1, −1, +1, −1, −1, −1, −1, −1, −1, +1,
−1, −1, −1, +1, −1, −1, +1, +1, +1, −1, +1, −1, +1, +1, −1, −1,
+1, −1, +1, −1, −1, −1, −1, −1, +1, +1, −1, −1, −1, +1, −1, −1,
+1, +1, +1, −1, +1, −1, −1, +1, −1, −1, +1, −1, +1, +1, +1, +1,
+1, +1, −1, −1, +1, +1, +1, +1, +1, −1, +1, +1, −1, −1, −1, +1,
−1, −1, −1, +1, −1, +1, −1, +1, +1, −1, +1, −1, +1, −1, +1, +1,
+1, −1, +1, +1, +1, −1, −1, +1, −1, −1, −1, −1, −1, +1, +1, −1,
−1, −1, −1, +1, −1, +1, −1, +1, +1, −1, −1, +1, −1, −1, −1, +1,
+1, −1, +1, +1, +1, +1, −1, −1, −1, +1, +1, +1, +1, −1, −1, +1,
+1, +1, +1, +1, +1, −1, +1, +1, +1, −1, +1, +1, −1, −1, −1, +1,
−1, +1, −1, −1, +1, +1, −1, +1, −1, +1, +1, +1, +1, +1, −1, −1,
+1, +1, +1, −1, +1, +1, −1, −1, −1, +1, −1, +1, +1, −1, +1, +1,
−1, +1, −1, −1, +1, +1, +1, −1, −1, −1, +1, +1, −1, −1, −1, −1,
−1, +1, +0, +0, +0, +0, +0, −1, −1, −1, −1, +1, −1, +1, +1, +1,
+1, −1, +1, +1, −1, −1, +1, −1, +1, −1, −1, +1, +1, −1, +1, −1,
+1, +1, +1, −1, −1, +1, −1, −1, −1, +1, −1, −1, −1, −1, −1, −1,
−1, +1, −1, +1, +1, −1, +1, +1, −1, +1, −1, −1, −1, +1, +1, −1,
+1, +1, +1, −1, −1, +1, +1, +1, +1, +1, −1, +1, +1, +1, +1, +1,
−1, −1, +1, +1, +1, +1, +1, −1, +1, +1, −1, −1, −1, +1, −1, −1,
−1, +1, −1, +1, −1, +1, +1, +1, +1, +1, −1, −1, −1, +1, +1, +1,
+1, −1, +1, +1, −1, −1, −1, +1, −1, −1, +1, +1, −1, +1, −1, +1,
+1, +1, +1, +1, +1, +1, −1, −1, +1, +1, +1, −1, +1, +1, −1, −1,
−1, +1, −1, +1, +1, −1, +1, +1, −1, +1, −1, −1, −1, +1, −1, +1,
+1, −1, −1, +1, −1, +1, −1, −1, −1, +1, +1, −1, +1, +1, +1, −1,
+1, +1, +1, +1, +1, +1, +1, −1, +1, −1, −1, +1, −1, −1, +1, −1,
+1, +1, +1, −1, −1, +1, −1, −1, −1, +1, +1, −1, −1, −1, −1, −1,
+1, −1, +1, +1, +1, +1, −1, −1, +1, +1, +1, +1, +1, −1, +1, +1,
−1, −1, −1, +1, −1, −1, −1, +1, −1, +1, −1, +1, +1, +1, +1, +1,
−1, −1, −1, +1, +1, +1, +1, −1, +1, +1, −1, −1, −1, +1, −1, −1,
+1, +1, −1, +1, −1, +1, −1, −1, −1, +1, −1, +1, +1, −1, −1, +1,
−1, +1, −1, −1, −1, +1, +1, −1, +1, +1, +1, −1, +1, +1, +1, +1,
+1, +1, +1, −1, +1, −1, −1, +1, −1, −1, +1, −1, +1, +1, +1, −1,
−1, +1, −1, −1, −1, +1, +1, −1, −1, −1, −1, −1, +1, −1, −1, −1,
−1, −1, +1, +1, −1, −1, −1, −1, −1, +1, −1, −1, +1, +1, +1, −1,
+1, +1, +1, −1, +1, −1, +1, −1, −1, −1, −1, −1, +1, +1, +1, −1,
−1, −1, −1, +1, −1, −1, +1, +1, +1, −1, +1, +1, −1, −1, +1, −1,
+1, −1, +1, +1, +1, +1, +1, +1, −1, −1, +1, +1, +1, −1, +1, +1,
−1, −1, −1, +1, −1, +1, +1, −1, +1, +1, −1, +1, −1, +1, −1, +1,
−1, +1, +1, −1, −1, +1, −1, +1, −1, −1, −1, +1, +1, −1, +1, +1,
+1, −1, +1, +1, +1, +1, +1, +1, +1, −1, +1, −1, −1, +1, −1, −1,
+1, −1, +1, +1, +1, −1, −1, +1, −1, −1, −1, +1, +1, −1, −1, −1,
−1, −1, +1, −1, +1, +1, +1, +1, −1, −1, +1, +1, +1, +1, +1, −1,
+1, +1, −1, −1, −1, +1, −1, −1, −1, +1, −1, +1, −1, +1, +1, +1,
+1, +1, −1, −1, −1, +1, +1, +1, +1, −1, +1, +1, −1, −1, −1, +1,
−1, −1, +1, +1, −1, +1, −1, +1, −1].

The table below shows polarity adjustment coefficients of the primary 80-MHz bandwidth and the secondary 80-MHz bandwidth in two band orders and various frequency spacings. The primary/secondary channel spacing refers to a center frequency spacing (the spacing of 80 MHz refers to splicing of two adjacent 80 M channels) of two 80 M bands. Specifically, for corresponding PAPR values in various cases, refer to the table, where a PAPR value is a maximum value of 4 phase differences between data and a pilot.

| Primary/secondary channel spacing (MHz) | [Primary 80 M, secondary 80 M] [P1, P2] | PAPR (dB) | [Secondary 80 M, primary 80 M] [P2, P1] | PAPR (dB) |
|---|---|---|---|---|
| 80 (adjacent) | [+1, +1] | 6.81 | [+1, +1] | 6.87 |
| 100 | [+1, −1] | 6.83 | [−1, +1] | 6.82 |
| 120 | [+1, −1] | 6.82 | [+1, +1] | 6.97 |
| 140 | [+1, −1] | 6.87 | [−1, +1] | 6.77 |

-continued

| Primary/secondary channel spacing (MHz) | [Primary 80 M, secondary 80 M] [P1, P2] | PAPR (dB) | [Secondary 80 M, primary 80 M] [P2, P1] | PAPR (dB) |
|---|---|---|---|---|
| 160 | [+1, −1] | 6.88 | [−1, +1] | 6.95 |
| 180 | [+1, −1] | 6.80 | [−1, +1] | 6.92 |
| 200 | [+1, +1] | 6.89 | [+1, +1] | 6.91 |
| 220 | [+1, +1] | 6.85 | [+1, +1] | 6.90 |
| 240 | [+1, −1] | 6.87 | [−1, +1] | 6.96 |
| >240 | [+1, −1] | ~6.85 | [−1, +1] | ~6.86 |

In addition, to reduce system implementation complexity, it may also be selected to sacrifice PAPR performance to a particular extent. In various cases, the primary 80 M sequence and the secondary 80 M sequence are directly spliced to obtain an HE-LTF sequence in 4× of the 160 M bandwidth, that is, in all cases of [primary 80 M, secondary 80 M], a polarity adjustment coefficient of [P1, P2]=[+1, +1] or [P1, P2]=[+1, −1] is used. For [secondary 80 M, primary 80 M], a polarity adjustment coefficient of [P2, P1]=[+1, +1] or [P2, P1]=[−1, +1] is used.

Embodiment 8

A subcarrier design on a 2× symbol of the 160-MHz bandwidth may be obtained by splicing two subcarrier designs of 2× symbols of the 80-MHz bandwidth. The primary 80 M band and the secondary 80 M band may be consecutively spliced or separated at a spacing of a particular bandwidth (for example, a spacing of 100 MHz). In addition, successive band locations of the primary 80 M band and the secondary 80 M band may be flexibly adjusted according to an actual case. Therefore, a 2×HE-LTF sequence ($LTF_{80\ MHz\_prime}$) of the primary 80 M band and a 2×HE-LTF sequence ($LTF_{80\ MHz\_second}$) of the secondary 80 M band may be separately defined, and a polarity is flexibly adjusted according to a spacing between the primary 80 M band and the secondary 80 M band and a successive band order by using an entire 80 M sequence as a unit, so as to obtain a lower PAPR.

For ease of description, P1 is used to denote a polarity adjustment coefficient of the primary 80 M sequence, and P2 is used to denote a polarity adjustment coefficient of a secondary 80 M sequence. If P1 is always +1, P2 may be +1 or −1. In this case, when an arrangement relationship of two 80 M channels is [primary 80 M, secondary 80 M], a 160 M sequence is: $HE\text{-}LTF_{160\ MHz}$=[P1*$LTF_{80\ MHz\_prime}$, BI, P2*$LTF_{80\ MHz\_second}$]; and when an arrangement relationship of two 80 M channels is [secondary 80 M, primary 80 M], the 160 M sequence is: $HE\text{-}LTF_{160\ MHz}$=[P2*$LTF_{80\ MHz\_second}$, BI, P1*$LTF_{80\ MHz\_prime}$]. BI indicates a frequency spacing between edge subcarriers of the two 80 M channels.

When the primary 80 M channel and the secondary 80 M channel are adjacent, BI=zeros (1, 11), that is, eleven 0s; and the $HE\text{-}LTF_{160\ MHz}$ sequence may be represented by:

In a case of [primary 80 M, secondary 80 M]:

$HE\text{-}LTF_{160\ MHz}$ (−1012:2:1012)=[P1*$LTF_{80\ MHz\_prime}$, zeros (1, 11), P2*$LTF_{80\ MHz\_second}$].

In a case of [secondary 80 M, primary 80 M]:

$HE\text{-}LTF_{160\ MHz}$ (−1012:2:1012)=[P2*$LTF_{80\ MHz\_second}$, zeros (1, 11), P1*$LTF_{80\ MHz\_prime}$]

where zeros (1, 11) indicate eleven 0s; and values at locations corresponding to the rest subcarrier indication numbers (for example, −1024:−1013, 1013:1023, and −1011:2:1011) that are not displayed are 0 by default.

If the primary 80 M channel and the secondary 80 M channel are not adjacent, BI may be correspondingly adjusted.

In this embodiment, the HE-LTF sequence on the primary 2× symbol corresponding to the 80 MHz ($LTF_{80\ MHz\_prime}$) bandwidth is the second HE-LTF sequence of 80 MHz 2× in Embodiment 3, and the HE-LTF sequence on the 2× symbol of the primary 80-MHz bandwidth may be represented by:

$$LTF_{80MHz\_prime} = \{+1, +G_c, +G_c^p, +1, +G_a, -G_a^p, +G_d, -1, +G_c^p, +G_c, +1, +G_a^p, -G_a, +1, -G_a, +G_a^p, -1, +G_c, +G_c^p, +G_b, +1, +G_a^p, -G_a, +1, -G_c^p, -G_c, +1, -1, -1, -1, +1, +1, +1, 0, 0, 0, +1, -1, -1, +1, +1, -1, +1, -G_b, -G_b^p, -1, -G_d, +G_d^p, -1, +G_c, +G_b^p, +G_b, +1, +G_d^p, -G_d, -1, +G_d, -G_b^p, +1, -G_b, -G_b^p, -1, -G_a, +G_d^p, -G_d, +1, -G_b^p, -G_b, +1\}.$$

The HE-LTF sequence may also be represented by:

$LTF_{80\ MHz\_prime}$ =
[+1, +1, −1, +1, +1, +1, −1, +1, +1, +1, +1, −1, −1, −1, +1,
−1, −1, +1, +1, −1, +1, +1, +1, −1, −1, −1, −1, +1, +1, +1,
+1, −1, +1, +1, +1, −1, +1, −1, −1, +1, −1, −1, −1, +1, +1,
−1, −1, −1, +1, −1, −1, +1, −1, +1, +1, −1, +1, +1, −1, +1,
−1, −1, −1, +1, −1, −1, −1, −1, +1, −1, −1, +1, +1, −1, +1,
+1, +1, −1, −1, −1, −1, +1, −1, +1, +1, +1, −1, +1, +1, +1,
+1, −1, −1, −1, +1, +1, +1, −1, −1, +1, +1, +1, −1, +1, +1,
−1, +1, −1, −1, −1, −1, +1, −1, −1, −1, +1, −1, +1, +1, −1,
+1, +1, −1, −1, −1, +1, −1, −1, −1, +1, −1, +1, +1, −1, +1,
+1, +1, −1, −1, +1, +1, +1, −1, +1, +1, −1, +1, −1, −1, +1,
−1, +1, +1, +1, −1, +1, +1, +1, +1, −1, −1, −1, +1, −1, −1,
+1, +1, −1, +1, +1, +1, −1, −1, −1, −1, +1, +1, +1, −1, −1,
−1, −1, +1, −1, −1, −1, +1, −1, +1, +1, +1, −1, −1, +1, +1,
+1, −1, +1, +1, −1, +1, −1, −1, −1, −1, +1, −1, −1, −1, +1,
−1, +1, +1, −1, +1, +1, −1, +1, +1, −1, −1, +1, −1, −1, −1,
+1, +1, +1, +1, −1, +1, −1, −1, −1, +1, −1, −1, −1, −1, +1,
+1, +1, +1, −1, −1, −1, +1, +1, +1, 0, 0, 0, +1, −1, −1,
+1, +1, −1, +1, −1, −1, −1, +1, +1, +1, +1, −1, +1, +1, +1,
−1, +1, −1, −1, −1, −1, +1, +1, +1, −1, +1, +1, −1, −1, +1,
−1, −1, +1, −1, −1, +1, −1, +1, +1, +1, −1, +1, +1, +1, +1,
−1, +1, −1, −1, +1, −1, −1, −1, +1, +1, −1, −1, −1, +1, −1,
+1, +1, +1, −1, +1, +1, +1, +1, −1, −1, −1, +1, +1, +1, +1,
−1, −1, −1, +1, −1, −1, +1, +1, −1, +1, +1, +1, −1, −1, −1,
−1, +1, −1, −1, −1, +1, −1, +1, +1, −1, +1, −1, −1, +1, −1,
−1, −1, +1, +1, −1, −1, −1, +1, −1, −1, +1, −1, +1, +1, +1,
−1, +1, +1, +1, −1, +1, −1, +1, +1, −1, +1, −1, −1, −1, +1,
−1, −1, −1, −1, +1, −1, +1, +1, −1, +1, +1, +1, −1, −1, +1,
+1, +1, −1, −1, −1, +1, +1, +1, +1, −1, +1, +1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, +1, +1, −1, +1,
−1, −1, +1, −1, −1, −1, +1, +1, −1, −1, −1, +1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, +1, +1, +1, −1,
+1, +1, +1, −1, +1, +1].

The foregoing $LTF_{80\ MHz\_prime}$ may also be represented by:

$LTF_{80\ MHz\_prime}$=[{1st-484-RU}, {central-26-RU}, {2nd-484-RU}], where the 1st-484-RU is represented by:

1st-484-RU={+1, $+G_c$, $+G_c^p$, +1, $+G_a$, $-G_a^p$, $+G_d$, −1, $+G_c^p$, $+G_c$, +1, $+G_a^p$, $-G_a$, +1, $-G_a$, $+G_a^p$, −1, $+G_c$, $+G_c^p$, $+G_b$, +1, $+G_a^p$, $-G_a$, +1, $-G_c^p$, $-G_c$};

the central-26-RU is represented by:

central-26-RU={+1, −1, −1, −1, +1, +1, +1, 0, 0, 0, +1, −1, −1, +1, +1, −1, +1}; and the 2nd-484-RU is represented by:

2nd-484-RU={$-G_b$, $-G_b^p$, −1, $-G_d$, $+G_d^p$, −1, $-G_c$, $+G_b^p$, $+G_b$, +1, $+G_d^p$, $-G_d$, −1, $+G_d$, $-G_d^p$, +1, $-G_b$, $-G_b^p$, −1, $-G_a$, $+G_d^p$, $-G_d$, +1, $-G_b^p$, $-G_b$, +1}.

The HE-LTF sequence on a 2× symbol of the secondary 80 MHz ($LTF_{80\ MHz\_second}$) bandwidth is formed by the 1st-484-RU, the 2nd-484-RU, and the new central-26-RU (newCentral-26-RU), where newCentral-26-RU may be represented by:

newCentral-26-RU=[−1, −1, +1, −1, −1, −1, −1, 0, 0, 0, +1, +1, −1, −1, −1, +1, −1].

The $LTF_{80\ MHz\_second}$ may be represented as follows:

$LTF_{80\ MHz\_second}$=[{1st-484-RU}, newCentral-26-RU, (−1)*{2nd-484-RU}].

The $LTF_{80\ MHz\_second}$ may also be represented by:

$LTF_{80\ MHz\_second}$ =
[+1, +1, −1, +1, +1, +1, −1, +1, +1, +1, +1, −1, −1, −1, +1, −1,
−1, +1, +1, −1, +1, +1, +1, −1, −1, −1, −1, +1, +1, +1, +1, −1,
+1, +1, +1, −1, +1, −1, −1, +1, −1, −1, −1, +1, +1, −1, −1, −1,
+1, −1, −1, +1, −1, +1, +1, −1, +1, +1, −1, +1, −1, −1, −1, +1,
−1, −1, −1, −1, +1, −1, −1, +1, +1, −1, +1, +1, +1, −1, −1, −1,
−1, +1, −1, +1, +1, +1, −1, +1, +1, +1, +1, −1, −1, −1, +1, +1,
+1, −1, −1, +1, +1, +1, −1, +1, +1, −1, +1, −1, −1, −1, −1, +1,
−1, −1, −1, +1, −1, +1, +1, −1, +1, +1, −1, −1, −1, +1, −1, −1,
−1, +1, −1, +1, +1, −1, +1, +1, +1, −1, −1, +1, +1, +1, −1, +1,
+1, −1, +1, −1, −1, +1, −1, +1, +1, +1, −1, +1, +1, +1, +1, −1,
−1, −1, +1, −1, −1, +1, +1, −1, +1, +1, +1, −1, −1, −1, −1, +1,
+1, +1, −1, −1, −1, −1, +1, −1, −1, −1, +1, −1, +1, +1, +1, −1,
−1, +1, +1, +1, −1, +1, +1, −1, +1, −1, −1, −1, −1, +1, −1, −1,
−1, +1, −1, +1, +1, −1, +1, +1, −1, +1, +1, −1, −1, +1, −1, −1,
−1, +1, +1, +1, +1, −1, +1, −1, −1, −1, +1, −1, −1, −1, −1, +1,
+1, +1, −1, −1, +1, −1, −1, −1, −1, +0, +0, +0, +1, +1, −1, −1,
−1, +1, −1, +1, +1, +1, −1, −1, −1, −1, +1, −1, −1, −1, +1, −1,
+1, +1, +1, +1, −1, −1, −1, +1, −1, −1, +1, +1, −1, +1, +1, −1,
+1, +1, −1, +1, −1, −1, −1, +1, −1, −1, −1, −1, +1, −1, +1, +1,
−1, +1, +1, +1, −1, −1, +1, +1, +1, −1, +1, −1, −1, −1, +1, −1,
−1, −1, −1, +1, +1, +1, −1, −1, −1, −1, +1, +1, +1, −1, +1, +1,
−1, −1, +1, −1, −1, −1, +1, +1, +1, +1, −1, +1, +1, +1, −1, +1,
−1, −1, +1, −1, +1, +1, −1, +1, +1, +1, −1, −1, +1, +1, +1, −1,
+1, +1, −1, +1, −1, −1, −1, +1, −1, −1, −1, +1, −1, +1, −1, −1,
+ 1, −1, +1, +1, +1, −1, +1, +1, +1, +1, −1, +1, −1, −1, +1, −1,
−1, −1, +1, +1, −1, −1, −1, +1, +1, +1, −1, −1, −1, −1, +1, −1,
−1, −1, +1, −1, +1, +1, +1, +1, −1, −1, −1, +1, −1, −1, +1, +1,
−1, +1, +1, +1, +1, −1, +1, +1, +1, −1, +1, −1, −1, +1, −1, −1,
+1, −1, +1, +1, −1, +1, +1, +1, −1, −1, +1, +1, +1, −1, +1, +1,
−1, +1, −1, −1, −1, +1, −1, −1, −1, −1, +1, +1, +1, +1, −1, −1,
−1, +1, −1, −1, +1, +1, −1, +1, +1, +1, −1, −1, −1, −1, +1, −1,
−1, −1, +1, −1, −1].

The table below shows polarity adjustment coefficients of the primary 80-MHz bandwidth and the secondary 80-MHz bandwidth in two band orders and various frequency spacings. The primary/secondary channel spacing refers to a center frequency spacing (the spacing of 80 MHz means splicing of two adjacent 80 M channels) of two 80 M bands. Specifically, for corresponding PAPR values in various cases, refer to the table, where a PAPR value is a maximum value of 4 phase differences between data and a pilot.

| Primary/secondary channel spacing (MHz) | [Primary 80 M, secondary 80 M] [P1, P2] | PAPR (dB) | [Secondary 80 M, primary 80 M] [P2, P1] | PAPR (dB) |
|---|---|---|---|---|
| 80 (adjacent) | [+1, +1] | 6.70 | [−1, +1] | 6.63 |
| 100 | [+1, −1] | 6.77 | [−1, +1] | 6.71 |
| 120 | [+1, +1] | 6.71 | [+1, +1] | 6.63 |
| 140 | [+1, +1] | 6.57 | [−1, +1] | 6.65 |
| 160 | [+1, −1] | 6.73 | [−1, +1] | 6.74 |
| 180 | [+1, −1] | 6.75 | [+1, +1] | 6.68 |
| 200 | [+1, +1] | 6.72 | [+1, +1] | 6.74 |
| 220 | [+1, −1] | 6.64 | [−1, +1] | 6.80 |
| 240 | [+1, +1] | 6.75 | [+1, +1] | 6.71 |
| >240 | [+1, +1] | ~6.82 | [+1, +1] | ~6.71 |

In addition, to reduce system implementation complexity, it may also be selected to sacrifice PAPR performance to a particular extent. In various cases, the primary 80 M sequence and the secondary 80 M sequence are directly spliced to obtain an HE-LTF sequence in 2× of the 160 M bandwidth, that is, in all cases of [primary 80 M, secondary 80 M], a polarity adjustment coefficient of [P1, P2]=[+1, +1] or [P1, P2]=[+1, −1] is used. For [secondary 80 M, primary 80 M], a polarity adjustment coefficient of [P2, P1]=[+1, +1] or [P2, P1]=[−1, +1] is used.

The foregoing HE-LTF sequences in the 2× mode or the 4× mode of various bandwidths are merely specific examples. These preferred sequences have relatively low PAPR values. Certainly, embodiments of the present invention may further have another HE-LTF sequence, and the HE-LTF sequence meets features of a sequence mentioned in this embodiment, and may be obtained by using the generating method mentioned above.

Correspondingly, another embodiment provides an HE-LTF processing apparatus (not shown), applied in a wireless local area network that uses an OFDMA technology. The HE-LTF processing apparatus includes a processing unit, configured to execute the method in the foregoing implementation. For a specific structure and content of a frame, refer to the foregoing embodiments, and details are not described herein again. The processing unit may be a general-purpose processor, a digital signal processor, an application-specific integrated circuit, a field programmable gate array or another programmable logical device, a discrete gate or transistor logical device, or a discrete hardware component, and may implement or execute the methods, steps, and logical block diagrams disclosed in the embodiments of the present invention. The general-purpose processor may be a microprocessor, any conventional processor, or the like. Steps of the methods disclosed with reference to the embodiments of the present invention may be directly performed and completed by means of a hardware processor, or may be performed and completed by using a combination of hardware and software modules in the processor. It can be easily understood that the foregoing HE-LTF processing apparatus may be located at an access point or a station.

Figure 15:
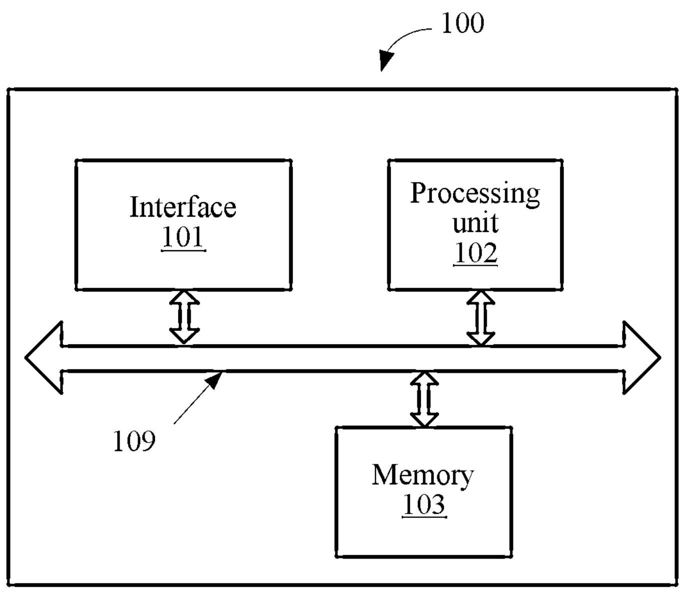
FIG. 15 is a block diagram of an access point according to an embodiment of the present invention.

FIG. 15 is a block diagram of an access point according to another embodiment of the present invention. The access point in FIG. 15 includes an interface 101, a processing unit 102, and a memory 103. The processing unit 102 controls operations of an access point 100. The memory 103 may include a read-only memory and a random access memory, and provides an instruction and data to the processing unit 102. A part of the memory 103 may further include a non-volatile random access memory (NVRAM). Components of the access point 100 are coupled together by using a bus system 109, where the bus system 109 includes a data bus, and further includes a power bus, a control bus, and a status signal bus. However, for ease of clear description, various buses in FIG. 15 are all denoted as the bus system 109.

The method for sending the foregoing various frames that is disclosed in the foregoing embodiment of the present invention may be applied in the processing unit 102, or may be implemented by the processing unit 102. In an implementation process, steps of the foregoing methods may be performed by using an integrated logical circuit of hardware in the processing unit 102 or an instruction in a form of software. The processing unit 102 may be a general-purpose processor, a digital signal processor, an application-specific integrated circuit, a field programmable gate array or another programmable logical device, a discrete gate or a transistor logical device, or a discrete hardware component, and may implement or execute the methods, steps, and logical block diagrams disclosed in the embodiments of the present invention. The general-purpose processor may be a microprocessor, any conventional processor, or the like. Steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 103, and the processing unit 102 reads information in the memory 103, and completes the steps of the foregoing methods in combination with hardware of the processing unit 102.

Figure 16:
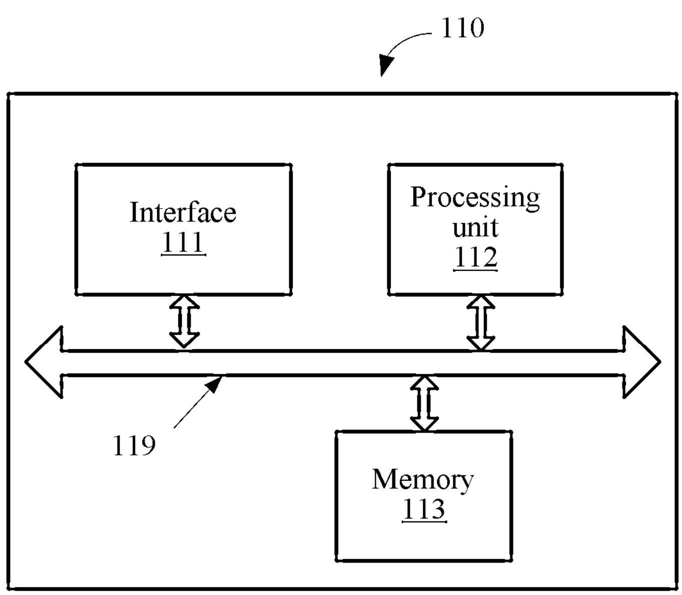
FIG. 16 is a block diagram of a station according to an embodiment of the present invention.

FIG. 16 is a block diagram of a station according to another embodiment of the present invention. An access point in FIG. 16 includes an interface 111, a processing unit 112, and a memory 113. The processing unit 112 controls operations of a station 110. The memory 113 may include a read-only memory and a random access memory, and provides an instruction and data to the processing unit 112. A part of the memory 113 may further include a non-volatile random access memory (NVRAM). Components of the station 110 are coupled together by using a bus system 119, where the bus system 119 includes a data bus, and further includes a power bus, a control bus, and a status signal bus. However, for ease of clear description, various buses in FIG. 16 are all denoted as the bus system 119.

The method for sending the foregoing various frames that is disclosed in the foregoing embodiment of the present invention may be applied in the processing unit 112, or may be implemented by the processing unit 112. In an implementation process, steps of the foregoing methods may be performed by using an integrated logical circuit of hardware in the processing unit 112 or an instruction in a form of software. The processing unit 112 may be a general-purpose processor, a digital signal processor, an application-specific integrated circuit, a field programmable gate array or another programmable logical device, a discrete gate or a transistor logical device, or a discrete hardware component, and may implement or execute the methods, steps, and logical block diagrams disclosed in the embodiments of the present invention. The general-purpose processor may be a microprocessor, any conventional processor, or the like. Steps of the methods disclosed with reference to the embodiments of the present invention may be directly performed and completed by means of a hardware processor, or may be performed and completed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 113, and the processing unit 112 reads information in the memory 113, and completes the steps of the foregoing methods in combination with hardware of the processing unit 112.

Specifically, the memory 113 stores an instruction that enables the processing unit 112 to execute the methods mentioned in the foregoing embodiment.

It should be understood that "one embodiment" or "an embodiment" mentioned throughout the specification indicates that a particular characteristic, structure, or feature that is related to the embodiment is included in at least one embodiment of the present invention. Therefore, "in one embodiment" or "in an embodiment" that appears throughput the entire specification does not necessarily mean a same embodiment. Moreover, the specific characteristic, structure, or feature may be combined in one or more embodiments in any proper manner. Sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present invention, "B corresponding to A" indicates that B is associated with A, and B may be determined according to A. However, it should be further understood that determining B according to A does not mean that B is determined according to A only; that is, B may also be determined according to A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital STA line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely examples of embodiments of the technical solutions of the present invention, but is not intended to limit the protection scope of the present invention. Any modification, equivalent replacement, or improvement made without departing from the spirit and principle of the present invention shall fall within the protection scope of the present invention.

The invention claimed is:

1. A method for sending a long training sequence in a wireless local area network which supports Orthogonal Frequency Division Multiple Access (OFDMA) technology, by an access point or a station, wherein the method comprises:

selecting a long training sequence according to a bandwidth, wherein the long training sequence is one of a 2× mode long training sequence or a 4× mode long training sequence; and sending a sub-sequence segment of the long training sequence according to a location and a size of an allocated resource unit (RU) wherein the sub-sequence segment at a corresponding location of the long training sequence is carried on subcarriers at the corresponding location, wherein the allocated RU is in the bandwidth and comprises consecutive subcarriers, wherein, when the bandwidth is 80-MHz, the 2× mode long training sequence includes values on subcarriers with indexes −500:2:500, and the values on subcarriers with indexes −500:2:500 are

| |
|---|
| +1, +1, −1, +1, +1, +1, −1, +1, +1, +1, +1, −1, −1, −1, +1, |
| −1, −1, +1, +1, −1, +1, +1, +1, −1, −1, −1, −1, +1, +1, +1, |
| +1, −1, +1, +1, +1, −1, +1, −1, −1, +1, −1, −1, −1, +1, +1, |
| −1, −1, −1, +1, −1, −1, +1, −1, +1, +1, −1, −1, +1, −1, +1, |
| −1, −1, −1, +1, −1, −1, −1, −1, +1, −1, −1, −1, +1, −1, +1, |
| +1, +1, −1, −1, −1, −1, +1, −1, +1, +1, +1, −1, +1, +1, +1, |
| +1, −1, −1, −1, +1, +1, +1, −1, −1, +1, +1, −1, −1, +1, +1, |
| −1, +1, −1, −1, −1, −1, +1, −1, −1, −1, +1, −1, +1, +1, −1, |
| +1, +1, −1, −1, −1, +1, −1, −1, −1, +1, −1, −1, +1, −1, +1, |
| +1, +1, −1, −1, +1, +1, +1, −1, +1, +1, −1, −1, −1, −1, +1, |
| −1, +1, +1, +1, −1, +1, +1, +1, +1, −1, −1, −1, +1, −1, −1, |
| +1, +1, −1, +1, +1, +1, −1, −1, −1, −1, +1, −1, +1, −1, −1, |
| −1, −1, +1, −1, −1, −1, +1, −1, +1, +1, +1, −1, −1, +1, +1, |
| +1, −1, +1, +1, −1, +1, −1, −1, −1, −1, +1, −1, −1, −1, +1, |
| −1, +1, +1, −1, +1, +1, −1, +1, +1, −1, −1, −1, −1, −1, −1, |
| +1, +1, +1, +1, −1, +1, −1, −1, −1, +1, −1, −1, −1, −1, +1, |
| +1, +1, +1, −1, −1, −1, +1, +1, +1, 0, 0, 0, +1, −1, −1, |
| +1, +1, −1, +1, −1, −1, −1, +1, +1, +1, +1, −1, +1, +1, +1, |
| −1, +1, −1, −1, −1, −1, +1, +1, +1, −1, +1, −1, −1, −1, +1, |
| −1, −1, +1, −1, −1, +1, −1, +1, +1, +1, −1, −1, +1, +1, +1, |
| −1, +1, −1, −1, +1, −1, −1, −1, +1, +1, −1, −1, −1, +1, −1, |
| +1, +1, +1, −1, +1, +1, +1, +1, −1, −1, −1, −1, +1, +1, +1, |
| −1, −1, −1, +1, −1, −1, +1, +1, −1, +1, +1, −1, −1, −1, −1, |
| −1, +1, −1, −1, −1, +1, −1, +1, +1, −1, +1, −1, −1, +1, −1, |
| −1, −1, +1, +1, −1, −1, −1, +1, −1, −1, +1, −1, +1, +1, +1, |
| −1, +1, +1, +1, −1, +1, −1, +1, +1, −1, +1, −1, −1, −1, +1, |
| −1, −1, −1, −1, +1, −1, +1, +1, −1, +1, +1, −1, −1, −1, +1, |
| +1, +1, −1, −1, −1, +1, +1, +1, +1, −1, +1, −1, +1, −1, +1, |
| −1, −1, −1, −1, +1, +1, +1, −1, +1, +1, −1, −1, +1, −1, −1, |
| −1, −1, +1, −1, −1, −1, +1, −1, +1, +1, −1, −1, +1, −1, +1, |
| −1, −1, +1, −1, −1, −1, +1, +1, −1, −1, −1, −1, −1, −1, +1, |
| −1, +1, +1, +1, −1, +1, +1, +1, +1, −1, −1, −1, −1, +1, +1, |
| +1, −1, +1, +1, −1, −1, +1, −1, −1, −1, +1, −1, +1, +1, −1, |
| +1, +1, +1, −1, +1, +1, |

and wherein the 4× mode long training sequence includes values on subcarriers with indexes −500:500, and the values on subcarriers with indexes −500:500 are

| |
|---|
| +1, +1, −1, +1, −1, +1, −1, −1, −1, +1, −1, −1, −1, +1, +1, |
| −1, +1, +1, +1, +1, +1, −1, −1, +1, +1, +1, −1, −1, +1, −1, |
| +1, −1, −1, +1, +1, −1, +1, +1, +1, −1, −1, −1, −1, −1, −1, |
| −1, +1, +1, +1, −1, −1, −1, −1, −1, −1, +1, −1, +1, +1, +1, |
| +1, −1, +1, +1, +1, −1, +1, +1, −1, −1, −1, −1, −1, +1, −1, |
| −1, +1, +1, −1, +1, −1, +1, +1, +1, +1, +1, −1, −1, +1, +1, |
| +1, −1, +1, +1, −1, −1, −1, +1, −1, +1, +1, −1, +1, +1, −1, |
| +1, −1, −1, +1, +1, +1, +1, −1, −1, +1, +1, −1, +1, +1, −1, |
| +1, +1, −1, −1, −1, +1, −1, −1, −1, +1, −1, −1, −1, +1, +1, |
| −1, +1, −1, +1, −1, +1, +1, +1, −1, +1, +1, −1, −1, −1, +1, |
| −1, −1, −1, −1, −1, +1, +1, −1, −1, −1, −1, −1, −1, +1, −1, |
| +1, +1, −1, −1, +1, −1, −1, −1, +1, +1, −1, −1, +1, +1, +1, |
| −1, −1, −1, +1, +1, +1, +1, −1, +1, +1, +1, −1, +1, +1, +1, |
| −1, +1, +1, +1, −1, +1, +1, −1, −1, −1, +1, −1, +1, −1, −1, |
| +1, +1, −1, +1, −1, +1, +1, +1, +1, +1, −1, −1, +1, +1, +1, |
| −1, +1, +1, −1, −1, −1, +1, −1, +1, +1, −1, −1, +1, −1, +1, |
| −1, −1, +1, −1, +1, −1, +1, −1, +1, +1, +1, −1, +1, +1, +1, |
| −1, −1, +1, −1, −1, −1, −1, −1, +1, +1, −1, −1, −1, −1, +1, |
| −1, +1, −1, +1, +1, −1, −1, +1, −1, −1, −1, −1, +1, −1, +1, |
| +1, +1, +1, −1, −1, −1, +1, +1, +1, +1, −1, −1, −1, −1, −1, |
| −1, −1, −1, +1, −1, −1, −1, +1, −1, −1, +1, −1, +1, −1, +1, |
| −1, +1, +1, −1, −1, +1, −1, +1, −1, −1, −1, −1, −1, +1, +1, |
| −1, −1, −1, +1, −1, −1, +1, +1, +1, −1, +1, −1, −1, +1, −1, |
| −1, +1, −1, +1, +1, +1, +1, +1, +1, −1, −1, −1, +1, +1, +1, |
| +1, −1, +1, +1, −1, −1, −1, +1, −1, −1, −1, −1, −1, +1, −1, |

-continued

+1, +1, −1, +1, −1, +1, −1, +1, +1, +1, −1, −1, +1, +1, −1,
−1, +1, −1, −1, −1, −1, −1, +1, +1, −1, −1, −1, −1, +1, −1,
+1, −1, +1, +1, −1, −1, +1, −1, −1, −1, +1, −1, −1, +1, +1,
+1, +1, −1, −1, −1, +1, +1, +1, +1, −1, −1, −1, +1, +1, +1,
+1, +1, −1, +1, +1, +1, −1, +1, +1, −1, −1, −1, +1, −1, +1,
−1, −1, +1, +1, −1, +1, −1, +1, +1, +1, +1, −1, −1, −1, +1,
+1, +1, −1, +1, +1, −1, −1, −1, +1, −1, +1, −1, −1, +1, +1,
−1, +1, −1, −1, −1, +1, −1, +1, −1, −1, −1, −1, +1, +1, +1,
−1, −1, +1, 0, 0, 0, 0, 0, +1, −1, −1, −1, −1, −1, −1,
+1, −1, +1, +1, −1, −1, +1, +1, −1, +1, −1, +1, +1, −1, −1,
+1, −1, +1, −1, −1, −1, +1, +1, −1, +1, +1, −1, −1, +1, +1,
+1, +1, +1, +1, +1, −1, +1, −1, −1, +1, −1, −1, +1, −1, +1,
+1, +1, −1, −1, +1, −1, −1, −1, +1, +1, −1, −1, −1, −1, −1,
+1, −1, −1, −1, −1, −1, +1, +1, −1, −1, −1, −1, −1, +1, −1,
−1, +1, +1, +1, −1, +1, +1, +1, −1, +1, −1, −1, −1, −1, −1,
−1, −1, +1, +1, +1, −1, −1, −1, −1, +1, −1, −1, +1, +1, +1,
−1, +1, +1, −1, −1, +1, −1, +1, −1, −1, −1, −1, −1, −1, −1,
+1, +1, −1, −1, −1, +1, −1, −1, +1, +1, +1, −1, +1, −1, −1,
+1, −1, −1, +1, −1, +1, +1, +1, −1, +1, −1, −1, +1, +1, −1,
+1, −1, +1, +1, +1, −1, −1, +1, −1, −1, −1, −1, −1, −1, −1,
−1, −1, −1, −1, +1, −1, +1, +1, −1, +1, +1, −1, +1, −1, −1,
−1, +1, +1, −1, +1, +1, +1, −1, −1, +1, +1, −1, +1, +1, −1,
+1, −1, −1, −1, −1, +1, +1, −1, −1, −1, −1, −1, +1, −1, −1,
+1, +1, +1, −1, +1, +1, +1, −1, +1, −1, +1, −1, −1, −1, −1,
−1, +1, +1, +1, −1, −1, −1, −1, +1, −1, −1, −1, +1, +1, −1,
+1, +1, −1, −1, +1, −1, +1, −1, +1, +1, +1, −1, +1, −1, −1,
+1, +1, −1, +1, −1, +1, +1, +1, −1, −1, +1, −1, −1, −1, +1,
−1, −1, −1, −1, −1, −1, −1, +1, −1, +1, +1, −1, +1, +1, −1,
+1, −1, −1, −1, +1, +1, −1, +1, +1, +1, −1, −1, +1, +1, +1,
+1, +1, −1, +1, +1, +1, +1, +1, −1, −1, +1, −1, +1, +1, +1,
−1, +1, +1, −1, −1, −1, +1, −1, −1, −1, +1, −1, +1, −1, +1,
+1, +1, +1, +1, −1, −1, −1, +1, +1, +1, +1, −1, +1, +1, −1,
−1, −1, +1, −1, −1, +1, +1, −1, +1, −1, +1, −1, −1, −1, −1,
−1, −1, +1, +1, −1, −1, −1, +1, −1, −1, +1, −1, +1, −1, +1,
−1, −1, +1, −1, −1, +1, −1, +1, −1, +1, −1, −1, −1, −1, +1,
+1, −1, +1, −1, +1, +1, +1, −1, −1, +1, −1, −1, −1, +1, −1,
−1, −1, −1, −1, −1, −1, +1, −1, +1, +1, −1, −1, +1, −1, +1,
−1, −1, −1, +1, +1, −1, +1, +1, +1, −1, −1, −1, +1, +1, +1,
+1, −1, +1, −1, −1, −1, −1, +1, +1, −1, −1, −1, −1, −1, +1,
−1, −1, +1, +1, +1, −1, +1, +1, +1, −1, +1, −1, +1, −1, −1,
−1, −1, −1, +1, +1, +1, −1, −1, −1, −1, +1, −1, −1, +1, +1,
+1, −1, +1, +1, −1, −1, +1, −1, +1, −1, +1,

2. A method in a wireless local area network which supports Orthogonal Frequency Division Multiple Access (OFDMA) technology, by a station or an access point, comprising:

receiving a physical layer protocol data unit (PPDU); and determining, according to a size and a location of an allocated resource unit (RU) a corresponding long training sequence segment as a reference sequence that corresponds to the allocated RU for channel estimation, wherein the long training sequence corresponds with a bandwidth of the wireless local area network, the allocated RU is in the bandwidth and comprises consecutive subcarriers, and the bandwidth is a total transmission bandwidth, wherein the long training sequence is one of a 2× mode long training sequence or a 4× mode long training sequence, wherein, when the bandwidth is 80-MHz, the 2× mode long training sequence includes values on subcarriers with indexes −500:2:500, and the values on subcarriers with indexes −500:2:500 are +1, +1, −1, +1, +1, +1, −1, +1, +1, +1, +1, −1, −1, −1, +1,
−1, −1, +1, +1, −1, +1, +1, +1, −1, −1, −1, −1, +1, +1, +1,
+1, −1, +1, +1, +1, −1, +1, −1, −1, +1, −1, −1, −1, +1, +1,
−1, −1, −1, +1, −1, −1, +1, −1, +1, +1, −1, −1, +1, −1, +1,
−1, −1, −1, +1, −1, −1, −1, −1, +1, −1, −1, −1, +1, −1, +1,
+1, +1, −1, −1, −1, −1, +1, −1, +1, +1, +1, −1, +1, +1, +1,
+1, −1, −1, −1, +1, +1, +1, −1, −1, +1, +1, −1, −1, +1, +1, -continued −1, +1, −1, −1, −1, −1, +1, −1, −1, −1, +1, −1, +1, +1, −1,
+1, +1, −1, −1, −1, +1, −1, −1, −1, +1, −1, −1, +1, −1, +1,
+1, +1, −1, −1, +1, +1, +1, −1, +1, +1, −1, −1, −1, −1, +1,
−1, +1, +1, +1, −1, +1, +1, +1, +1, −1, −1, −1, +1, −1, −1,
+1, +1, −1, +1, +1, +1, −1, −1, −1, −1, +1, −1, +1, −1, −1,
−1, −1, +1, −1, −1, −1, +1, −1, +1, +1, +1, −1, −1, +1, +1,
+1, −1, +1, +1, −1, +1, −1, −1, −1, −1, +1, −1, −1, −1, +1,
−1, +1, +1, −1, +1, +1, −1, +1, +1, −1, −1, −1, −1, −1, −1,
+1, +1, +1, +1, −1, +1, −1, −1, −1, +1, −1, −1, −1, −1, +1,
+1, +1, +1, −1, −1, −1, +1, +1, +1, 0, 0, 0, +1, −1, −1,
+1, +1, −1, +1, −1, −1, −1, +1, +1, +1, +1, −1, +1, +1, +1,
−1, +1, −1, −1, −1, −1, +1, +1, +1, −1, +1, −1, −1, −1, +1,
−1, −1, +1, −1, −1, +1, −1, +1, +1, +1, −1, −1, +1, +1, +1,
−1, +1, −1, −1, +1, −1, −1, −1, +1, +1, −1, −1, −1, +1, −1,
+1, +1, +1, −1, +1, +1, +1, +1, −1, −1, −1, −1, +1, +1, +1,
−1, −1, −1, +1, −1, −1, +1, +1, −1, +1, +1, −1, −1, −1, −1,
−1, +1, −1, −1, −1, +1, −1, +1, +1, −1, +1, −1, −1, +1, −1,
−1, −1, +1, +1, −1, −1, −1, +1, −1, −1, +1, −1, +1, +1, +1,
−1, +1, +1, +1, −1, +1, −1, +1, +1, −1, +1, −1, −1, −1, +1,
−1, −1, −1, −1, +1, −1, +1, +1, −1, +1, +1, −1, −1, −1, +1,
+1, +1, −1, −1, −1, +1, +1, +1, +1, −1, +1, −1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, −1, +1, −1, +1,
−1, −1, +1, −1, −1, −1, +1, +1, −1, −1, −1, −1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, −1, +1, +1, −1,
+1, +1, +1, −1, +1, +1, and wherein the 4× mode long training sequence includes values on subcarriers with indexes −500:500, and the values on subcarriers with indexes −500:500 are +1, +1, −1, +1, −1, +1, −1, −1, −1, +1, −1, −1, −1, +1, +1,
−1, +1, +1, +1, +1, +1, −1, −1, +1, +1, +1, −1, −1, +1, −1,
+1, −1, −1, +1, +1, −1, +1, +1, +1, −1, −1, −1, −1, −1, −1,
−1, +1, +1, +1, −1, −1, −1, −1, −1, −1, +1, −1, +1, +1, +1,
+1, −1, +1, +1, +1, −1, +1, +1, −1, −1, −1, −1, −1, +1, −1,
−1, +1, +1, −1, +1, −1, +1, +1, +1, +1, +1, −1, −1, +1, +1,
+1, −1, +1, +1, −1, −1, −1, +1, −1, +1, +1, −1, +1, +1, −1,
+1, −1, −1, +1, +1, +1, +1, −1, −1, +1, +1, −1, +1, +1, −1,
+1, +1, −1, −1, −1, +1, −1, −1, −1, +1, −1, −1, −1, +1, +1,
−1, +1, −1, +1, −1, +1, +1, +1, −1, +1, +1, −1, −1, −1, +1,
−1, −1, −1, −1, −1, +1, +1, −1, −1, −1, −1, −1, −1, +1, −1,
+1, +1, −1, −1, +1, −1, −1, −1, +1, +1, −1, −1, +1, +1, +1,
−1, −1, −1, +1, +1, +1, +1, −1, +1, +1, +1, −1, +1, +1, +1,
−1, +1, +1, +1, −1, +1, +1, −1, −1, −1, +1, −1, +1, −1, −1,
+1, +1, −1, +1, −1, +1, +1, +1, +1, +1, −1, −1, +1, +1, +1,
−1, +1, +1, −1, −1, −1, +1, −1, +1, +1, −1, −1, +1, −1, +1,
−1, −1, +1, −1, +1, −1, +1, −1, +1, +1, +1, −1, +1, +1, +1,
−1, −1, +1, −1, −1, −1, −1, −1, +1, +1, −1, −1, −1, −1, +1,
−1, +1, −1, +1, +1, −1, −1, +1, −1, −1, −1, −1, +1, −1, +1,
+1, +1, +1, −1, −1, −1, +1, +1, +1, +1, −1, −1, −1, −1, −1,
−1, −1, −1, +1, −1, −1, −1, +1, −1, −1, +1, −1, +1, −1, +1,
−1, +1, +1, −1, −1, +1, −1, +1, −1, −1, −1, −1, −1, +1, +1,
−1, −1, −1, +1, −1, −1, +1, +1, +1, −1, +1, −1, −1, +1, −1,
−1, +1, −1, +1, +1, +1, +1, +1, +1, −1, −1, −1, +1, +1, +1,
+1, −1, +1, +1, −1, −1, −1, +1, −1, −1, −1, −1, −1, +1, −1,
+1, +1, −1, +1, −1, +1, −1, +1, +1, +1, −1, −1, +1, +1, −1,
−1, +1, −1, −1, −1, −1, −1, +1, +1, −1, −1, −1, −1, +1, −1,
+1, −1, +1, +1, −1, −1, +1, −1, −1, −1, +1, −1, −1, +1, +1,
+1, +1, −1, −1, −1, +1, +1, +1, +1, −1, −1, −1, +1, +1, +1,
+1, +1, −1, +1, +1, +1, −1, +1, +1, −1, −1, −1, +1, −1, +1,
−1, −1, +1, +1, −1, +1, −1, +1, +1, +1, +1, −1, −1, −1, +1,
+1, +1, −1, +1, +1, −1, −1, −1, +1, −1, +1, +1, −1, +1, +1,
−1, +1, −1, −1, −1, +1, −1, +1, −1, −1, −1, −1, +1, +1, +1,
−1, −1, +1, 0, 0, 0, 0, 0, +1, −1, −1, −1, −1, −1, −1,
+1, −1, +1, +1, −1, −1, +1, +1, −1, +1, −1, −1, +1, −1, −1,
+1, −1, +1, −1, −1, −1, +1, +1, −1, +1, +1, −1, −1, +1, +1,
+1, +1, +1, +1, +1, −1, +1, −1, −1, +1, −1, −1, +1, −1, +1,
+1, +1, −1, −1, +1, −1, −1, −1, +1, +1, −1, −1, −1, −1, −1,
+1, −1, −1, −1, −1, −1, +1, +1, −1, −1, −1, −1, −1, +1, −1,
−1, +1, +1, +1, −1, +1, +1, +1, −1, +1, −1, −1, −1, −1, −1,
−1, −1, +1, +1, +1, −1, −1, −1, −1, +1, −1, −1, +1, +1, +1,
−1, +1, +1, −1, −1, +1, −1, +1, −1, −1, −1, −1, −1, −1, −1,
+1, +1, −1, −1, −1, +1, −1, −1, +1, +1, +1, −1, +1, −1, −1, -continued

| |
|---|
| +1, −1, −1, +1, −1, +1, +1, +1, −1, +1, −1, −1, +1, +1, −1, |
| +1, −1, +1, +1, +1, −1, −1, +1, −1, −1, −1, −1, −1, −1, −1, |
| −1, −1, −1, −1, +1, −1, +1, +1, −1, +1, +1, −1, +1, −1, −1, |
| −1, +1, +1, −1, +1, +1, +1, −1, −1, +1, +1, −1, +1, +1, −1, |
| +1, −1, −1, −1, −1, +1, +1, −1, −1, −1, −1, −1, +1, −1, −1, |
| +1, +1, +1, −1, +1, +1, +1, −1, +1, −1, +1, −1, −1, −1, −1, |
| −1, +1, +1, +1, −1, −1, −1, −1, +1, −1, −1, −1, +1, +1, −1, |
| +1, +1, −1, −1, +1, −1, +1, −1, +1, +1, +1, −1, +1, −1, −1, |
| +1, +1, −1, +1, −1, +1, +1, +1, −1, −1, +1, −1, −1, −1, +1, |
| −1, −1, −1, −1, −1, −1, −1, +1, −1, +1, +1, −1, +1, +1, −1, |
| +1, −1, −1, −1, +1, +1, −1, +1, +1, +1, −1, −1, +1, +1, +1, |
| +1, +1, −1, +1, +1, +1, +1, +1, −1, −1, +1, −1, +1, +1, +1, |
| −1, +1, +1, −1, −1, −1, +1, −1, −1, −1, +1, −1, +1, −1, +1, |
| +1, +1, +1, +1, −1, −1, −1, +1, +1, +1, +1, −1, +1, +1, −1, |
| −1, −1, +1, −1, −1, +1, +1, −1, +1, −1, +1, −1, −1, −1, −1, |
| −1, −1, +1, +1, −1, −1, −1, +1, −1, −1, +1, −1, +1, −1, +1, |
| −1, −1, +1, −1, −1, +1, −1, +1, −1, +1, −1, −1, −1, −1, +1, |
| +1, −1, +1, −1, +1, +1, +1, −1, −1, +1, −1, −1, −1, +1, −1, |
| −1, −1, −1, −1, −1, −1, +1, −1, +1, +1, −1, −1, +1, −1, +1, |
| −1, −1, −1, +1, +1, −1, +1, +1, +1, −1, −1, −1, +1, +1, +1, |
| +1, −1, +1, −1, −1, −1, −1, +1, +1, −1, −1, −1, −1, −1, +1, |
| −1, −1, +1, +1, +1, −1, +1, +1, +1, −1, +1, −1, +1, −1, −1, |
| −1, −1, −1, +1, +1, +1, −1, −1, −1, −1, +1, −1, −1, +1, +1, |
| +1, −1, +1, +1, −1, −1, +1, −1, +1, −1, +1. |

3. The method according to claim 1, wherein the method comprises:

storing the long training sequence; or storing a sub-sequence configured for constructing the long training sequence.

4. The method according to claim 1, wherein the 2× mode long training sequence corresponds to $$\{+1, +G_c, +G_c^p, +1, +G_a, -G_a^p, +G_d, -1, +G_c^p, +G_c, +1, +G_a^p, -G_a, +1, -G_a, +G_a^p, -1, +G_c, +G_c^p, +G_b, +1, +G_a^p, -G_a, +1, -G_c^p, -G_c, +1, -1, -1, -1, +1, +1, +1, 0, 0, 0, +1, -1, -1, +1, +1, -1, +1, -G_b, -G_b^p, -1, -G_d, +G_d^p, -1, +G_c, +G_b^p, +G_b, +1, +G_d^p, -G_d, -1, +G_d, -G_d^p, +1, -G_b, -G_b^p, -1, -G_a, +G_d^p, -G_d, +1, -G_b^p, -G_b, +1\},$$

wherein $G_a$={+1, +1, +1, −1, +1, +1, +1, −1, +1, −1, −1, +1, −1}, $G_b$={+1, +1, +1, −1, −1, −1, −1, +1, −1, −1, −1, +1, −1}, $G_a^p$ is a sequence that is obtained after a phase of a value at a pilot location of the $G_a$ sequence is reversed, $G_b^p$ is a sequence that is obtained after a phase of a value at a pilot location of the $G_b$ sequence is reversed, $G_c$ is a sequence that is obtained after a phase of a value on an even-numbered subcarrier of the $G_a$ sequence is reversed, $G_d$ is a sequence that is obtained after a phase of a value on an even-numbered subcarrier of the $G_b$ sequence is reversed, $G_c^p$ is a sequence that is obtained after a phase of a value at a pilot location of a $G_c$ sequence is reversed, and $G_d^p$ is a sequence that is obtained after a phase of a value at a pilot location of a $G_d$ sequence is reversed.

5. The method according to claim 1, wherein the 4× mode long training sequence corresponds to $$\{+1, +G_c, -G_c^p, -1, -1, +G_a, +G_a^p, -1 + G_b, +1, -G_c, +G_c^p, -1, +1, +G_a, +G_a^p, -1, +1, -G_c, +G_c^p, -1, +1, -G_a - G_a^p, +1, +G_b, +1, -G_c, +G_c^p, -1, -1, +G_a, +G_a^p, -1, -G_e(1{:}13), +1, 0, 0, 0,$$

-continued $$0, 0, +1, -G_e(14{:}26), +1, -G_d, +G_d^p, +1, -1, -G_b, -G_b^p, -1, -G_a^p, +1, +G_d, -G_d^p, -1, +1, -G_b, -G_b^p, +1, +1, +G_d, -G_d^p, -1, +1 + G_b, +G_b^p, -1, -G_a^p, -1, +G_d, -G_d^p, -1, +1, -G_b, -G_b^p, +1\},$$

wherein $G_e$={1, −1, 1, −1, 1, 1, 1, 1, −1, −1, −1, 1, 1, 1, 1, 1, 1, 1, 1, −1, 1, −1, −1, 1, 1, −1};

$G_a$=[+1, +1, +1, +1, +1, +1, −1, +1, +1, +1, −1, +1, +1, −1, −1, −1, +1, −1, +1, −1, −1, +1, +1, −1, +1, −1];

$G_b$=[+1, +1, +1, +1, −1, −1, +1, +1, +1, +1, +1, −1, +1, +1, −1, −1, −1, +1, −1, −1, −1, +1, −1, +1, −1, +1];

$G_a^p$ is a sequence that is obtained after a phase of a value at a pilot location of the $G_a$ sequence is reversed, $G_b^p$ is a sequence that is obtained after a phase of a value at a pilot location of the $G_b$ sequence is reversed, $G_c$ is a sequence that is obtained after a phase of a value on an even-numbered subcarrier of the $G_a$ sequence is reversed, $G_d$ is a sequence that is obtained after a phase of a value on an even-numbered subcarrier of the $G_b$ sequence is reversed, $G_c^p$ is a sequence that is obtained after a phase of a value at a pilot location of a $G_c$ sequence is reversed, and $G_d^p$ is a sequence that is obtained after a phase of a value at a pilot location of a $G_d$ sequence is reversed.

6. The method according to claim 1, wherein the allocated RU corresponds to an RU formed by 26 consecutive subcarriers, an RU formed by 52 consecutive subcarriers, an RU formed by 106 consecutive subcarriers, an RU formed by 242 consecutive subcarriers, an RU formed by 484 consecutive subcarriers, or an RU formed by 996 consecutive subcarriers.

7. An apparatus for sending a long training sequence in a wireless local area network which supports Orthogonal Frequency Division Multiple Access (OFDMA), technology, wherein the apparatus comprises:

a module configured to select a long training sequence according to a bandwidth, wherein the long training sequence is one of a 2× mode long training sequence or a 4× mode long training sequence; and a module configured to send at least a sub-sequence segment of the long training sequence according to a location and a size of an allocated resource unit (RU), wherein the sub-sequence segment at a corresponding location of the long training sequence is carried on subcarriers at the corresponding location, wherein the allocated RU is in the bandwidth and comprises consecutive subcarriers, wherein, when the bandwidth is 80-MHz, the 2× mode long training sequence includes values on subcarriers with indexes −500:2:500, and the values on subcarriers with indexes −500:2:500 are

| |
|---|
| +1, +1, −1, +1, +1, +1, −1, +1, +1, +1, +1, −1, −1, −1, +1, |
| −1, −1, +1, +1, −1, +1, +1, +1, −1, −1, −1, −1, +1, +1, +1, |
| +1, −1, +1, +1, +1, −1, +1, −1, −1, +1, −1, −1, −1, +1, +1, |
| −1, −1, −1, +1, −1, −1, +1, −1, +1, +1, −1, −1, +1, −1, +1, |
| −1, −1, −1, +1, −1, −1, −1, −1, +1, −1, −1, −1, +1, −1, +1, |
| +1, +1, −1, −1, −1, −1, +1, −1, +1, +1, +1, −1, +1, +1, +1, |
| +1, −1, −1, −1, +1, +1, +1, −1, −1, +1, +1, −1, −1, +1, +1, |
| −1, +1, −1, −1, −1, −1, +1, −1, −1, −1, +1, −1, +1, +1, −1, |

-continued

+1, +1, −1, −1, −1, +1, −1, −1, −1, +1, −1, −1, +1, −1, +1,
+1, +1, −1, −1, +1, +1, +1, −1, +1, +1, −1, −1, −1, −1, +1,
−1, +1, +1, +1, −1, +1, +1, +1, +1, −1, −1, −1, +1, −1, −1,
+1, +1, −1, +1, +1, +1, −1, −1, −1, −1, +1, −1, +1, −1, −1,
−1, −1, +1, −1, −1, −1, +1, −1, +1, +1, +1, −1, −1, +1, +1,
+1, −1, +1, +1, −1, +1, −1, −1, −1, −1, +1, −1, −1, −1, +1,
−1, +1, +1, −1, +1, +1, −1, +1, +1, −1, −1, −1, −1, −1, −1,
+1, +1, +1, +1, −1, +1, −1, −1, −1, +1, −1, −1, −1, −1, +1,
+1, +1, +1, −1, −1, −1, +1, +1, +1, 0, 0, 0, +1, −1, −1,
+1, +1, −1, +1, −1, −1, −1, +1, +1, +1, +1, −1, +1, +1, +1,
−1, +1, −1, −1, −1, −1, +1, +1, +1, −1, +1, −1, −1, −1, +1,
−1, −1, +1, −1, −1, +1, −1, +1, +1, +1, −1, −1, +1, +1, +1,
−1, +1, −1, −1, +1, −1, −1, −1, +1, +1, −1, −1, −1, +1, −1,
+1, +1, +1, −1, +1, +1, +1, +1, −1, −1, −1, −1, +1, +1, +1,
−1, −1, −1, +1, −1, −1, +1, +1, −1, +1, +1, −1, −1, −1, −1,
−1, +1, −1, −1, −1, +1, −1, +1, +1, −1, +1, −1, −1, +1, −1,
−1, −1, +1, +1, −1, −1, −1, +1, −1, −1, +1, −1, +1, +1, +1,
−1, +1, +1, +1, −1, +1, −1, +1, +1, −1, +1, −1, −1, −1, +1,
−1, −1, −1, −1, +1, −1, +1, +1, −1, +1, +1, −1, −1, −1, +1,
+1, +1, −1, −1, −1, +1, +1, +1, +1, −1, +1, −1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, −1, +1, −1, +1,
−1, −1, +1, −1, −1, −1, +1, +1, −1, −1, −1, −1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, −1, +1, +1, −1,
+1, +1, +1, −1, +1, +1, and wherein the 4× mode long training sequence includes values on subcarriers with indexes −500:500, and the values on subcarriers with indexes −500:500 are +1, +1, −1, +1, −1, +1, −1, −1, −1, +1, −1, −1, −1, +1, +1,
−1, +1, +1, +1, +1, +1, −1, −1, +1, +1, +1, −1, −1, +1, −1,
+1, −1, −1, +1, +1, −1, +1, +1, +1, −1, −1, −1, −1, −1, −1,
−1, +1, +1, +1, −1, −1, −1, −1, −1, −1, +1, −1, +1, +1, +1,
+1, −1, +1, +1, +1, −1, +1, +1, −1, −1, −1, −1, −1, +1, −1,
−1, +1, +1, −1, +1, −1, +1, +1, +1, +1, +1, −1, −1, +1, +1,
+1, −1, +1, +1, −1, −1, −1, +1, −1, +1, +1, −1, +1, +1, −1,
+1, −1, −1, +1, +1, +1, +1, −1, −1, +1, +1, −1, +1, +1, −1,
+1, +1, −1, −1, −1, +1, −1, −1, −1, +1, −1, −1, −1, +1, +1,
−1, +1, −1, +1, −1, +1, +1, +1, −1, +1, +1, −1, −1, −1, +1,
−1, −1, −1, −1, −1, +1, +1, −1, −1, −1, −1, −1, −1, +1, −1,
+1, +1, −1, −1, +1, −1, −1, −1, +1, +1, −1, −1, +1, +1, +1,
−1, −1, −1, +1, +1, +1, +1, −1, +1, +1, +1, −1, +1, +1, +1,
−1, +1, +1, +1, −1, +1, +1, −1, −1, −1, +1, −1, +1, −1, −1,
+1, +1, −1, +1, −1, +1, +1, +1, +1, +1, −1, −1, +1, +1, +1,
−1, +1, +1, −1, −1, −1, +1, −1, +1, +1, −1, −1, +1, −1, +1,
−1, −1, +1, −1, +1, −1, +1, −1, +1, +1, +1, −1, +1, +1, +1,
−1, −1, +1, −1, −1, −1, −1, −1, +1, +1, −1, −1, −1, −1, +1,
−1, +1, −1, +1, +1, −1, −1, +1, −1, −1, −1, +1, +1, −1, +1,
+1, +1, +1, −1, −1, −1, +1, +1, +1, +1, −1, −1, −1, −1, −1,
−1, −1, −1, +1, −1, −1, −1, +1, −1, −1, +1, −1, +1, −1, +1,
−1, +1, +1, −1, −1, +1, −1, +1, −1, −1, −1, −1, −1, +1, +1,
−1, −1, −1, +1, −1, −1, +1, +1, +1, −1, +1, −1, −1, +1, −1,
−1, +1, −1, +1, +1, +1, +1, +1, +1, −1, −1, −1, +1, +1, +1,
+1, −1, +1, +1, −1, −1, −1, +1, −1, −1, −1, −1, −1, +1, −1,
+1, +1, −1, +1, −1, +1, −1, +1, +1, +1, −1, −1, +1, +1, −1,
−1, +1, −1, −1, −1, −1, −1, +1, +1, −1, −1, −1, −1, +1, −1,
+1, −1, +1, +1, −1, −1, +1, −1, −1, −1, +1, −1, −1, +1, +1,
+1, +1, −1, −1, −1, +1, +1, +1, +1, −1, −1, −1, +1, +1, +1,
+1, +1, −1, +1, +1, +1, −1, +1, +1, −1, −1, −1, +1, −1, +1,
−1, −1, +1, +1, −1, +1, −1, +1, +1, +1, +1, −1, −1, −1, +1,
+1, +1, −1, +1, +1, −1, −1, −1, +1, −1, +1, −1, −1, +1, +1,
−1, +1, −1, −1, −1, +1, −1, +1, −1, −1, −1, −1, +1, +1, +1,
−1, −1, +1, 0, 0, 0, 0, 0, +1, −1, −1, −1, −1, −1, −1,
+1, −1, +1, +1, −1, −1, +1, +1, −1, +1, −1, −1, +1, −1, −1,
+1, −1, +1, −1, −1, −1, +1, +1, −1, +1, +1, −1, −1, +1, +1,
+1, +1, +1, +1, +1, −1, +1, −1, −1, +1, −1, −1, +1, −1, +1,
+1, +1, −1, −1, +1, −1, −1, −1, +1, +1, −1, −1, −1, −1, −1,
+1, −1, −1, −1, −1, −1, +1, +1, −1, −1, −1, −1, −1, +1, −1,
−1, +1, +1, +1, −1, +1, +1, +1, −1, +1, −1, −1, −1, −1, −1,
−1, −1, +1, +1, +1, −1, −1, −1, −1, +1, −1, −1, +1, +1, +1,
−1, +1, +1, −1, −1, +1, −1, +1, −1, −1, −1, −1, −1, −1, −1,
+1, +1, −1, −1, −1, +1, −1, −1, +1, +1, +1, −1, +1, −1, −1,
+1, −1, −1, +1, −1, +1, +1, +1, −1, +1, −1, −1, +1, +1, −1, -continued +1, −1, +1, +1, +1, −1, −1, +1, −1, −1, −1, −1, −1, −1, −1,
−1, −1, −1, −1, +1, −1, +1, +1, −1, +1, +1, −1, +1, −1, −1,
−1, +1, +1, −1, +1, +1, +1, −1, −1, +1, +1, −1, +1, +1, −1,
+1, −1, −1, −1, −1, +1, +1, −1, −1, −1, −1, −1, +1, −1, −1,
+1, +1, +1, −1, +1, +1, +1, −1, +1, −1, +1, −1, −1, −1, −1,
−1, +1, +1, +1, −1, −1, −1, −1, +1, −1, −1, −1, +1, +1, −1,
+1, +1, −1, −1, +1, −1, +1, −1, +1, +1, +1, −1, +1, −1, −1,
+1, +1, −1, +1, −1, +1, +1, +1, −1, −1, +1, −1, −1, −1, +1,
−1, −1, −1, −1, −1, −1, −1, +1, −1, +1, +1, −1, +1, +1, −1,
+1, −1, −1, −1, +1, +1, −1, +1, +1, +1, −1, −1, +1, +1, +1,
+1, +1, −1, +1, +1, +1, +1, +1, −1, −1, +1, −1, +1, +1, +1,
−1, +1, +1, −1, −1, −1, +1, −1, −1, −1, +1, −1, +1, −1, +1,
+1, +1, +1, +1, −1, −1, −1, +1, +1, +1, +1, −1, +1, +1, −1,
−1, −1, +1, −1, −1, +1, +1, −1, +1, −1, +1, −1, −1, −1, −1,
−1, −1, +1, +1, −1, −1, −1, +1, −1, −1, +1, −1, +1, −1, +1,
−1, −1, +1, −1, −1, +1, −1, +1, −1, +1, −1, −1, −1, −1, +1,
+1, −1, +1, −1, +1, +1, +1, −1, −1, +1, −1, −1, −1, +1, −1,
−1, −1, −1, −1, −1, −1, +1, −1, +1, +1, −1, −1, +1, −1, +1,
−1, −1, −1, +1, +1, −1, +1, +1, +1, −1, −1, −1, +1, +1, +1,
+1, −1, +1, −1, −1, −1, −1, +1, +1, −1, −1, −1, −1, −1, +1,
−1, −1, +1, +1, +1, −1, +1, +1, +1, −1, +1, −1, +1, −1, −1,
−1, −1, −1, +1, +1, +1, −1, −1, −1, −1, +1, −1, −1, +1, +1,
+1, −1, +1, +1, −1, −1, +1, −1, +1, −1, +1.

8. An apparatus in a wireless local area network which supports Orthogonal Frequency Division Multiple Access (OFDMA) technology, comprising:

a module, configured to receive a physical layer protocol data unit (PPDU); and a module, configured to determine according to a size and a location of an allocated resource unit (RU), a corresponding long training sequence segment as a reference sequence that corresponds to the allocated RU for channel estimation, wherein the long training sequence corresponds with a bandwidth of the wireless local area network, the allocated RU is in the bandwidth and comprises consecutive subcarriers, and the bandwidth is a total transmission bandwidth, wherein the long training sequence is one of a 2× mode long training sequence or a 4× mode long training sequence, wherein, when the bandwidth is 80-MHz, the 2× mode long training sequence includes values on subcarriers with indexes −500:2:500, and the values on subcarriers with indexes −500:2:500 are +1, +1, −1, +1, +1, +1, −1, +1, +1, +1, +1, −1, −1, −1, +1,
−1, −1, +1, +1, −1, +1, +1, +1, −1, −1, −1, −1, +1, +1, +1,
+1, −1, +1, +1, +1, −1, +1, −1, −1, +1, −1, −1, −1, +1, +1,
−1, −1, −1, +1, −1, −1, +1, −1, +1, +1, −1, −1, +1, −1, +1,
−1, −1, −1, +1, −1, −1, −1, −1, +1, −1, −1, −1, +1, −1, +1,
+1, +1, −1, −1, −1, −1, +1, −1, +1, +1, +1, −1, +1, +1, +1,
+1, −1, −1, −1, +1, +1, +1, −1, −1, +1, +1, −1, −1, +1, +1,
−1, +1, −1, −1, −1, −1, +1, −1, −1, −1, +1, −1, +1, +1, −1,
+1, +1, −1, −1, −1, +1, −1, −1, −1, +1, −1, −1, +1, −1, +1,
+1, +1, −1, −1, +1, +1, +1, −1, +1, +1, −1, −1, −1, −1, +1,
−1, +1, +1, +1, −1, +1, +1, +1, +1, −1, −1, −1, +1, −1, −1,
+1, +1, −1, +1, +1, +1, −1, −1, −1, −1, +1, −1, +1, −1, −1,
−1, −1, +1, −1, −1, −1, +1, −1, +1, +1, +1, −1, −1, +1, +1,
+1, −1, +1, +1, −1, +1, −1, −1, −1, −1, +1, −1, −1, −1, +1,
−1, +1, +1, −1, +1, +1, −1, +1, +1, −1, −1, −1, −1, −1, −1,
+1, +1, +1, +1, −1, +1, −1, −1, −1, +1, −1, −1, −1, −1, +1,
+1, +1, +1, −1, −1, −1, +1, +1, +1, 0, 0, 0, +1, −1, −1,
+1, +1, −1, +1, −1, −1, −1, +1, +1, +1, +1, −1, +1, +1, +1,
−1, +1, −1, −1, −1, −1, +1, +1, +1, −1, +1, −1, −1, −1, +1,
−1, −1, +1, −1, −1, +1, −1, +1, +1, +1, −1, −1, +1, +1, +1,
−1, +1, −1, −1, +1, −1, −1, −1, +1, +1, −1, −1, −1, +1, −1,
+1, +1, +1, −1, +1, +1, +1, +1, −1, −1, −1, −1, +1, +1, +1,
−1, −1, −1, +1, −1, −1, +1, +1, −1, +1, +1, −1, −1, −1, −1,
−1, +1, −1, −1, −1, +1, −1, +1, +1, −1, +1, −1, −1, +1, −1,
−1, −1, +1, +1, −1, −1, −1, +1, −1, −1, +1, −1, +1, +1, +1, −1, +1, +1, +1, −1, +1, −1, +1, +1, −1, +1, −1, −1, −1, +1,
−1, −1, −1, −1, +1, −1, +1, +1, −1, +1, +1, −1, −1, −1, +1,
+1, +1, −1, −1, −1, +1, +1, +1, +1, −1, +1, −1, +1, −1, +1,
−1, −1, −1, −1, +1, +1, +1, −1, +1, +1, −1, −1, +1, −1, −1,
−1, −1, +1, −1, −1, −1, +1, −1, +1, +1, −1, −1, +1, −1, +1,
−1, −1, +1, −1, −1, −1, +1, +1, −1, −1, −1, −1, −1, −1, +1,
−1, +1, +1, +1, −1, +1, +1, +1, +1, −1, −1, −1, −1, +1, +1,
+1, −1, +1, +1, −1, −1, +1, −1, −1, −1, +1, −1, +1, +1, −1,
+1, +1, +1, −1, +1, +1, and wherein the 4× mode long training sequence includes values on subcarriers with indexes −500:500, and the values on subcarriers with indexes −500:500 are +1, +1, −1, +1, −1, +1, −1, −1, −1, +1, −1, −1, −1, +1, +1,
−1, +1, +1, +1, +1, +1, −1, −1, +1, +1, +1, −1, −1, +1, −1,
+1, −1, −1, +1, +1, −1, +1, +1, +1, −1, −1, −1, −1, −1, −1,
−1, +1, +1, +1, −1, −1, −1, −1, −1, −1, +1, −1, +1, +1, +1,
+1, −1, +1, +1, +1, −1, +1, +1, −1, −1, −1, −1, −1, +1, −1,
−1, +1, +1, −1, +1, −1, +1, +1, +1, +1, +1, −1, −1, +1, +1,
+1, −1, +1, +1, −1, −1, −1, +1, −1, +1, +1, −1, +1, +1, −1,
+1, −1, −1, +1, +1, +1, +1, −1, −1, +1, +1, −1, +1, +1, −1,
+1, +1, −1, −1, −1, +1, −1, −1, −1, +1, −1, −1, −1, +1, +1,
−1, +1, −1, +1, −1, +1, +1, +1, −1, +1, +1, −1, −1, −1, +1,
−1, −1, −1, −1, −1, +1, +1, −1, −1, −1, −1, −1, −1, +1, −1,
+1, +1, −1, −1, +1, −1, −1, −1, +1, +1, −1, −1, +1, +1, +1,
−1, −1, −1, +1, +1, +1, +1, −1, +1, +1, +1, −1, +1, +1, +1,
−1, +1, +1, +1, −1, +1, +1, −1, −1, −1, +1, −1, +1, −1, −1,
+1, +1, −1, +1, −1, +1, +1, +1, +1, +1, −1, −1, +1, +1, +1,
−1, +1, +1, −1, −1, −1, +1, −1, +1, +1, −1, −1, +1, −1, +1,
−1, −1, +1, −1, +1, −1, +1, −1, +1, +1, +1, −1, +1, +1, +1,
−1, −1, +1, −1, −1, −1, −1, −1, +1, +1, −1, −1, −1, −1, +1,
−1, +1, −1, +1, +1, −1, −1, +1, −1, −1, −1, −1, +1, −1, +1,
+1, +1, +1, −1, −1, −1, +1, +1, +1, +1, −1, −1, −1, −1, −1,
−1, −1, −1, +1, −1, −1, −1, +1, −1, −1, +1, −1, +1, −1, +1,
−1, +1, +1, −1, −1, +1, −1, +1, −1, −1, −1, −1, −1, +1, +1,
−1, −1, −1, +1, −1, −1, +1, +1, +1, −1, +1, −1, −1, +1, −1,
−1, +1, −1, +1, +1, +1, +1, +1, +1, −1, −1, −1, +1, +1, +1,
+1, −1, +1, +1, −1, −1, −1, +1, −1, −1, −1, −1, −1, +1, −1,
+1, +1, −1, +1, −1, +1, −1, +1, +1, +1, −1, −1, +1, +1, −1,
−1, +1, −1, −1, −1, −1, −1, +1, +1, −1, −1, −1, −1, +1, −1,
+1, −1, +1, +1, −1, −1, +1, −1, −1, −1, +1, −1, −1, +1, +1,
+1, +1, −1, −1, −1, +1, +1, +1, +1, −1, −1, −1, +1, +1, +1,
+1, +1, −1, +1, +1, +1, −1, +1, +1, −1, −1, −1, +1, −1, +1,
−1, −1, +1, +1, −1, +1, −1, +1, +1, +1, +1, −1, −1, −1, +1,
+1, +1, −1, +1, +1, −1, −1, −1, +1, −1, +1, −1, −1, +1, +1,
−1, +1, −1, −1, −1, +1, −1, +1, −1, −1, −1, −1, +1, +1, +1,
−1, −1, +1, 0, 0, 0, 0, 0, +1, −1, −1, −1, −1, −1, −1,
+1, −1, +1, +1, −1, −1, +1, +1, −1, +1, −1, −1, +1, −1, −1,
+1, −1, +1, −1, −1, −1, +1, +1, −1, +1, +1, −1, −1, +1, +1,
+1, +1, +1, +1, +1, −1, +1, −1, −1, +1, −1, −1, +1, −1, +1,
+1, +1, −1, −1, +1, −1, −1, −1, +1, +1, −1, −1, −1, −1, −1,
+1, −1, −1, −1, −1, −1, +1, +1, −1, −1, −1, −1, −1, +1, −1,
−1, +1, +1, +1, −1, +1, +1, +1, −1, +1, −1, −1, −1, −1, −1,
−1, −1, +1, +1, +1, −1, −1, −1, −1, +1, −1, −1, +1, +1, +1,
−1, +1, +1, −1, −1, +1, −1, +1, −1, −1, −1, −1, −1, −1, −1,
+1, +1, −1, −1, −1, +1, −1, −1, +1, +1, +1, −1, +1, −1, −1,
+1, −1, −1, +1, −1, +1, +1, +1, −1, +1, −1, −1, +1, +1, −1,
+1, −1, +1, +1, +1, −1, −1, +1, −1, −1, −1, −1, −1, −1, −1,
−1, −1, −1, −1, +1, −1, +1, +1, −1, +1, +1, −1, +1, −1, −1,
−1, +1, +1, −1, +1, +1, +1, −1, −1, +1, +1, −1, +1, +1, −1,
+1, −1, −1, −1, −1, +1, +1, −1, −1, −1, −1, −1, +1, −1, −1,
+1, +1, +1, −1, +1, +1, +1, −1, +1, −1, +1, −1, −1, −1, −1,
−1, +1, +1, +1, −1, −1, −1, −1, +1, −1, −1, −1, +1, +1, −1,
+1, +1, −1, −1, +1, −1, +1, −1, +1, +1, +1, −1, +1, −1, −1,
+1, +1, −1, +1, −1, +1, +1, +1, −1, −1, +1, −1, −1, −1, +1,
−1, −1, −1, −1, −1, −1, −1, +1, −1, +1, +1, −1, +1, +1, −1,
+1, −1, −1, −1, +1, +1, −1, +1, +1, +1, −1, −1, +1, +1, +1,
+1, +1, −1, +1, +1, +1, +1, +1, −1, −1, +1, −1, +1, +1, +1,
−1, +1, +1, −1, −1, −1, +1, −1, −1, −1, +1, −1, +1, −1, +1,
+1, +1, +1, +1, −1, −1, −1, +1, +1, +1, +1, −1, +1, +1, −1,
−1, −1, +1, −1, −1, +1, +1, −1, +1, −1, +1, −1, −1, −1, −1,
−1, −1, +1, +1, −1, −1, −1, +1, −1, −1, +1, −1, +1, −1, +1,
−1, −1, +1, −1, −1, +1, −1, +1, −1, +1, −1, −1, −1, −1, +1,
+1, −1, +1, −1, +1, +1, +1, −1, −1, +1, −1, −1, −1, +1, −1, −1, −1, −1, −1, −1, −1, +1, −1, +1, +1, −1, −1, +1, −1, +1,
−1, −1, −1, +1, +1, −1, +1, +1, +1, −1, −1, −1, +1, +1, +1,
+1, −1, +1, −1, −1, −1, −1, +1, +1, −1, −1, −1, −1, −1, +1,
−1, −1, +1, +1, +1, −1, +1, +1, +1, −1, +1, −1, +1, −1, −1,
−1, −1, −1, +1, +1, +1, −1, −1, −1, −1, +1, −1, −1, +1, +1,
+1, −1, +1, +1, −1, −1, +1, −1, +1, −1, +1.

9. The apparatus according to claim 7, wherein the apparatus further comprises a module, configured to store the long training sequence, or store a sub-sequence configured for constructing the long training sequence.

10. The apparatus according to claim 7, wherein the 2× mode long training sequence corresponds to $$\{+1, +G_c, +G_c^p, +1, +G_a, -G_a^p, +G_d, -1, +G_c^p, +G_c, +1, +G_a^p, -G_a, +1, -G_a, +G_a^p, -1, +G_c, +G_c^p, +G_b, +1, +G_a^p, -G_a, +1, -G_c^p, -G_c, +1, -1, -1, -1, +1, +1, +1, 0, 0, 0, +1, -1, -1, +1, +1, -1, +1, -G_b, -G_b^p, -1, -G_d, +G_d^p, -1, +G_c, +G_b^p, +G_b, +1, +G_d^p, -G_d, -1, +G_d, -G_d^p, +1, -G_b, -G_b^p, -1, -G_a, +G_d^p, -G_d, +1, -G_b^p, -G_b, +1\},$$

wherein $G_a$={+1, +1, +1, −1, +1, +1, +1, −1, +1, −1, −1, +1, −1}, $G_b$={+1, +1, +1, −1, −1, −1, −1, +1, −1, −1, −1, +1, −1}, $G_a^p$ is a sequence that is obtained after a phase of a value at a pilot location of the $G_a$ sequence is reversed, $G_b^p$ is a sequence that is obtained after a phase of a value at a pilot location of the $G_b$ sequence is reversed, $G_c$ is a sequence that is obtained after a phase of a value on an even-numbered subcarrier of the $G_a$ sequence is reversed, $G_d$ is a sequence that is obtained after a phase of a value on an even-numbered subcarrier of the $G_b$ sequence is reversed, $G_c^p$ is a sequence that is obtained after a phase of a value at a pilot location of a $G_c$ sequence is reversed, and $G_d^p$ is a sequence that is obtained after a phase of a value at a pilot location of a $G_d$ sequence is reversed.

11. The apparatus according to claim 7, wherein the 4× mode long training sequence corresponds to $$\{+1, +G_c, -G_c^p, -1, -1, +G_a, +G_a^p, -1+G_b, +1, -G_c, +G_c^p, -1, +1, +G_a, +G_a^p, -1, +1, -G_c, +G_c^p, -1, +1, -G_a-G_a^p, +1, +G_b, +1, -G_c, +G_c^p, -1, -1, +G_a, +G_a^p, -1, -G_e(1{:}13), +1, 0, 0, 0, 0, 0, +1, -G_e(14{:}26), +1, -G_d, +G_d^p, +1, -1-G_b, -G_b^p, -1, -G_a^p, +1, +G_d, -G_d^p, -1, +1, -G_b, -G_b^p, +1, +1, +G_d, -G_d^p, -1, +1+G_b, +G_b^p, -1, -G_a^p, -1, +G_d, -G_d^p, -1, +1, -G_b, -G_b^p, +1\},$$

wherein $G_e$={1, −1, 1, −1, 1, 1, 1, 1, −1, −1, −1, 1, 1, 1, 1, 1, 1, 1, 1, −1, 1, −1, −1, 1, 1, −1};

$G_a$=[+1, +1, +1, +1, +1, +1, −1, +1, +1, +1, −1, +1, +1, −1, −1, −1, +1, −1, +1, −1, −1, +1, +1, −1, +1, −1];

$G_b$[+1, +1, +1, +1, −1, −1, +1, +1, +1, +1, +1, −1, +1, +1, −1, −1, −1, +1, −1, −1, −1, +1, −1, +1, −1, +1];

$G_a^p$ is a sequence that is obtained after a phase of a value at a pilot location of the $G_a$ sequence is reversed, $G_b^P$ is a sequence that is obtained after a phase of a value at a pilot location of the $G_b$ sequence is reversed, $G_c$ is a sequence that is obtained after a phase of a value on an even-numbered subcarrier of the $G_a$ sequence is reversed, $G_d$ is a sequence that is obtained after a phase of a value on an even-numbered subcarrier of the $G_b$ sequence is reversed, $G_c^P$ is a sequence that is obtained after a phase of a value at a pilot location of a $G_c$ sequence is reversed, and $G_d^P$ is a sequence that is obtained after a phase of a value at a pilot location of a $G_d$ sequence is reversed.

12. The apparatus according to claim 7, wherein the allocated RU corresponds to an RU formed by 26 consecutive subcarriers, an RU formed by 52 consecutive subcarriers, an RU formed by 106 consecutive subcarriers, an RU formed by 242 consecutive subcarriers, an RU formed by 484 consecutive subcarriers, or an RU formed by 996 consecutive subcarriers.

* * * * *